(12) United States Patent
Nevitt et al.

(10) Patent No.: US 11,662,509 B2
(45) Date of Patent: May 30, 2023

(54) DYNAMIC REFLECTED COLOR FILM WITH LOW OPTICAL CALIPER SENSITIVITY

(71) Applicant: 3M INNOVATIVE PROPERTIES COMPANY, St. Paul, MN (US)

(72) Inventors: Timothy J. Nevitt, Red Wing, MN (US); Gilles J. Benoit, Minneapolis, MN (US); Matthew B. Johnson, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 607 days.

(21) Appl. No.: 16/482,312

(22) PCT Filed: Mar. 1, 2018

(86) PCT No.: PCT/US2018/020500
§ 371 (c)(1),
(2) Date: Jul. 31, 2019

(87) PCT Pub. No.: WO2018/160866
PCT Pub. Date: Sep. 7, 2018

(65) Prior Publication Data
US 2019/0391311 A1 Dec. 26, 2019

Related U.S. Application Data

(60) Provisional application No. 62/466,104, filed on Mar. 2, 2017.

(51) Int. Cl.
G02B 5/28 (2006.01)
G02B 1/04 (2006.01)
G02B 5/26 (2006.01)

(52) U.S. Cl.
CPC .............. *G02B 5/287* (2013.01); *G02B 1/04* (2013.01); *G02B 5/26* (2013.01); *G02B 5/282* (2013.01)

(58) Field of Classification Search
CPC . G02B 5/287; G02B 1/04; G02B 5/26; G02B 5/282; G02B 5/08; G02B 5/28
See application file for complete search history.

(56) References Cited

U.S. PATENT DOCUMENTS

| 3,610,724 A | 10/1971 | Frizzell |
| 3,773,882 A | 11/1973 | Schrenk |

(Continued)

FOREIGN PATENT DOCUMENTS

| JP | 2008143028 | 6/2008 |
| JP | 2011-016291 | 1/2011 |

(Continued)

OTHER PUBLICATIONS

Macleod, "Thin-Film Optical Filters", Second Edition, British Library, 1986, pp. 1-5.

(Continued)

*Primary Examiner* — Balram T Parbadia
(74) *Attorney, Agent, or Firm* — Robert S. Moshrefzadeh

(57) ABSTRACT

An article including a reflector with a reflectance band that is substantially constant as a function of an incidence angle; a polymeric multilayer film packet including a front surface partial reflector with a reflectivity that increases with an increasing incidence angle away from the normal; and a wavelength-selective absorber with a transmission band that at least partially coincides with the reflectance band of the reflector.

20 Claims, 31 Drawing Sheets

(56) References Cited

U.S. PATENT DOCUMENTS

| | | | |
|---|---|---|---|
| 3,884,606 | A | 5/1975 | Schrenk |
| 4,446,305 | A | 5/1984 | Rogers |
| 4,540,623 | A | 9/1985 | Im |
| 5,103,337 | A | 4/1992 | Schrenk |
| 5,175,030 | A | 12/1992 | Lu |
| 5,183,597 | A | 2/1993 | Lu |
| 5,360,659 | A | 11/1994 | Arends |
| 5,448,404 | A | 9/1995 | Schrenk |
| 5,882,774 | A | 3/1999 | Jonza |
| 5,976,686 | A | 11/1999 | Kaytor |
| 6,122,103 | A | 9/2000 | Perkins |
| 6,157,490 | A | 12/2000 | Wheatley |
| 6,210,785 | B1 | 4/2001 | Weber |
| 6,368,699 | B1 | 4/2002 | Gilbert |
| 6,531,230 | B1 | 3/2003 | Weber |
| 6,783,349 | B2 | 8/2004 | Neavin |
| 6,905,220 | B2 | 6/2005 | Wortman |
| 7,138,173 | B2 | 11/2006 | Wheatley |
| 7,328,638 | B2 | 2/2008 | Gardiner |
| 7,350,442 | B2 | 4/2008 | Ehnes |
| 7,773,834 | B2 | 8/2010 | Ouderkirk |
| 7,905,650 | B2 | 3/2011 | Ma |
| 8,282,863 | B2 | 10/2012 | Jones |
| 8,523,419 | B2 | 9/2013 | Nevitt |
| 8,608,363 | B2 | 12/2013 | Weber |
| 9,091,408 | B2 | 7/2015 | Weber |
| 9,158,155 | B2 | 10/2015 | Weber |
| 9,551,818 | B2 | 1/2017 | Weber |
| 10,054,803 | B2 | 8/2018 | Wold |
| 2001/0009714 | A1* | 7/2001 | Wheatley ............... G02B 5/282 428/212 |
| 2003/0190473 | A1 | 10/2003 | Argoitia et al. |
| 2004/0125450 | A1 | 7/2004 | Hebrink |
| 2006/0193577 | A1 | 8/2006 | Ouderkirk |
| 2006/0257678 | A1 | 11/2006 | Benson, Jr. |
| 2007/0153162 | A1 | 7/2007 | Wright |
| 2007/0153384 | A1 | 7/2007 | Ouderkirk |
| 2008/0057277 | A1 | 3/2008 | Bluem |
| 2011/0181820 | A1* | 7/2011 | Watanabe ............ G02B 5/0841 156/313 |
| 2011/0222263 | A1 | 9/2011 | Weber |
| 2014/0254124 | A1 | 9/2014 | Raje |
| 2015/0285956 | A1* | 10/2015 | Schmidt .................. F24S 23/82 359/352 |
| 2015/0378077 | A1 | 12/2015 | Haag |
| 2016/0077266 | A1 | 3/2016 | Weber et al. |
| 2016/0077361 | A1* | 3/2016 | Wold ..................... G02C 7/104 351/44 |
| 2016/0109628 | A1* | 4/2016 | Weber ................... G02B 5/208 359/352 |
| 2016/0238762 | A1* | 8/2016 | Nevitt .................. G02B 5/287 |

FOREIGN PATENT DOCUMENTS

| | | |
|---|---|---|
| JP | 2013-095127 | 5/2013 |
| WO | WO 1995-17303 | 6/1995 |
| WO | WO 1995-17691 | 6/1995 |
| WO | WO 1995-17692 | 6/1995 |
| WO | WO 1995-17699 | 6/1995 |
| WO | WO 1996-19347 | 6/1996 |
| WO | WO 1999-36248 | 7/1999 |
| WO | WO 1999-036257 | 7/1999 |
| WO | WO 1999-36262 | 7/1999 |
| WO | WO 1999-39224 | 8/1999 |
| WO | WO 2000-48037 | 8/2000 |
| WO | WO 2010-041261 | 4/2010 |
| WO | WO 2013-059226 | 4/2013 |

OTHER PUBLICATIONS

Weber, "Giant Birefringent Optics in Multilayer Polymer Mirrors", Science, 2000, vol. 287, pp. 2451-2456.
International Search Report for PCT International Application No. PCT/US2018/020500, dated May 8, 2018, 6 pages.
A Thelan, Design of Optical Interference Filters, McGraw-Hill, Inc. (1989).

\* cited by examiner

DYNAMIC REFLECTED COLOR FILM WITH LOW OPTICAL CALIPER SENSITIVITY

BACKGROUND

A film article including one or more multilayer optical films (MOF) can be fabricated to reflect high-saturation colors, depending on the geometry of the illumination sources, the observer (or sensor), and the materials selected to form the film elements and the MOF. MOF articles and films are typically high aspect-ratio structures that are very thin (along the thickness axis), with a large dimension in a x-y film plane perpendicular to the film thickness directions. A normal to the film plane defines a z-axis, with observer and illumination source(s) geometric configurations described relative to the film normal axis.

Some MOF articles have structural optical caliper (thickness) variations that can cause spatial and time-dependent variations in the reflected color response of articles fabricated to obtain a target reflected color response. Optical caliper can vary across short, medium and long time scales in the MOF manufacturing process, as well as spatially across large-dimension MOF-based structures.

SUMMARY

Optical caliper variations cause difficulties in fabricating a MOF article with a targeted reflected color response (as a function of observer view angle) that is both accurate (relative to target) and spatially uniform across a large area of the article. Optical caliper variation can also cause difficulties in manufacturing a MOF article at a first time that has nearly identical reflected color response compared to the same MOF article fabricated at a later second time. The time intervals between the first and the second times may be minutes or hours in a selected manufacturing run, or weeks, months or years between different manufacturing runs.

In one aspect, the present disclosure is directed to MOF-containing articles having a selected saturated reflected color response that has a diminished sensitivity to optical caliper variations, both short term and long-term, and spatially. In some non-limiting examples, these MOF articles can be used as "precision" dynamic reflected color plaques, appliqués, coverings and signage, where color target(s), color dynamics, color saturation and observed color uniformity are of value.

In one aspect, the present disclosure is directed to an article including a reflector with a reflectance band that is substantially constant as a function of an incidence angle; a polymeric multilayer film packet including a front surface partial reflector with a reflectivity that increases with an increasing incidence angle away from the normal; and a wavelength-selective absorber with a transmission band that at least partially coincides with the reflectance band of the reflector.

In another aspect, the present disclosure is directed to an article including a light absorbing backing; a first polymeric multilayer film on the light absorbing backing, the first polymeric multilayer film including a back reflector with a reflectance band that is substantially constant as a function of an incidence angle; a polymeric layer on the first multilayer polymeric film, the polymeric layer including a wavelength-selective absorber with a transmission band that at least partially coincides with the reflectance band of the back reflector; a second polymeric multilayer film on the polymeric layer, wherein the second polymeric multilayer film includes a collimating front surface partial reflector with a reflectivity of less than about 30% for normally incident, for unpolarized light, and a reflectivity of about 45% to about 60% for obliquely incident light with an incidence angle of 60 degrees, for unpolarized light, for any plane of incidence, and wherein the front surface partial reflector has a red-sloped reflection spectrum; and a diffusive layer on the second polymeric multilayer film packet.

In another aspect, the present disclosure is directed to an article including a black backing layer; a first polymeric multilayer film on the black backing layer, wherein the first polymeric multilayer film includes coextruded polymer microlayers oriented to produce a reflector with a reflectance band that is substantially constant as a function of an incidence angle; a polymeric layer on the first multilayer polymeric film, the polymeric layer including a dye with a transmission band that at least partially coincides with the reflectance band of the reflector; a second polymeric multilayer film on the polymeric layer, wherein the second polymeric multilayer film includes coextruded polymer microlayers oriented to produce a collimating front surface partial reflector with a reflectivity of greater than about 30% for normally incident light, with a random polarization, and a reflectivity of about 45% to about 60% for obliquely incident light with an incidence angle of 60 degrees, for unpolarized light, for any plane of incidence, and wherein the front surface partial reflector has a red-sloped reflection spectrum; and a diffusive layer on the second polymeric multilayer film packet.

In another embodiment, the present disclosure is directed to a film article with a transmission greater than 70% at normal angle for unpolarized light, and with transmission of about 55% to about 40% for unpolarized light at a 60 degree incidence angle, for any plane of incidence.

In another embodiment, the present disclosure is directed to a multilayer polymer film article with a transmission greater than 75% at normal angle for unpolarized light, and with transmission of about 55% to about 40% for unpolarized light at 60 degree incidence angle, for any plane of incidence.

In another embodiment, the present disclosure is directed to a multilayer polymer film article with a transmission greater than 80% at normal angle for unpolarized light, and with transmission of about 55% to about 40% for unpolarized light at 60 degree incidence angle, for any plane of incidence.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols in the figures indicate like elements.

DETAILED DESCRIPTION

In the following detailed description and examples, the terms transmission spectrum, transmissivity, reflection spectrum and reflectivity, generally refer to the visible-averaged, or photopic-weighted properties, unless otherwise circumscribed.

Figure 1:
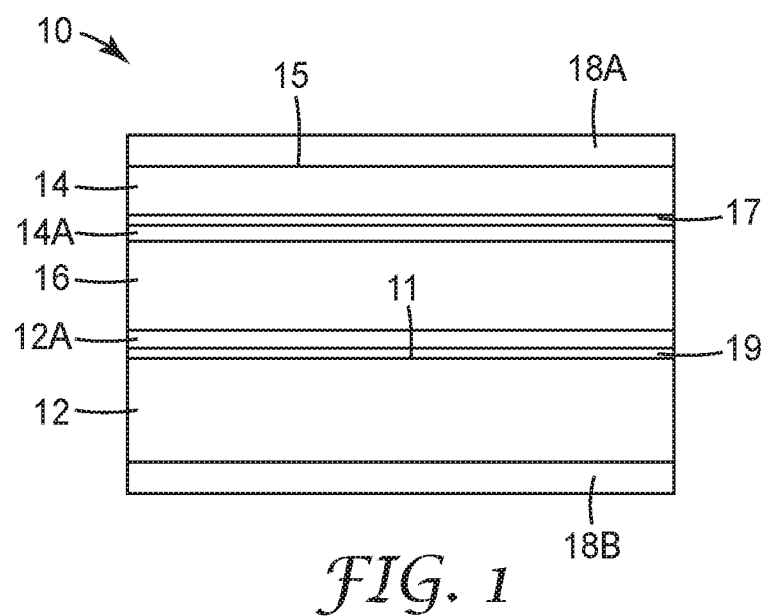
FIG. 1 is cross-sectional view of a film article including multilayer optical films (MOF).

Referring to FIG. 1, in one embodiment the present disclosure is directed to a MOF film article 10 including a highly reflective broad banded back reflector 12. The back reflector 12 has a reflectance band that overlays the visible spectrum, and does so as a function of a broad range of incidence angles of light incident on a front surface 11 thereof. The MOF film article 10 further includes a polymeric multilayer film 14 that is a front surface partial reflector having reflectivity that increases substantially with an increasing incidence angle away from the normal of light incident on a front surface 15 thereof. Both the back reflector 12 and the MOF front surface partial reflector 14 have reflection bands that substantially overlap the wavelength range of visible light, for all light incidence angles that constitute the working observation range of the MOF film article 10.

The MOF article 10 further includes a wavelength-selective absorber, with a transmission band, and an associated transmission maximum, that at least partially overlaps with the reflectance band of the back reflector 12. In some embodiments, the wavelength-selective absorber may be present in one or both back reflector 12 and MOF front surface partial reflector 14. In some embodiments, the wavelength-selective absorber may be present in the absorber 16. In some embodiments, the absorber 16 is a polymeric film having incorporated therein at least one of a pigment or a dye.

In some embodiments, at least some of the layers 12, 14, 16 of the MOF film article 10 can directly contact one another and share an interface. In some embodiments, the MOF film article 10 may optionally include intermediate layers 12A, 14A of, for example, an optical adhesive.

In some embodiments, the MOF film article 10 includes optional surface layers 18A, 18B, which can protect the article from damage or provide a desired optical effect. Suitable surface layers 18A, 18B include, but are not limited to, refractive elements, diffractive elements, diffusive elements, and the like. For example, refractive elements can collimate and/or decollimate light that is reflected by the MOF film article 10. In other embodiments, for example, the surface layers 18A, 18B can diffuse light either incident on or exiting the MOF article 10. For example, in some embodiments the surface layer 18A may be a diffusive layer of glass or a polymeric film. In other embodiments, the surface layers 18A, 18B can have a selected color to modify the light reflected from or transmitted by the MOF film article 10. For example, the surface layer 18B on the back side of the MOF article 10 can be an absorbing layer.

In some embodiments, the surface layers 18A, 18B can include one or more fiber polarizing films as described, e.g., in U.S. Patent Publication No. 2006/0193577 (Ouderkirk et al.), entitled REFLECTIVE POLARIZERS CONTAINING POLYMER FIBERS; U.S. Pat. No. 7,773,834 (Ouderkirk et al.), entitled MULTILAYER POLARIZING FIBERS AND POLARIZERS USING SAME; and U.S. Patent Publication No. 2008/0057277 (Bluem et al.), entitled POLYMER FIBER POLARIZERS. Other exemplary films that can be used include, but are not limited to, cholesteric polarizing films, birefringent pile-of-plates films, and birefringent polymer blends (e.g., DRPF, available from 3M Co., St. Paul, Minn.).

Suitable reflective (but partially transmissive) components 18A that can be used with the MOF front surface partial reflector 14 include, but are not limited to, the following examples in Table 1 below:

TABLE 1

| REFLECTOR TYPE | CONSTRUCTION | POLARIZATION |
|---|---|---|
| Multilayer | ¼ wave birefringent films, asymmetric orientation | Polarizing |
| | ¼ wave birefringent films, symmetric orientation | Non-polarizing @ 0 degrees |
| | Pile of plates birefringent films, asymmetric orientation | Polarizing |
| | ¼ wave isotropic films | Non-polarizing @ 0 degrees |
| | Pile of plates films, isotropic | Non-polarizing |
| | Perforated mirrors | Non-polarizing |
| | Locally thinned partial reflectors (light transmission is increased in the thinned region) | Polarizing or non-polarizing |
| | Crossed Reflective Polarizers (angle of crossing controls amount of transmitted light) | Polarizing |
| Metal | Thin film enhanced metal films | Non-polarizing |
| | Thin film enhanced metal films, perforated | Non-polarizing |
| | Wire grid | Polarizing |
| Diffusive | Inorganic filled polymer films | Non-polarizing |
| | Voided polymer films | Non-polarizing |
| | ULI Voided Si/gradient | Non-polarizing |
| | Polymer blends | Non-polarizing |
| | Polymer blends | Polarizing |
| | Asymmetric DRPF Mirrors | Non-polarizing |
| | Asymmetric DRPF Polarizers | Polarizing |
| | Birefringent fibers - concentric | Polarizing |
| | Islands-in-sea birefringent fibers | Polarizing |
| | Holographic Diffusers | Non-polarizing |
| Microstructured | Lenticular structures or linear prisms | Non-polarizing |
| | 2D structured surfaces (cube corner, lenslet arrays, etc.) | Non-polarizing |
| Cholesteric (with retarder films) | Lefthand | Polarizing |
| | Righthand | Polarizing |
| | Combinations of both | Polarizing - adjustable |
| Metal/Dielectric | Metal/dielectric layered mirrors | Non-polarizing |

Returning to FIG. 1, the back reflector 12 and the MOF front surface partial reflector 14 can include optional support layers 17, 19. The support layers 17, 19 can include any suitable material or combination thereof, and polymeric films such as, for example, polycarbonate, acrylic, PET, and the like have been found to be particularly useful. In some embodiments, the MOF front surface partial reflector 14 can be supported by a fiber reinforced optical film as described, e.g., in U.S. Patent Publication No. 2006/0257678 (Benson et al.), entitled FIBER REINFORCED OPTICAL FILMS; U.S. Patent Publication No. 2007/0153162 (Wright et al.), entitled REINFORCED REFLECTIVE POLARIZER FILMS; and U.S. Patent Publication No. 2007/0153384 (Ouderkirk et al.), entitled REINFORCED REFLECTIVE POLARIZER FILMS. Further, the front surface partial reflector 14 can be attached to the support layer 17 using any suitable technique such as, for example, with an optical adhesive.

In various embodiments, the wavelength selective absorber 16 may include a pigment or a dye having any desired color, for example, by absorbing a predetermined wavelength band, peak, or spectrum in the visible, associated with a predetermined color. For example, a color of the wavelength selective absorber 16 may be selected to tune the appearance of the MOF film article 10 as a whole. For example, the color may be selected to tune the reflected or scattered wavelengths of the MOF film article 10, or to modify the observed dynamic color of the MOF article 10 exhibited by a major surface thereof for a selected range of observation angles.

In various embodiments, the wavelength-selective absorber 16 has a transmission maximum in the visible wavelengths, within the same wavelength range as the reflection band of the back reflector 12, and within the same wavelength range as the MOF front surface partial reflector 14. In some embodiments, the MOF front surface partial reflector 14 has a reflectivity that increases substantially with an increasing incidence angle away from the normal of light incident on the MOF film article 10.

The wavelength selective absorber 16, while blocking visible wavelengths, may transmit at least some, or substantially all, near infrared wavelengths. In some examples, the wavelength selective absorber 16 may include a separate coating including one or both of a dye or a pigment. In some examples, the wavelength selective absorber 16 may not include a dye, and may include a near-infrared transmissive, visible scattering pigment, that may in some instances also be absorbing. For example, the wavelength selective absorber 16 may include Lumogen Black FK 4280 or Lumogen Black FK 4281 (BASF, Southfield, Mich.).

In some embodiments, the wavelength selective absorber 16 may include a MOF, and one or more of the layers of the multilayer film can include one or both of a dye or a pigment. In some examples, the wavelength selective absorber 16 may include or be an adhesive layer, a polymeric film layer, a skin layer, or any other layer of a multilayer film that includes a dye or a pigment.

In some embodiments, the MOF article 10 may not include a separate layer 16 with a wavelength selective absorber, and instead may include a wavelength selective dye or a pigment in any other suitable layer. In some embodiments, the pigment or dye may be present in one or more of the back reflector 12 or the MOF front surface partial reflector 14, or both. In some embodiments, the pigment or dye may be present in any layer of the MOF film article 10 in a predetermined pattern or region. In some examples, the wavelength selective absorber 16 may exhibit broadband absorption, for example, absorption over a predetermined wavelength band, by including one or more absorbing dyes or pigments that absorb at least a respective sub-band of the predetermined wavelength band.

In some examples, the wavelength selective absorber 16 may include optional beads or particles to cause diffusing or scattering. For example, the wavelength selective absorber 16 may include a suitable medium and beads or particles dispersed therein. In various embodiments, the medium may include glass, polymer, or any other suitable optical material, or combinations thereof. For example, the beads or particles may include silica, glass, polymeric, organic, inorganic, metal oxide, polystyrene, or other suitable scattering materials, or combinations thereof. The wavelength selective absorber 16 may include diffusive or scattering voids or pores, and the voids or pores may include a gas such as air.

In an embodiment where the reflectors 12, 14 have specular reflection and transmission responses, and the wavelength-selective absorber 16 is a low scattering layer with relatively low haze, the MOF article 10 has a unique appearance of a saturated, "high gloss" reflection color for a range of near-normal observation angles, accompanied by a dynamic observed color change to a neutral-color silver appearance as view angle increases toward grazing.

In another embodiment in which the reflectors 12, 14 have specular reflection and transmission responses, and the wavelength-selective absorber 16 is a low scattering layer with relatively low haze, the MOF article 10 has a unique appearance of a saturated, "high gloss" reflection color for a range of near-normal observation angles, accompanied by a dynamic observed color change to a gold appearance as view angle increases toward grazing.

In yet another embodiment where the reflectors 12, 14 have specular reflection and transmission responses, and the wavelength-selective absorbing layer 16 is a low scattering layer with relatively high clarity, the MOF article 10 has a unique appearance of a saturated, "high gloss" reflection color for a range of near-normal observation angles, accompanied by a dynamic observed color change to a green-gold appearance as view angle increases toward grazing.

In various embodiments, the MOF article 10 has a dynamic color appearance that simulates in part, the appearance of a polished precious metal surface having a saturated specular reflection color, for observation angles that are near-normal to the MOF article 10, and that dynamically change appearance to a silver, or gold, or green-gold specular reflection color as observation angles move towards grazing.

In various embodiments, this dynamic color appearance of the MOF article 10 results in part because a visible light ray incident on the MOF front surface partial reflector film 14 will undergo broad-banded visible reflection, with the strength of the reflection dependent on the incident angle of the ray. For relatively high incident angles from air (about 50 degrees to about 80 degrees) the incident ray can be strongly reflected, with reflectivity greater than about 50% approaching 100% near grazing angle. This results in the specular reflection color of the MOF front surface partial reflector 14, which dominates the color appearance of the MOF article 10 for relatively high observation angles.

For rays that are incident nearer to the normal of the MOF front surface partial reflector 14, the reflection strength of the reflector 14 can be strongly diminished, approaching about 20% to 25% at near-normal angles for certain dynamic color designs. In this instance, the color appearance of the MOF article 10 will be dominated by the color of the underlying wavelength-selective absorber 16, atop the back reflector 12, which as noted above is a broad banded reflector.

When, as described previously, the back reflector 12 has a broad-banded visible reflection spectrum that is nearly constant and relatively strong (greater than about 70% reflectivity across the visible band) and is overlain with a suitable low haze wavelength-selective absorber 16, the reflection strength of the combination of the absorber 16 overlaying the back reflector 12 as a specular partial reflector, can be very strong (50% to as high as 85%) for wavelengths of a selected color where the absorber 16 is highly transmissive, while adjacent wavelengths, where the absorber 16 is strongly absorbing, the reflection strength of combination of the absorber 16 and the back reflector 12 will be relatively low or very low.

The described combination of a high-clarity absorber 16 disposed atop a highly reflective broad banded back reflector 12 can be designed to have insignificant change in color appearance for observation angles ranging from normal to grazing. The wavelength-selective absorption characteristics of the absorber 16 are not dependent on any form of interference, or phase coherence phenomena, but rather, on ray path absorption. Ray path absorption at least approximately follows Beer's Law, wherein the absorptivity is dependent only on the imaginary part of the refractive index of the absorber 16 (the wavelength-dependent loss part), and the path length through the layer 16. The path length through the absorbing layer 16, while complicated in detail, is to a very good approximation, simply proportional to the thickness of the absorber layer 16 times the 1/cosine of the propagation angle through the layer 16, which for a high-clarity absorbing layer, changes slowly and minimally from near-normal rays, to near grazing rays, when the rays are incident from air.

In some embodiments, the MOF front surface partial reflector can provide a weak reflection spectrum across the visible for near-normal incidence angles, with a reflection strength increase that changes dynamically to an opaque and highly reflective, silver appearance reflector as the view angle increases towards grazing. In an alternative embodiment, the MOF front surface partial reflector can be fabricated to provide a weak reflection spectrum across the visible for near-normal incidence angles, with a reflection strength increase that changes dynamically to an opaque and highly reflective, gold appearance reflector as the view angle increases towards grazing. In yet another embodiment, the MOF front surface partial reflector can provide a weak reflection spectrum across the visible for near-normal incidence angles, with a reflection strength increase that changes dynamically to an opaque and highly reflective, green-gold appearance reflector as the view angle increases towards grazing.

In some embodiments of the MOF article 10, the reflection color for the combination of the back reflector 12 that is a neutral-color, broad banded visible reflector, overlain with a wavelength-selective absorbing layer 16, can have relatively constant reflection color with changing observation angle. The broad banded back reflector 12 can have reflection-band edges situated outside of the visible wavelength region, for all useful observation angles, and the wavelength-selective absorption layer changes its color only through path length variation through the absorbing layer 16.

As a result, the reflected color appearance of these components within the MOF article 10 can be insensitive to optical caliper variation that are typical for the manufacturing process of MOF. For this situation, time intervals between manufacturing of these components will not result in significant variations in the color appearance of the combination of absorbing layer 16, atop the broad banded back reflector 12. In addition, the spatially uniform color for the underlying back reflector 12 and absorber layer 16, across a large-area MOF article 10, can be made to be insignificant, if pigment concentration and absorbing layer thickness for the absorbing layer 16, and placement of reflection-band edges outside of the visible for all useful observation angles, can be accomplished across this large area.

Further, the dynamic color response for the complete MOF article 10, which includes the MOF front surface partial reflector 14, can be made relatively insensitive to temporal and spatial color variation, if the MOF front surface partial reflector 14 has its reflection-band edges located outside of the visible spectrum for all useful observation angles, rendering its reflected color response insensitive to optical caliper variation.

In some embodiments of the MOF article 10, the absorber layer 16, and the broad banded back reflector 12, which provide a reflective color response, can include a wavelength-selective absorbing dye or pigment, embedded in a highly scattering matrix, which can create significant wavelength-selective backscattering towards the front surface of the MOF article 10; for example, a pigmented paint. Such an absorbing and scattering absorber layer 16 can provide a color response towards the front surface of the MOF article 10 that is diffusely reflective. The diffusely reflective color response has a wavelength-selective backscatter that can result in a less intense, near-normal view angle color response than for instances where the absorber layer 16 has high clarity and is backed by a high reflectivity specular broad banded back reflector 12. Further, if the absorber layer 16 is a highly scattering matrix, the layer 16 can be fabricated with no wavelength-selective dye or pigment, providing the absorber layer 16 with a diffuse white appearance. In another embodiment, if the absorber layer 16 is a highly scattering matrix layer, the layer 16 can include an all-visible wavelength absorbing dye or pigment, which can provide the layer 16 with a diffuse black or gray appearance.

In yet another embodiment, the absorber layer 16 can include a wavelength-selective absorbing dye or pigment embedded in a weakly scattering matrix such as, for example, a layer with a haze value of 5%, or 25% or 90%, or more. For example, the wavelength selective absorber layer 16 may include a matrix with beads or particles dispersed in the matrix. The matrix may include glass, polymer, or any other suitable optical medium, or combinations thereof. The beads or particles may include silica, glass, polymeric, organic, inorganic, metal oxide, polystyrene, or other suitable scattering materials, or combinations thereof. The wavelength selective absorber layer 16 may include diffusive or scattering voids or pores, and the voids or pores may include a gas such as air. And the scattering elements, may derive from the color pigments themselves, if they agglomerate into macro-particles large enough to generate scatting at visible wavelengths For each of the alternative scattering and high-haze forms of the absorbing layer 16, a highly reflective, broadband specular back reflector 12 can be coupled as shown in FIG. 1, which provides an intensity boost to the front-surface directed scattered light. In some embodiments, this combined layer construction can increase the brightness, or color saturation, of the high-scattering or hazy pigmented or dyed absorbing layer 16 when viewed from a near-normal observation angle through a MOF front surface partial reflector 14, which is a collimating reflective element.

Figure 3:
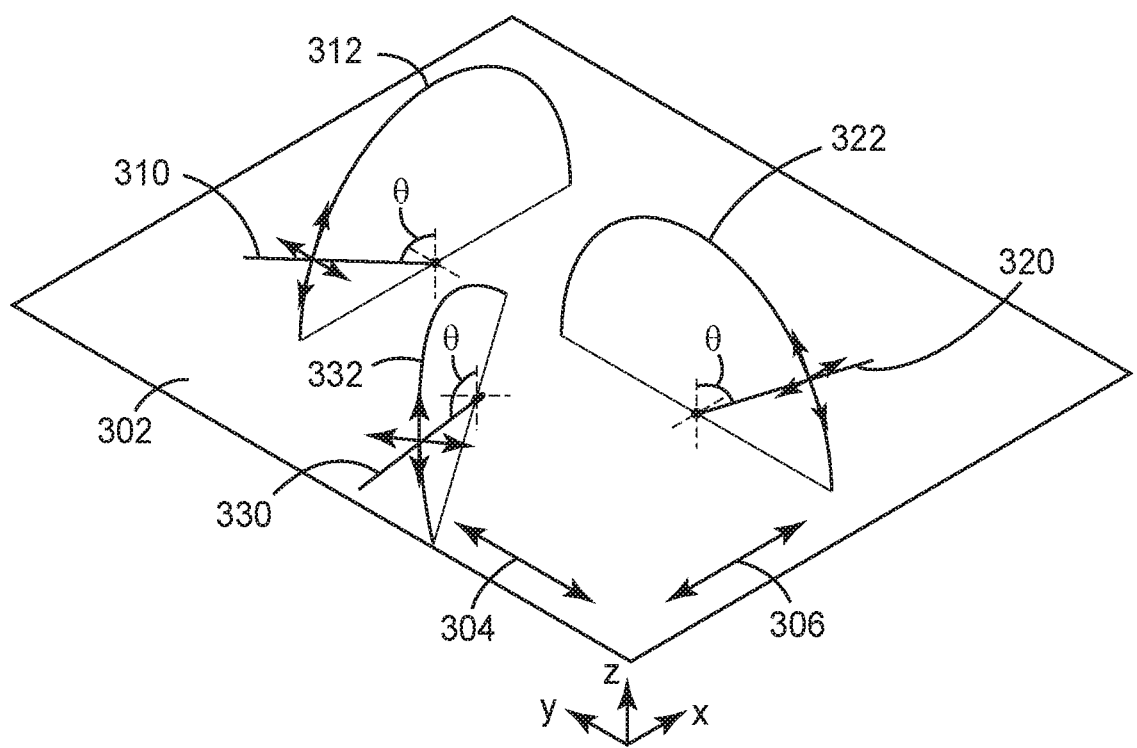
FIG. 3 is a schematic perspective view of a reflective film.

For all of the embodiments of a scattering and absorbing layer 16, and of a low haze absorption layer 16 combined with a broad banded back reflector 12, the reflected color response for visible light incident from the front surface 15 of the MOF article 10, and subsequently reflected and/or backscattered from the absorber layer 16 and the back reflector 12, will be relatively constant in color and in color intensity, as a function of view angle, regardless of the plane of incidence of the incidence light (FIG. 3). In other words, the reflected color response is azimuthally symmetric, and is unpolarized, for unpolarized incident light.

Each of the forms of collimating specular MOF front surface partial reflector elements 14, in combination with any of the forms for color generating absorber layer 16, can then be combined with the back reflector 12 of the MOF article 10. In various embodiments, the back reflector 12 includes, but is not limited to, any broad banded visible reflector such as MOF interference reflectors, a coated metal layer on a substrate, such as silver, gold or aluminum layer on a polymer film, or on a glass layer, or on a structural element. Other back reflectors 12 include broad banded visible reflectors formed from a multilayer interference structure of inorganic layers, a combination of inorganic and organic interference layers, or a combination of organic and metallic layers.

The back reflector 12 is highly reflective, and in various embodiments has an on-axis average reflectivity for visible light of at least 90%, 95%, 98%, 99%, or more for visible light of any polarization. Such reflectivity values encompass all visible light reflected into a hemisphere, i.e., such values include both specular and diffuse reflections.

The back reflector 12 can be a predominantly specular, diffuse, or combination specular/diffuse reflector, whether spatially uniform or patterned. In some embodiments, the back reflector 12 can be a semi-specular reflector as is further described herein. See also U.S. Pat. Nos. 8,608,363 and 9,091,408 (Weber, et al.), entitled RECYCLING BACKLIGHTS WITH SEMI-SPECULAR COMPONENTS; U.S. Pat. No. 8,523,419 (Nevitt, et al.), entitled THIN HOLLOW BACKLIGHTS WITH BENEFICIAL DESIGN CHARACTERISTICS; and U.S. Pat. No. 7,905,650 (Ma et al.), entitled BACKLIGHT SUITABLE FOR DISPLAY DEVICES. In some cases, the back reflector 12 can be made from a stiff metal substrate with a high reflectivity coating, or a high reflectivity film laminated to a supporting substrate.

Suitable high reflectivity materials for the back reflector 12 include Vikuiti Enhanced Specular Reflector (ESR) multilayer polymeric film available from 3M Company; a film made by laminating a barium sulfate-loaded polyethylene terephthalate film (2 mils (0.05 mm) thick) to Vikuiti ESR film using a 0.4 mil (0.01 mm) thick isooctylacrylate acrylic acid pressure sensitive adhesive, the resulting laminate film referred to herein as "EDR II" film; E-60 series Lumirror polyester film available from Toray Industries, Inc.; porous polytetrafluoroethylene (PTFE) films, such as those available from W. L. Gore & Associates, Inc.; Spectralon reflectance material available from Labsphere, Inc.; Miro anodized aluminum films (including Miro 2 film) available from Alanod Aluminum-Veredlung GmbH & Co.; MCPET high reflectivity foamed sheeting from Furukawa Electric Co., Ltd.; White Refstar films and MT films available from Mitsui Chemicals, Inc.; and 2xTIPS.

The back reflector 12 can be substantially flat and smooth, or it may have a structured surface associated with it to enhance light scattering or mixing. Such a structured surface can be imparted (a) on the surface 11 of the back reflector 12, or (b) on a transparent coating applied to the surface 11. In the former case, a highly reflecting film may be laminated to a substrate in which a structured surface was previously formed, or a highly reflecting film may be laminated to a flat substrate (such as a thin metal sheet, as with Vikuiti Durable Enhanced Specular Reflector-Metal (DESR-M) reflector available from 3M Company) followed by forming the structured surface, such as with a stamping operation. In the latter case, a transparent film having a structured surface can be laminated to a flat reflective surface, or a transparent film can be applied to the reflector and then afterwards a structured surface imparted to the top of the transparent film.

In some embodiments, the back reflector 12 has a high hemispherical reflectivity for visible light, typically, significantly higher than the front surface partial reflector 14, since the front surface partial reflector (the hemispherical reflectivity of the back reflector is referred to as $R^b_{hemi}$, while that of the front reflector is referred to as $R^f_{hemi}$) is deliberately designed to be partially transmissive to provide the required light output of the construction 10. Suitable materials for the back reflector 12 include, but are not limited to, ESR Vikuiti Enhanced Specular Reflector multilayer polymeric film available from 3M Company, which has a hemispherical reflectivity ($R^b_{hemi}$) of 99.4%, near-Lambertian diffusely reflective materials such as MC-PET microcellular PET reflective sheeting, available from Furukawa America, Inc. (Peachtree City, Ga.), which has a hemispherical reflectivity of 98.4%, and a filled Polyester film available from Reflexite under the trade designation Reflector Film (RRF-1133), which has a hemispherical reflectivity of 97.5%, and semi-specular materials such as BG ESR from 3M, which as a hemispherical reflectivity of about 98%, and porous polypropylene films made using thermally induced phase separation as described, e.g., in U.S. Pat. No. 5,976,686. Hemispherical reflectivity measurements were made for the above materials using the techniques described in, for example, U.S. Pat. No. 8,523,419 (Nevin, et al.), entitled THIN HOLLOW BACKLIGHTS WITH BENEFICIAL DESIGN CHARACTERISTICS.

The MOF front surface partial reflector 14 can include any suitable film(s) and/or layer(s) configured to have a specular reflectivity that generally increases with angle of incidence, and a transmission that generally decreases with angle of incidence, where the reflectivity and transmission is for unpolarized visible light, for either plane of incidence as described in FIG. 3.

In various embodiments, the MOF front surface partial reflector 14 is configured to be partially transmissive and partially reflective for at least visible light. The transmission of the MOF front surface partial reflector 14 allows at least a portion of light incident upon the front surface of the MOF article 10 to penetrate the article below the partial reflector 14. The light penetrating below the partial reflector 14 is subsequently reflected or back-scattered by the wavelength-selective absorber layer 16 and broadbanded back reflector 12, back through the front surface 15 of the MOF article 10, which can impart to the article 10 a saturated reflection color. For another portion of incident light, the front surface partial reflector 14, has a high level of reflectivity. For that portion, the observed reflection color from the MOF article 10 can be dominated by the color appearance provided by the shape of the reflection spectrum from the MOF front surface partial reflector 14.

In one embodiment, which is not intended to be limiting, the MOF front surface partial reflector 14 achieves these optical performance objectives, stated above, through design of a film stack of one or more birefringent multilayer optical films. See, e.g., U.S. Pat. No. 5,882,774 (Jonza et al.) entitled OPTICAL FILM; U.S. Pat. No. 6,905,220 (Wortman et al.) entitled BACKLIGHT SYSTEM WITH MULTILAYER OPTICAL FILM REFLECTOR; U.S. Pat. No. 6,210,785 (Weber et al.) entitled HIGH EFFICIENCY OPTICAL DEVICES; and U.S. Pat. No. 6,783,349 (Neavin et al.) entitled APPARATUS FOR MAKING MULTILAYER OPTICAL FILMS.

Multilayer optical films, i.e., films that provide desirable transmission and/or reflection properties at least partially by an arrangement of microlayers of differing refractive index, are known. It has been known to make such multilayer optical films by depositing a sequence of inorganic materials in optically thin layers ("microlayers") on a substrate in a vacuum chamber. Inorganic multilayer optical films are described, for example, in H. A. Macleod, *Thin-Film Optical*

*Filters,* 2nd Ed., Macmillan Publishing Co. (1986) and A. Thelan, Design of Optical Interference Filters, McGraw-Hill, Inc. (1989).

In some embodiments, the multilayer optical films can be produced by coextrusion of alternating polymer layers. See, e.g., U.S. Pat. No. 3,610,724 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. Such films are compatible with high volume manufacturing processes and can be made in large sheets and roll goods, Polymeric multilayer optical films for use in optical filters are described, for example, in PCT Publication Nos. WO95/17303; WO95/17691; WO95/17692; WO95/17699; WO96/19347; and WO99/36262. One commercially available form of a multilayer reflective polarizer is marketed as Dual Brightness Enhanced Film (DBEF) by 3M Company, St. Paul, Minn. Polymeric multilayer optical films are generally formed using alternating layers of polymer materials with different indices of refraction, and any polymer or combination of polymers can be used if the polymer is relatively transparent over the wavelength range of transmission.

Figure 2:
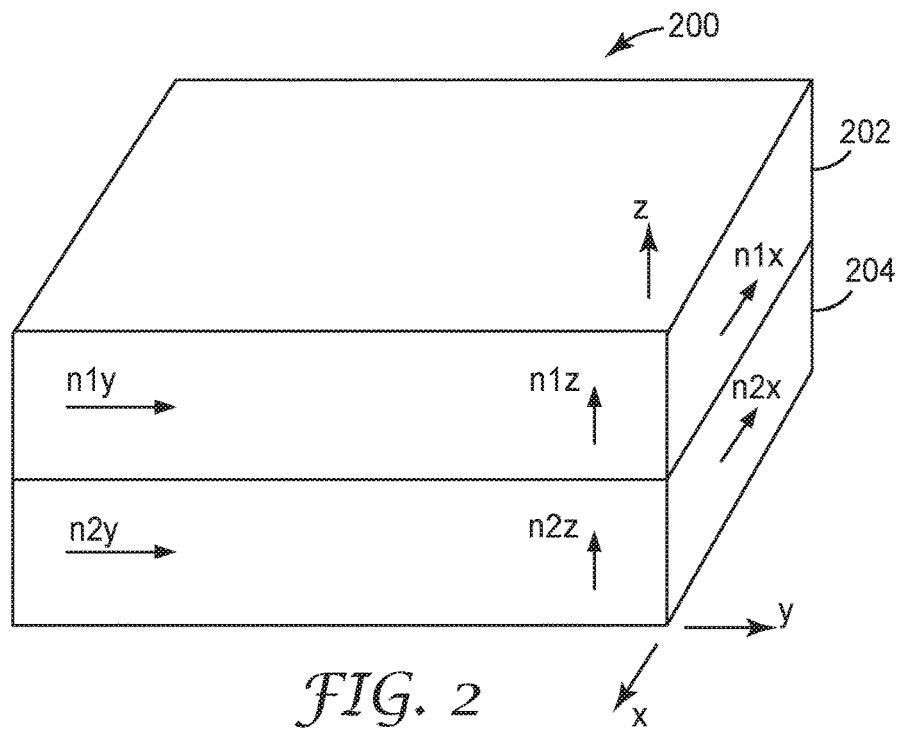
FIG. 2 is a schematic perspective view of a multilayer optical film.

For polarizing applications, the first optical layers, the second optical layers, or both, in the multilayer film stack forming the front surface partial reflector 14 can be formed using polymers that are or can be made birefringent, in which the polymer's index of refraction has differing values along orthogonal Cartesian axes of the polymer as shown in FIG. 2. Generally, birefringent polymer microlayers have their orthogonal Cartesian axes defined by the normal to the layer plane (z-axis), with the x-axis and y-axis laying within the layer plane. Birefringent polymers can also be used in non-polarizing applications.

A multilayer optical film stack (such as the stacks used in some embodiments of the back reflector 12 and the front surface partial reflector 14 in the MOF article 10 of FIG. 1) typically includes individual microlayers having different refractive index characteristics so that some light is reflected at interfaces between adjacent microlayers. The microlayers are sufficiently thin so that light reflected at a plurality of the interfaces undergoes constructive or destructive interference to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 µm. However, thicker layers can also be included, such as skin layers at the outer surfaces of the multilayer optical film, or protective boundary layers (PBLs) disposed between the multilayer optical films, that separate the coherent groupings of microlayers. Such a multilayer optical film body can also include one or more thick adhesive layers to bond two or more sheets of multilayer optical film in a laminate.

In a simple embodiment, the microlayers can have thicknesses and refractive index values corresponding to a ¼-wave stack, i.e., arranged in optical repeat units (ORUs) each having two adjacent microlayers of equal optical thickness (OT) with such optical repeat unit being effective to reflect by constructive interference light whose wavelength λ is twice the overall optical thickness of the optical repeat unit. Thickness gradients along a thickness axis of the stack of microlayers of the film (e.g., the z-axis) can be used to provide a widened reflection band.

Figure 2A:
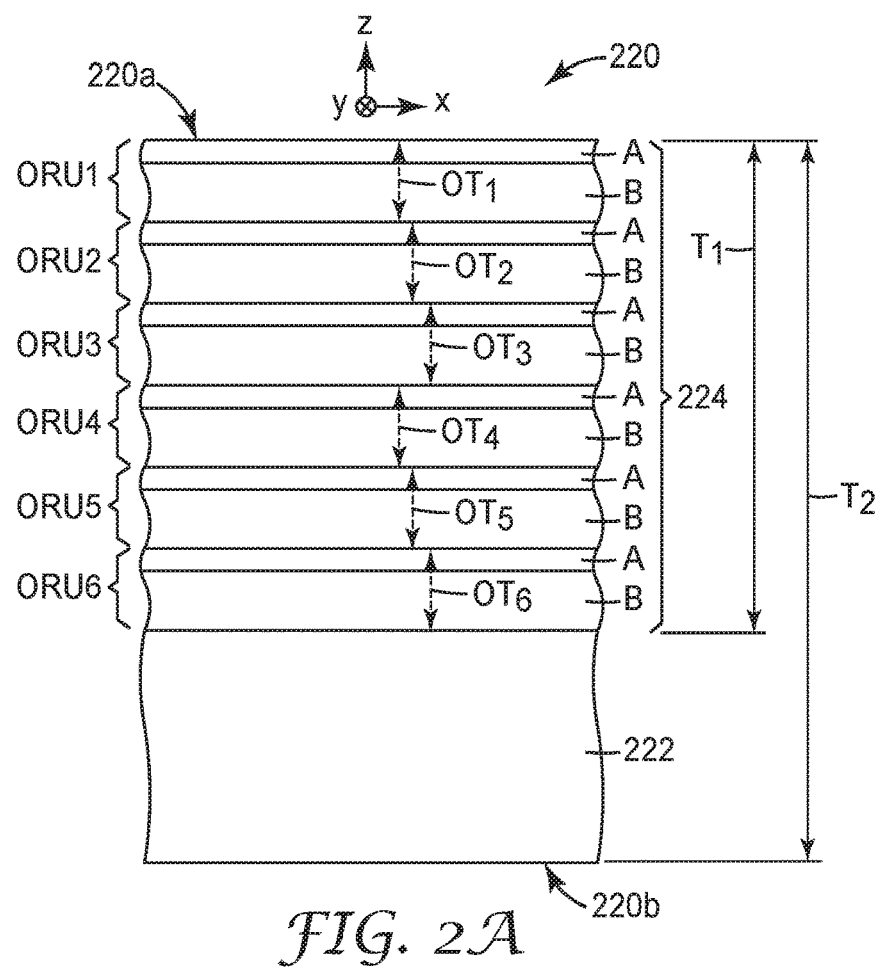
FIG. 2A is a cross-sectional view of a multilayer optical film.

A coherent grouping of microlayers is referred to herein as a stack of microlayers, or microlayer stack. As shown in FIG. 2A, the multilayer optical film stack 220, contains 224 microlayers. The stack 224 has a (physical) thickness of T1, and the multilayer optical film 220 has an overall thickness of T2, as shown in the figure. Configuring the multilayer optical film with only one coherent stack 224 of microlayers simplifies the manufacturing process (provided the number of microlayers desired is not excessive) and allows for greater control of the thicknesses and thickness profiles of the microlayers, which in turn allows for greater control of the spectral reflectivity and spectral transmission characteristics of the optical film. In FIG. 2A, pairs of adjacent microlayers form optical repeat units (ORUs), labeled ORU1 through ORU6, each ORU having an optical thickness (OT1, OT2, OT6) equal to the sum of the optical thicknesses of its constituent microlayers. Although only 6 ORUs (12 microlayers) are shown, the reader will understand that a typical single packet reflective polarizer will contain many more microlayers and ORUs to provide adequate reflectivity over a targeted spectrum. For example, the total number of microlayers in the single stack polymeric optical film may be less than 500, or less than 400, or less than 350, or in a range from 200 to 500, or from 200 to 400, or from 200 to 350, or from 225 to 325, for example. The optical thickness of an ORU determines the wavelength at which the ORU exhibits peak reflectivity. Careful control of the thicknesses of the ORUs in accordance with a desired layer thickness profile, wherein the optical thicknesses of the ORUs gradually increase from one side of the packet (e.g. near the major surface 220a) to the opposite side of the packet (e.g. near the thick layer 222), allows the packet of microlayers to provide a broad reflectivity over the visible spectrum and over a desired range of observation angles, provided a sufficient number of ORUs are present in the packet.

Thickness gradients tailored to sharpen such band edges (at the wavelength transition between high reflection and high transmission) can also be used, as discussed in U.S. Pat. No. 6,157,490 (Wheatley et al.). For polymeric multilayer optical films, reflection bands can be designed to have sharpened band edges as well as 'flat top' reflection bands, in which the reflection properties are essentially constant across the wavelength range of application. Other layer arrangements, such as multilayer optical films having 2-microlayer, optical repeat units where adjacent microlayers have unequal optical thicknesses, or films whose optical repeat units include more than two microlayers, are also contemplated. These alternative optical repeat unit designed can be configured to reduce or to excite certain higher-order reflections in the near-ultraviolet, visible or near-infrared wavelengths. See, e.g., U.S. Pat. No. 5,360,659 (Arends et al.) and U.S. Pat. No. 5,103,337 (Schrenk et al.).

Multilayer optical films can be designed to reflect one or both polarizations of light over at least one bandwidth. Through careful manipulation of these layer thicknesses and indices of refraction along the various film axes, the multilayer optical film can be made to be highly reflective for one axis of polarization, and to have a weaker, less reflective response for the orthogonal axis of polarization. Thus, for example, the multilayer optical films may be tuned to reflect strongly one polarization of light in the visible region of the spectrum while being weakly reflecting (substantially transparent) for an orthogonal polarization axis. With the appropriate choice of birefringence for the polymer microlayers, and the appropriate choice of microlayer thicknesses, a multilayer optical film can be designed to have any variation of reflection magnitude for polarized light along either of its two orthogonal in-plane axes. Exemplary materials that can be used in the fabrication of polymeric multilayer optical film stacks used in embodiments of the reflectors 12, 14 can be found in PCT Publication WO 99/36248 (Neavin et al.), incorporated herein by reference. Exemplary two-polymer combinations that provide both adequate refractive index differences and adequate inter-layer adhesion include: (1) for polarizing multilayer optical film made using a process with predominantly uniaxial stretching, PEN/coPEN, PET/coPET, PEN/sPS, PET/sPS, PEN/Eastar, and PET/Eastar, where "PEN" refers to polyethylene naphthalate, "coPEN" refers to a copolymer or blend based upon naphthalene dicarboxylic acid, "PET" refers to polyethylene terephthalate, "coPET" refers to a copolymer or blend based upon terephthalic acid, "sPS" refers to syndiotactic polystyrene and its derivatives, and Eastar is a polyester or copolyester (believed to comprise cyclohexanedimethylene diol units and terephthalate units) commercially available from Eastman Chemical Co., Kingsport, Tenn.; (2) for polarizing multilayer optical film made by manipulating the process conditions of a biaxial stretching process, PEN/coPEN, PEN/PET, PEN/PBT, PEN/PETG and PEN/PETcoPBT, where "PBT" refers to polybutylene terephthalate, "PETG" refers to a copolymer of PET employing a second glycol (usually cyclohexanedimethanol), and "PETcoPBT" refers to a copolyester of terephthalic acid or an ester thereof with a mixture of ethylene glycol and 1,4-butanediol; (3) for mirror films (including colored mirror films), PEN/PMMA, coPEN/PMMA, PET/PMMA, PEN/Ecdel, PET/Ecdel, PEN/sPS, PET/sPS, PEN/coPET, PEN/PETG, and PEN/THV, where "PMMA" refers to polymethyl methacrylate, PHEN13 a naphthalate based amorphous copolyester containing 10 to 15 mol % hexanediol in place of ethylene glycol.

Ecdel is a thermoplastic polyester or copolyester (believed to comprise cyclohexanedicarboxylate units, polytetramethylene ether glycol units, and cyclohexanedimethanol units) commercially available from Eastman Chemical Co., and THV is a fluoropolymer commercially available from 3M Company.

Further details of suitable multilayer optical films and related designs and constructions can be found in U.S. Pat. No. 5,882,774 (Jonza et al.), U.S. Pat. No. 6,531,230 (Weber et al.), PCT Publications WO 95/17303 (Ouderkirk et al.), WO 99/39224 (Ouderkirk et al.), and "Giant Birefringent Optics in Multilayer Polymer Mirrors", Science, Vol. 287, March 2000 (Weber et al.).

The multilayer optical film stacks and film bodies used in some embodiments of the back reflector 12 and the front surface partial reflector 14 can optionally include additional layers and coatings selected for their optical, mechanical, and/or chemical properties. For example, a UV absorbing layer can be added at the incident side of the optical element to protect components from degradation caused by UV light. Additional layers and coatings could also include scratch resistant layers, tear resistant layers, and stiffening agents. See e.g. U.S. Pat. No. 6,368,699 (Gilbert et al.).

FIG. 2 depicts a conventional multilayer optical film stack 200. The film 200 includes individual microlayers 202, 204. The microlayers have different refractive index characteristics so that some light is reflected at interfaces between adjacent microlayers. The microlayers are sufficiently thin so that light reflected at a plurality of the interfaces undergoes constructive or destructive interference to give the film the desired reflective or transmissive properties. For optical films designed to reflect light at ultraviolet, visible, or near-infrared wavelengths, each microlayer generally has an optical thickness (i.e., a physical thickness multiplied by refractive index) of less than about 1 μm. Thicker layers can, however, also be included, such as skin layers at the outer surfaces of the film, or protective boundary layers disposed within the film that separate packets of microlayers.

The reflective and transmissive properties of multilayer optical film 200 are a function of the refractive indices of the respective microlayers. Each microlayer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively (see FIG. 2).

In practice, the refractive indices are controlled by judicious materials selection and processing conditions. Film stack 200 can be made by co-extrusion of typically tens or hundreds of layers of two alternating polymers A, B, followed by optionally passing the multilayer extrudate through one or more multiplication die, and then stretching or otherwise orienting the extrudate to form a final film. The resulting film is composed of typically tens or hundreds of individual microlayers whose thicknesses and refractive indices are tailored to provide one or more reflection bands in desired region(s) of the spectrum, such as in the visible or near infrared. To achieve high reflectivities with a reasonable number of layers, adjacent microlayers preferably exhibit a difference in refractive index ($\Delta n_x$) for light polarized along the x-axis of at least 0.05. If the high reflectivity is desired for two orthogonal polarizations, then the adjacent microlayers also preferably exhibit a difference in refractive index ($\Delta n_y$) for light polarized along the y-axis of at least 0.05. If desired, the refractive index difference (mismatch) ($\Delta n_z$) between adjacent microlayers for light polarized along the z-axis can also be tailored to achieve desirable reflectivity properties for the p-polarization component of obliquely incident light. For ease of explanation, at any point of interest on a multilayer optical film the x-axis will be considered oriented within the plane of the film such that the magnitude of $\Delta n_x$ is a maximum. Hence, the magnitude of $\Delta n_y$ can be substantially equal to or less than the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1,2 are chosen so that nix $n_{2x}$, i.e., $\Delta n_x \leq 0$. The "high" index material, defined as the material with the higher x-axis in-plane index, and the "low" index material is defined as the material with the lower x-axis in-plane index.

To maintain high reflectivity of p-polarized light at oblique angles of incidence, the z-index mismatch $\Delta n_z$ between microlayers can be controlled to be substantially less than the maximum in-plane refractive index difference $\Delta n_x$, such that $\Delta n_z \leq 0.5 * \Delta n_x$. More preferably, $\Delta n_z \geq 0.25 * \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

Alternatively, the multilayer optical film can have a simpler construction in which all the polymeric microlayers are isotropic in nature, i.e., $n_x=n_y=n_z$ for each layer. Furthermore, known self-assembled periodic structures, such as cholesteric reflecting polarizers and certain block copolymers, can be considered multilayer optical films for purposes of this application. Cholesteric mirrors can be made using a combination of left- and right-handed chiral pitch elements.

In traditional reflecting and transmitting films, light can be polarized in two orthogonal planes, where the electric vector of the light, which is transverse to the propagation of the light, lies within a plane of polarization. In turn, the polarization state of a given light ray can be resolved into two different polarization states: p-polarized and s-polarized light. P-polarized light is light that is polarized in the plane of incidence of the light ray and a given surface, where the plane of incidence is a plane containing both the local surface normal vector and the light ray propagation direction or vector.

For example, FIG. 3 illustrates light ray 310 incident on a multilayer film 302 at an angle of incidence θ, which forms a plane of incidence 312. The multilayer film 302 includes a second axis 304 that is parallel to the y-axis, and a first axis 306 that is parallel to the x-axis. The plane of incidence 312 of ray 310 contains the first axis 306. Ray 310 has a p-polarized component that is in the plane of incidence 312, and an s-polarized component that is orthogonal to the plane of incidence 312. The p-polarized light of ray 310 has components both along the first axis 306 of multilayer film 302, and along the z-axis of the film, and will, therefore, be reflected and transmitted by the film in accordance to the values of $\Delta n_x$ and $\Delta n_z$, while the s-polarized light of ray 310 is parallel to the second axis 304 of the film 302 and be will be transmitted and reflected in accordance to the value of $\Delta n_y$. Further, FIG. 3 illustrates ray 320 incident on film 302 in a plane of incidence 322 that is parallel to the second axis 304 of the film 302. Therefore, the p-polarized light of ray 320 has components both along the second axis 304 of the film 302, and along the z-axis of the film, while the s-polarized light of ray 320 is parallel to the first axis 306 of film 302. The p-polarized light of ray 320 will, therefore, be reflected and transmitted by the film in accordance to the values $\Delta n_y$ and $\Delta n_z$, while the s-polarized light of ray 320, parallel to the second axis 306 of the film 302, will be transmitted and reflected in accordance to the value of $\Delta n_x$. Note that light that is unpolarized, has an equal amount of p-polarized and s-polarized light.

The plane of incidence for an arbitrary ray incident on film 302 may not contain either of the optical axes 306 and 304, but rather may intersect the film plane 302, along an axis that lies between optical axes 306 and 304. In this instance, the reflection and transmission properties of a multilayer film will depend on the values of $\Delta n_x$, $\Delta n_y$ and $\Delta n_z$ for p-polarized light, and will depend on $\Delta n_x$ and $\Delta n_y$ for s-polarized light. The degree to which $\Delta n_x$ and $\Delta n_y$ influence the reflection and transmission properties of the multilayer film (for both p-polarized and s-polarized light), will depend in complex detail on the angle of intersection of the plane of incidence with film plane 302, relative to the orthogonal optical axes 304 and 306. These details of reflection and transmission properties of a multilayer film with birefringent material refractive indices, can be computed using a Berriman 4×4 matrix multilayer optical response calculation algorithm, or another suitable computational algorithm that solves Maxwell equations for birefringent, stratified media.

Assuming that the film 302 is a perfect polarizer that has a reflectance of 100% at all angles of incident light for polarized light with component in the first axis, and 0% at all angles of incident light for polarized light with component in the second axis, the polarizer film transmits s-polarized light of ray 310 and the p-polarized light of ray 320, while reflecting the p-polarized light of ray 310 and the s-polarized light of ray 320. In other words, the film 302 will transmit a combination of p- and s-polarized light, depending on the orientation of the plane of incidence. If the incident light is unpolarized (an equal combination of p- and s-polarized light), then for this perfect polarizer the reflection and transmission characteristics with be symmetric, meaning the same for any orientation of the plane of incidence. If the incident light is linearly polarized (p- or s-polarized light), then for this perfect polarizer the reflection and transmission characteristics with be strongly asymmetric, meaning the p- and alternately, the s-polarized light reflection and transmission will be strongly dependent on the orientation of the plane of incidence. The details of the amount of transmission and reflection of p- and s-polarized light will depend on the material characteristics of the polarizer film, as is further described herein.

Assuming that the film 302 is a perfect reflector with a reflectance of 100% at all angles of incident light for polarized light with component in both the first axis and in the second axis, then the reflector strongly reflects s-polarized light of ray 310 and the p-polarized light of ray 320, and is strongly reflecting of the p-polarized light of ray 310 and the s-polarized light of ray 320. In other words, the perfect reflector film 302 will be symmetric in its reflection properties, for both p-polarized and s-polarized incident light, for any arbitrary plane of incidence, as well as for unpolarized incident light.

For realistic, (not "perfect") embodiments of multilayer film 302, the amount of transmission and reflection of s-polarized and p-polarized light, for planes of incidence 312 and 322, and the asymmetric nature of the reflection and transmission properties, will depend on the characteristics of the multilayer film as is further described herein.

In general, various reflective films can be provided for use as a MOF front surface partial reflector 14 by altering the relative degree of index match of the low index material with each of the x, y and z indices of the adjacent birefringent high index material. In some embodiments, relatively large in-plane index mismatches are required along both in-plane optical axes of the reflective film. If the in-plane index mismatches are nearly equal for both in-plane optical axes, then the reflection and transmission characteristics are nearly symmetric, or weakly asymmetric, for both polarized and unpolarized incident light. An example of such a film is Vikuiti Enhanced Specular Reflector (ESR) (available from 3M Co.), which has high reflectivity for all polarizations of light for all planes of incidence.

For other multilayer optical films 302, the in-plane index mismatches may be significantly different from each other, thus producing a strongly asymmetric transmission and reflection properties for polarized light. An example of this is a conventional reflective polarizing film where in-plane indices are substantially matched along a first optical axis, and strongly mis-matched along a second optical axis, resulting in a strongly asymmetrical reflector film for polarized light. An example of such films is DBEF (available from 3M Co.), which has low reflectivity for light polarized with component along one in-plane axis, and high reflectivity for light polarized with component along the second, orthogonal in-plane axis.

Weakly asymmetric reflective film or films utilized for the MOF front surface partial reflector 14 can include a high index material that is near-uniaxially birefringent having indices of $n_{x1} \sim = n_{y1} \gg n_{z1}$. This can be achieved via a biaxial stretch (along the transverse direction and the length direction) of some materials, or an asymmetrical orientation of these or other materials. This high index material relationship, combined with the appropriate low index enables the design of an MOF front surface partial reflector 14, that simultaneously meets the following criteria:

The values of $\Delta n_y$ and $\Delta n_y$, in the film stack should be small so that a substantial transmission (e.g., 80% to 60%) can be achieved for the normally incident light with a relatively large number of layers. These criteria relate to reflected color control for near-normal observation angles for the MOF article 10 of FIG. 1.

The values of $\Delta n_x$ and $\Delta n_y$ should be substantially equal, ensuring the reflection and transmission properties of MOF front surface partial reflector 14, be weakly asymmetric, or nearly symmetric. $\Delta n_x$ should be selected to be much larger than $\Delta n_x$ and $\Delta n_y$ and, is of the opposite sign. In some embodiments, this design enables specular reflectivity that substantially increases with angle of incidence, and a transmission that substantially decreases with angle of incidence, where the reflectivity and transmission is for unpolarized or polarized visible light, for any plane of incidence as described in FIG. 3. In some embodiments, the increasing reflectivity and decreasing transmission with increasing incidence angle may be referenced to a select portion of the visible spectrum, such as the blue wavelengths, or, for red wavelengths.

Figure 4:
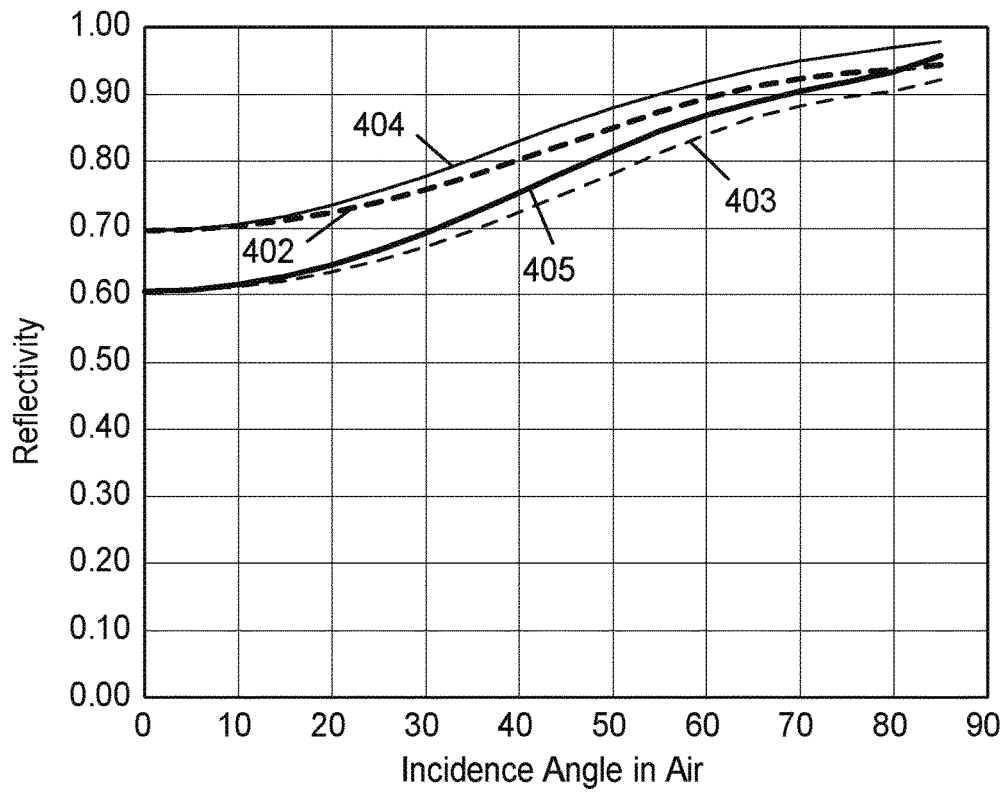
FIG. 4 is a graph of reflectivity versus incidence angle in air for one embodiment of a nearly symmetric reflective film.
Figure 5:
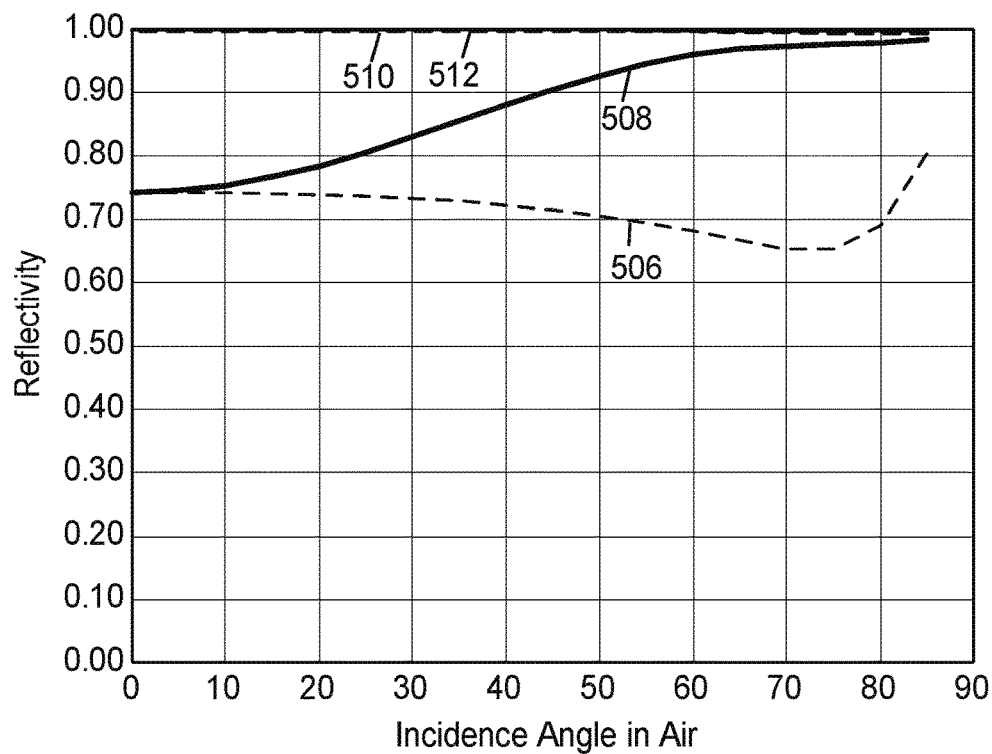
FIG. 5 is a graph of reflectivity versus incidence angle in air for an embodiment of an asymmetric reflective film.

For example, FIGS. 4 and 5 illustrate reflectivity characteristics versus angle of incidence for various embodiments of a MOF front surface partial reflector 14.

FIG. 4 illustrates reflectivity versus incident angle for light in air for one non-limiting example embodiment of a MOF front surface partial reflector 14 as modeled using standard modeling techniques. A front surface partial reflector 14 having the visible-average reflectivities shown in FIG. 4 can be formed using a coPEN/PETG coextruded multilayer film using a sequential length orientation process, followed by a transverse orientation, as in a standard film tenter. Alternately, a simultaneous length and transverse orientation process can be used. The refractive indices for the microlayers of coPEN are $n_{x1}=1.695$, $n_{y1}=1.678$, and $n_{z1}=1.499$. And the indices for the microlayers of PETg are $n_{x2}=n_{y2}=n_{z2}=1.566$. Using about 300 layers, the reflectivities as a function of incidence angle shown in FIG. 4 can be achieved for light from 400 to 700 nm with polarization vectors lying in the y-z plane (plane of incidence 322 of FIG. 3), and with polarization vectors lying in the x-z plane (plane of incidence 312, of FIG. 3). Curve 402 represents the reflectivity of p-polarized light for plane of incidence 312 and curve 404 represents the reflectivity of s-polarized light for plane of incidence 322. Curve 403 represents the reflectivity of p-polarized light for plane of incidence 322 and curve 405 represents the reflectivity of s-polarized light for plane of incidence 312. The reflectivity values include the reflections from the multilayer film and surface reflections at the air/film boundary.

Referring to FIG. 4, the reflectivity for both s-polarized and p-polarized light increases with increasing angle of incidence. This single film can thus perform the task of multiple films to form a front surface partial reflector that transmits controlled amounts of light, depending on the incidence angle upon the film. In general, the use of a high index near-uniaxially birefringent material, such as the weakly asymmetric, partial reflective film described in FIG. 4, allows for design of nearly symmetric reflectors that are highly transmissive for near-normal angles of incidence, and that become strongly reflective as incidence angles increase towards grazing. As stated herein, the MOF front surface partial reflector 14 can provide increasing reflectivity for both s-polarized and p-polarized light as a function of angle of incidence. This effect can produce an angular "gain" in the MOF article 10 of FIG. 1 which is like the effect of prismatic "BEF" films, or gain diffuser films. This occurs for embodiments of article 10 (FIG. 1) where there is a high-haze form of element 16, backed by a highly reflective, broadband reflector 12. With the MOF front surface partial reflectors 14, the high reflectivity at oblique angles recycles obliquely scattered rays that are recycled in the MOF article 10 to low angle, near-normal rays that have a higher probability of transmission. In this manner, more light back-reflects the construction 10 near normal incidence than at high angles. In some embodiments of the MOF article 10 in which the underlying elements back reflector 12 and absorber layer 16 are very diffusely reflective, this effect will be particularly pronounced.

FIG. 5 illustrates the first and second axis visible-average reflectivity versus incident angle for light in air for a strongly asymmetric embodiment of a MOF front surface partial reflector 14 as modeled using standard modeling techniques. A MOF front surface partial reflector 14 having the reflectivities shown in FIG. 5 can be formed using an coPEN/ PMMA coextruded multilayer film using a constrained uniaxial orientation as in a standard film tenter.

Using about 300 layers, the reflectivities shown in FIG. 5 can be achieved for light from 400 to 700 nm with polarization vectors laying in the y-z plane, and in the x-z plane. The refractive indices for the microlayers of coPEN are $n_{x1}=1.82$, $n_{y1}=1.61$, and $n_{z1}=1.52$. And the indices for the microlayers of PMMA are $n_{x2}=n_{y2}=n_{z2}=1.49$. Curve 506 represents the reflectivity of p-polarized light for the plane of incidence 322 of FIG. 3, and curve 508 represents the reflectivity of s-polarized light for the plane of incidence 312, of FIG. 3. Curve 510 and 512 represents the reflectivity of the p- and s-polarized light for planes of incidence 312 and 322 of FIG. 3, respectively. The reflectivity values include the reflections from the multilayer film and surface reflections at the air/film boundary.

Index $n_{z2}$ is slightly less than $n_{z1}$, and the reflectivity p-polarized light for plane of incidence 322 of FIG. 3, (curve 506) decreases with increasing angle of incidence, as illustrated in FIG. 5. As shown in FIG. 5, the reflectivity for s-polarized light increases substantially as a function of angle of incidence. In summary, referring to FIGS. 4 and 5, by selecting the refractive index value of the low index material in a range between the high index material values of $n_{y1}$, $n_{x1}$ and $n_{z1}$, the relative strengths of s-polarized and p-polarized reflectivity can be controlled as a function of angle. In this manner, the angular control of the observed color of innovative article 10, of FIG. 1, can be achieved.

In some embodiments, the MOF front surface partial reflector 14 also has a sloped reflection and transmission spectrum. In some embodiments, the front surface partial reflector 14 has a blue-sloped transmission spectrum for light incident in both planes of incidence for either a usable polarization state, or for unpolarized light in any plane of incidence. Some characteristics of "sloped" transmission spectra are illustrated in FIGS. 6-7.

Figure 6:
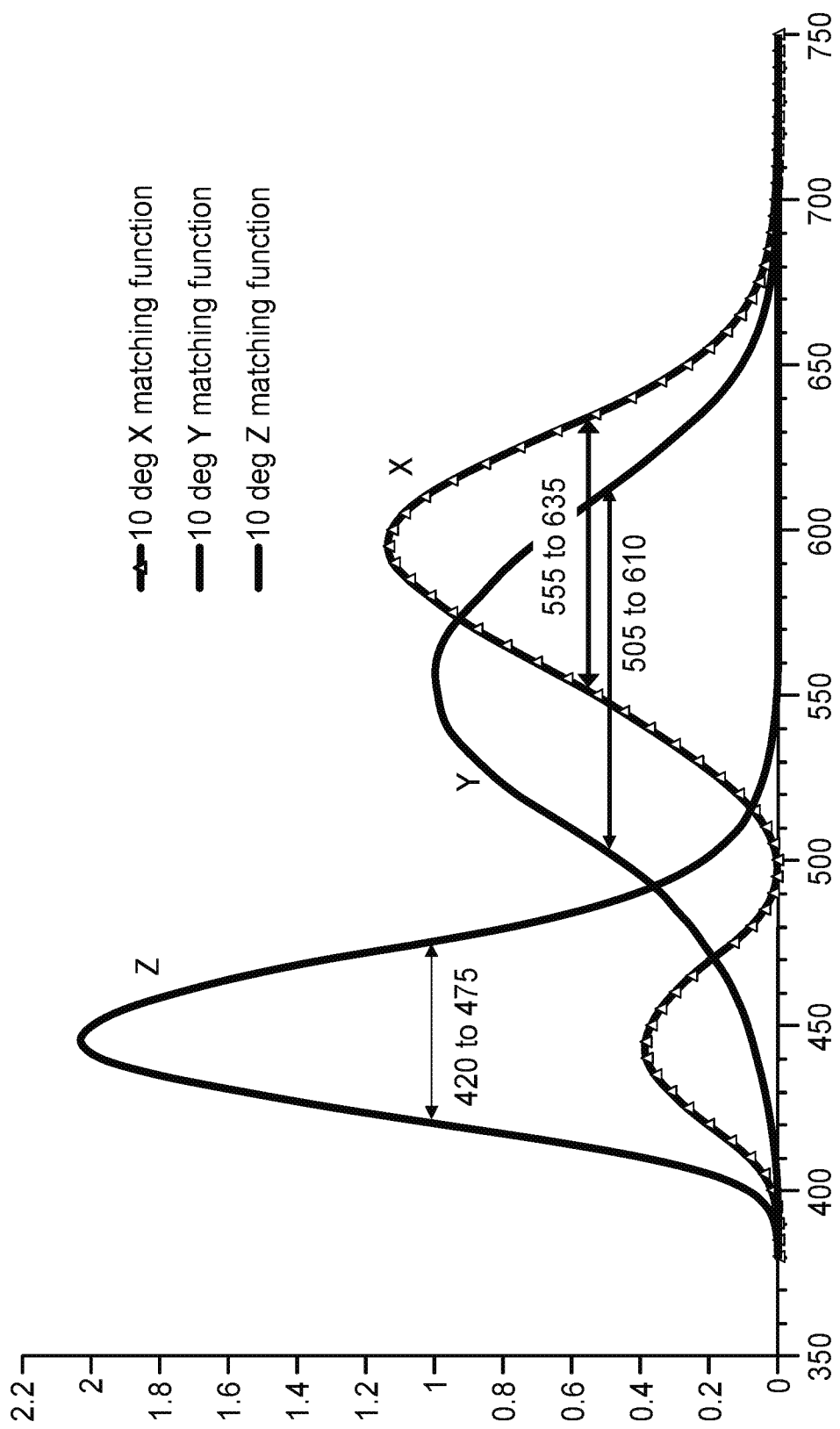
FIG. 6 is a RGB Color Matching Function (CIE 1931) for the human eye response to light in the visible wavelength range.
Figure 7A:
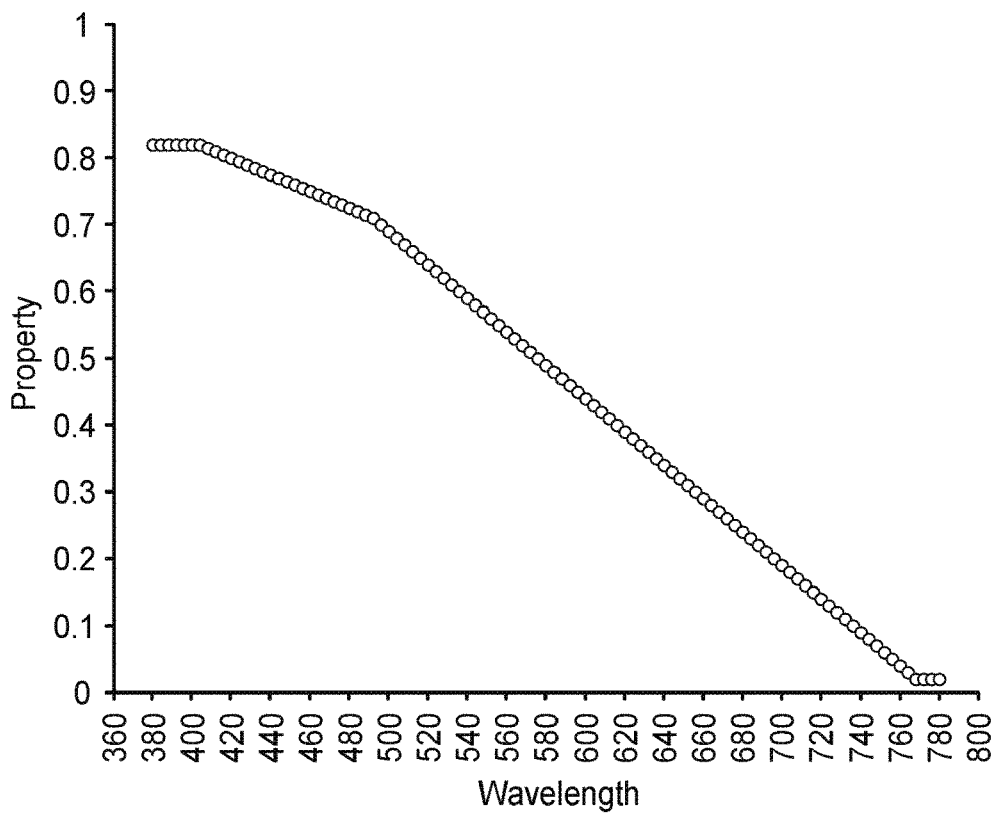
FIGS. 7A-7E are graphs illustrating quantitative definition for spectra slope.
Figure 7B:
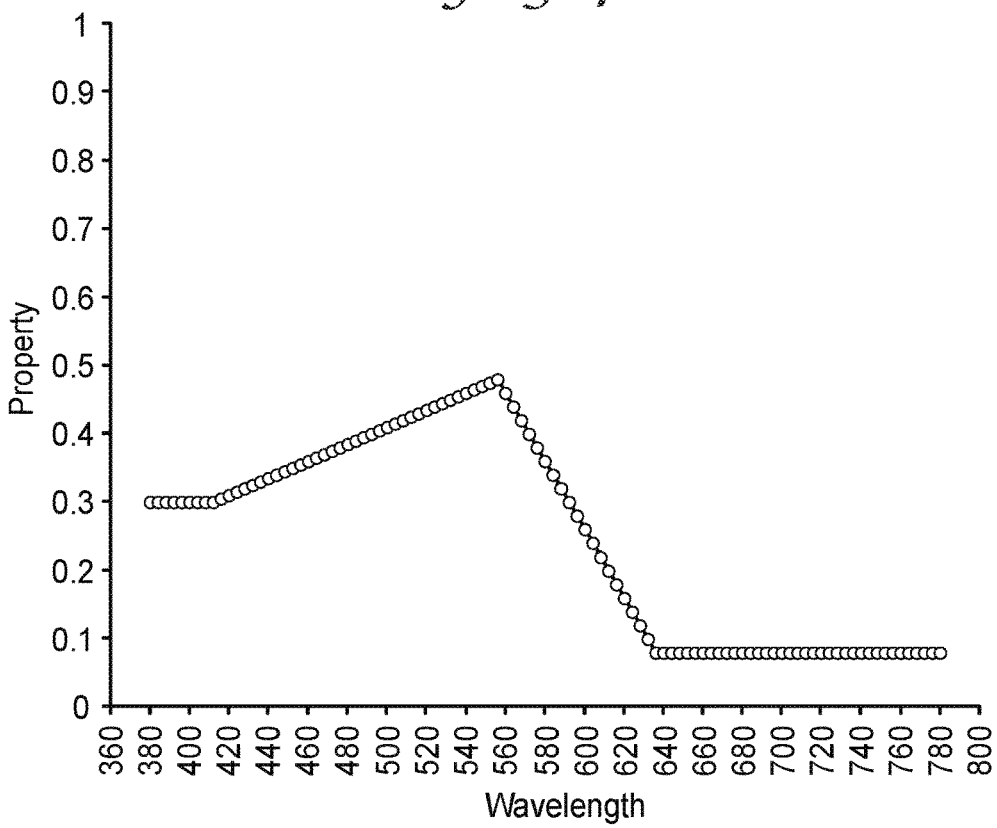
Figure 7C:
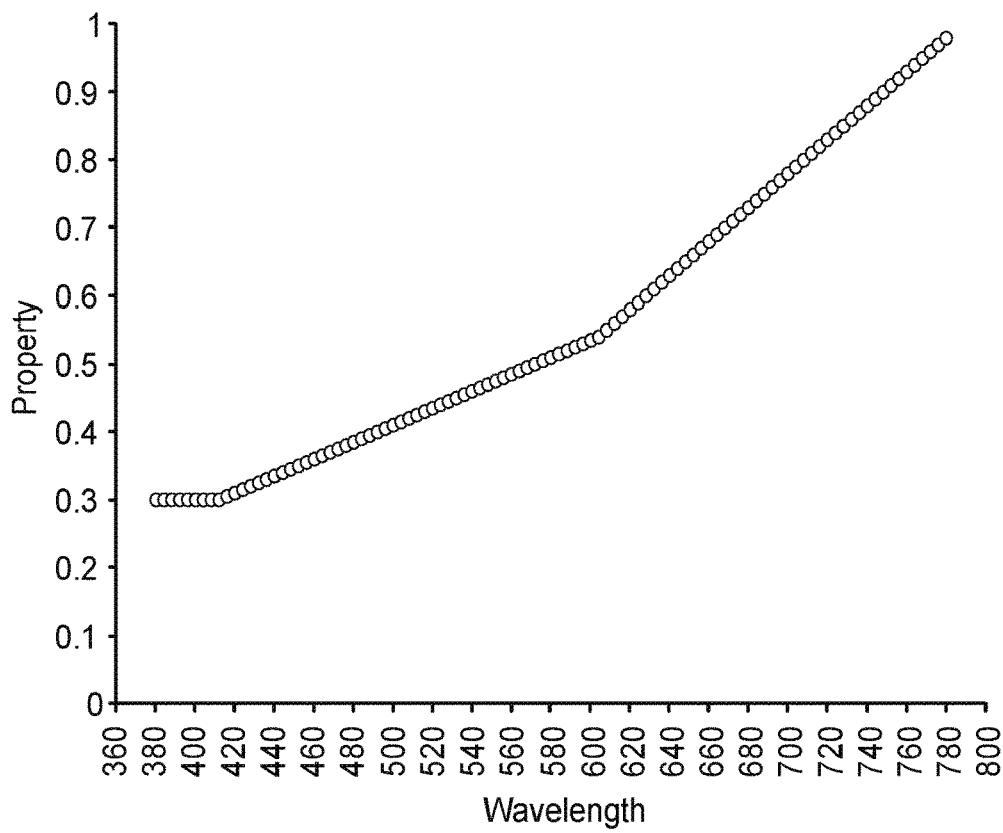
Figure 7D:
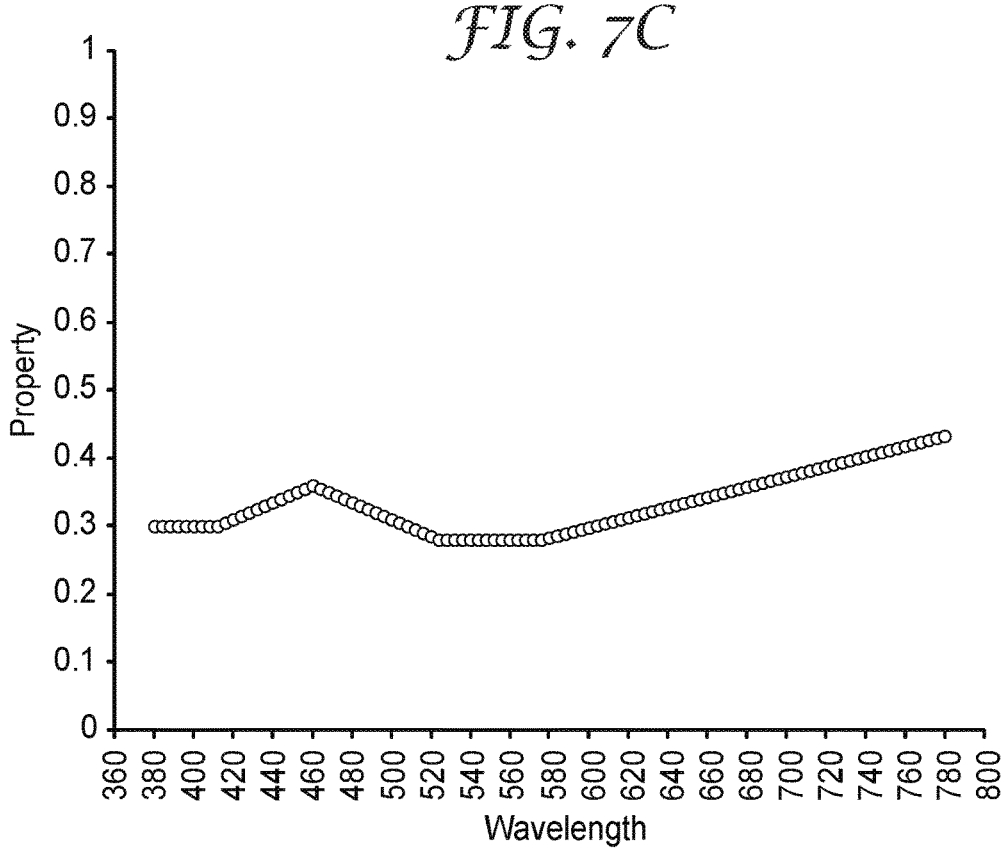
Figure 7E:
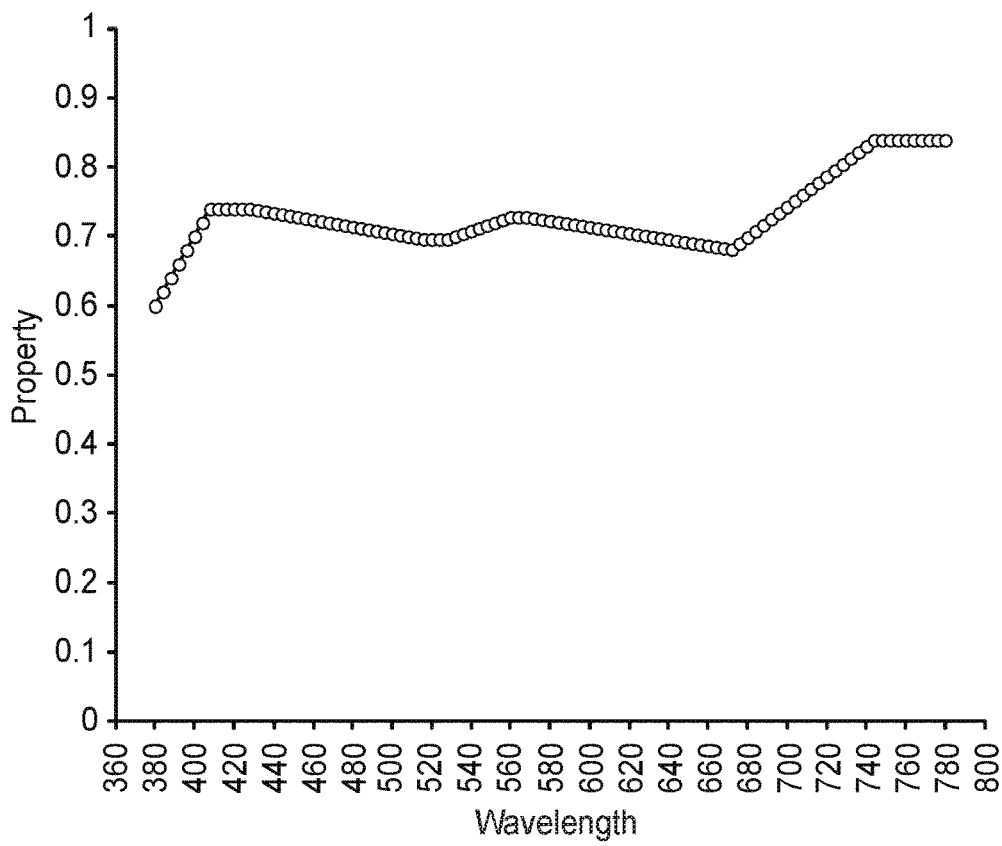

FIG. 6 shows the broadly accepted RGB Color Matching Functions (CIE 1931) for the human eye response to light in the visible wavelength range. The plot segregates the visible wavelength region into specific wavelength areas, corresponding to human perception of colors blue, green and red. For convenience of defining a sloped spectral characteristic, we will use the full-width at half-height wavelength ranges for the RGB Color Matching Functions, corresponding to the blue, green and red portions of the visible wavelength range (420 nm to 475 nm for blue, 505 nm to 610 nm for green, and 555 nm to 635 nm for red). Analysis of the average within each wavelength range (i.e., bin) of a given spectral property (transmission, reflection, etc.), referred to as the bin average, provides a characterization of spectral slope.

FIGS. 7A through 7E illustrate a definition of spectral slope (or lack of slope) by comparing the relative bin values from each of the three visible wavelength bins. The bin values in this case are the averages of the transmission values for each wavelength range. We define the range among bins as the difference between the maximum bin value divided by the 3-bin average, and the minimum bin value divided by the 3-bin average. If the range among bin values exceeds 15%, then the spectrum is considered sloped, with its color characteristic given by the color of the bin that has the maximum value of bin value divided by the 3-bin average. If the range among bins is less than 15%, then the spectrum is considered constant (unsloped) with a color characteristic of neutral. It is understood that the spectrum for which a slope is being determined, can be a transmission spectrum or a reflection spectrum.

Table 2 illustrates this quantitative definition for the spectra shown in FIGS. 7A through 7E.

TABLE 2

| | Sloped or constant | Bin values | Color characteristic | Range among bin values |
|---|---|---|---|---|
| 4a | Sloped | Blue: 0.77 Green: 0.55 Red: 0.45 | Blue-sloped | 54% |
| 4b | Sloped | Blue: 0.34 Green: 0.39 Red: 0.28 | green-sloped | 33% |
| 4c | Sloped | Blue: 0.34 Green: 0.48 Red: 0.54 | red-sloped | 43% |
| 4d | Sloped | Blue: 0.34 Green: 0.29 Red: 0.30 | blue-sloped | 16% |
| 4e | Constant | Blue: 0.73 Green: 0.71 Red: 0.72 | neutral | 3% |

Sloped transmission spectra with an appropriate slope and color characteristic can significantly increase the level of collimation (i.e., increased visible reflection at a specific visible wavelength range, with increasing incidence angle) over that generated with a neutral (unsloped) multilayer construction, even where the coextruded polymer microlayers have been oriented under suitable conditions to produce desired refractive index relationships and desired reflectivity characteristics. In addition, it is understood that spectral reflection bands from multilayer interference reflectors move to shorter wavelengths with increasing incidence angle.

Figure 8:
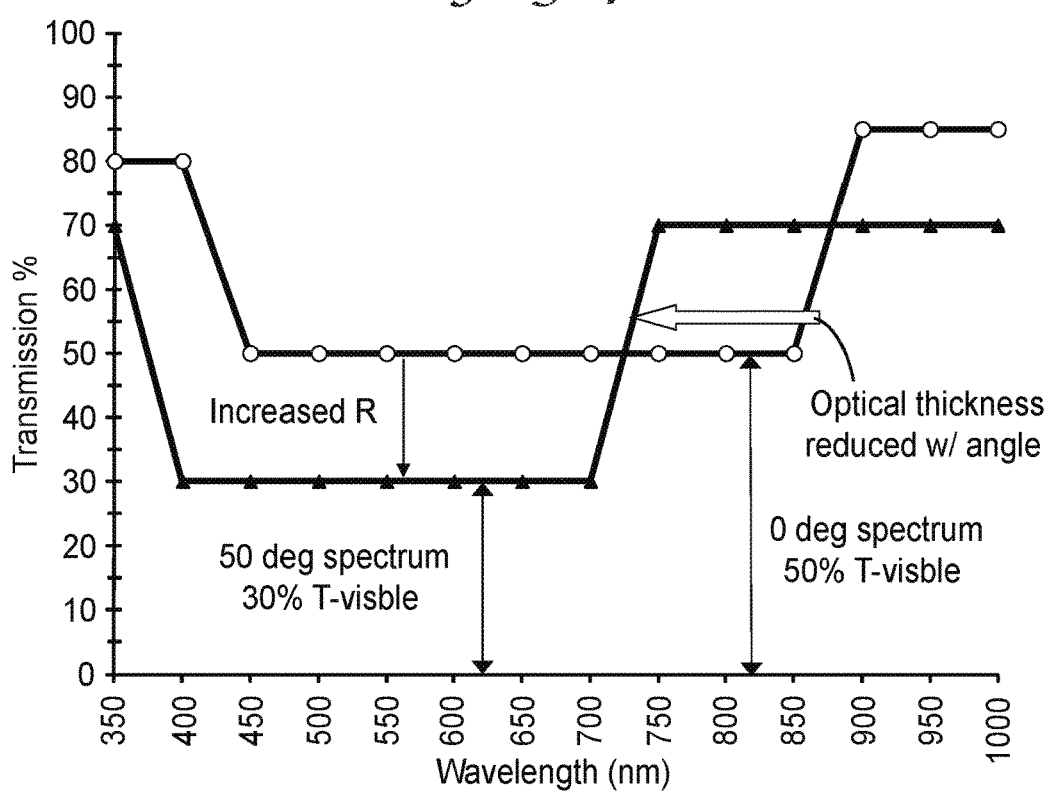
FIG. 8 is a graph illustrating the effects of a polymeric multilayer optical film having increasing reflectivity with angle, due to its constituents' refractive index relationships.
Figure 9:
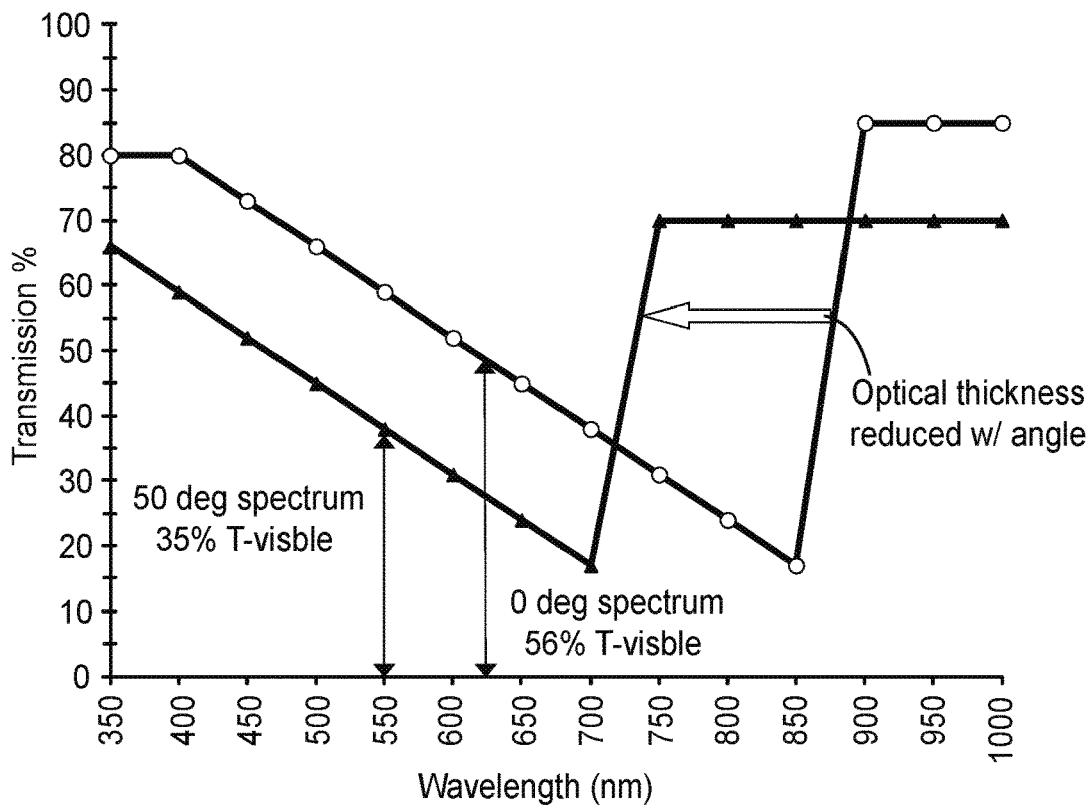
FIG. 9 is a graph illustrating the effects of a polymeric multilayer optical film having a sloped transmission spectra that moves to shorter wavelengths with increasing incidence angle.
Figure 10:
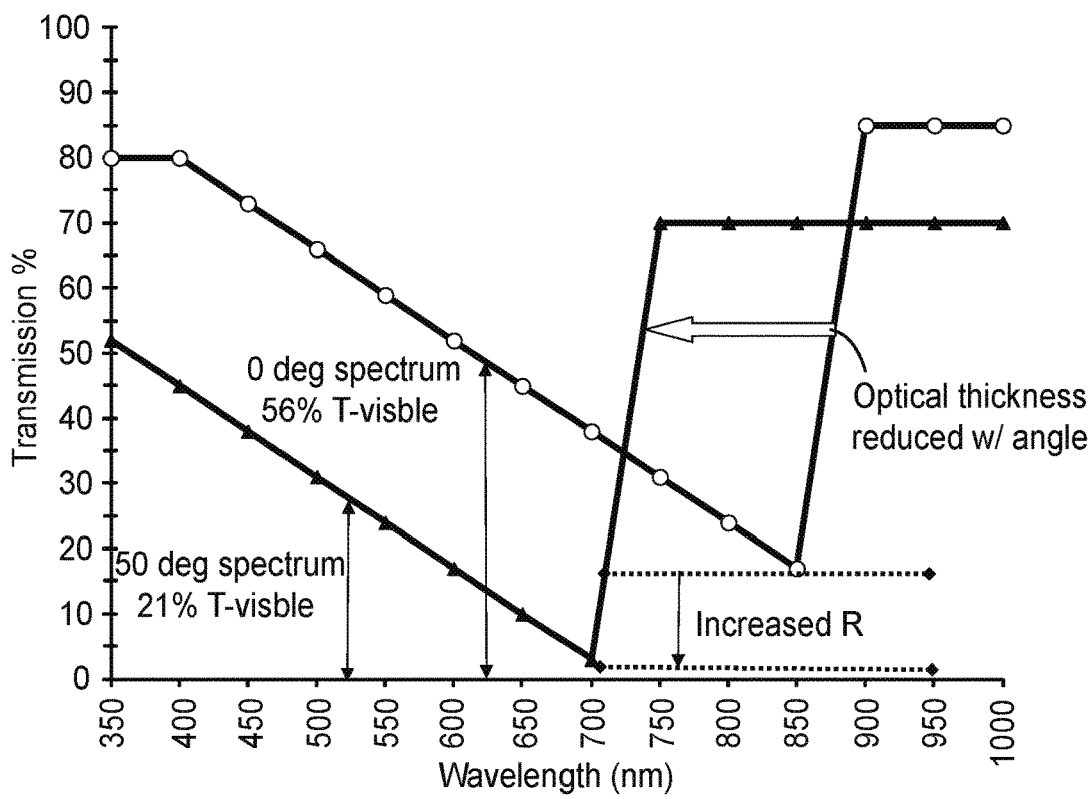
FIG. 10 is a graph illustrating the combined effects of a polymeric multilayer optical film having both increasing reflectivity with angle, due to its constituents' refractive index relationships, and a sloped transmission spectra that moves to shorter wavelengths with increasing incidence angle.

FIGS. 8-10 illustrate the combined effects of a polymeric multilayer optical film having both increasing reflectivity with angle, due to its constituents' refractive index relationships, and a sloped transmission spectrum that moves to shorter wavelengths with increasing incidence angle. Note that the values of reflectivity in these figures are only illustrative, and that low loss polymers allow one to assume that T%=100%−R%. Spectra of achievable film designs are presented herein. In each of FIGS. 8-10, the transmission spectrum can be either for light polarized along a preferred axis, or for randomly polarized light.

FIG. 8 is a block diagram representation of a transmission spectrum at two angles of incidence. This representation illustrates an instance where the coextruded polymer microlayers have been oriented under suitable conditions to produce refractive index relationships where no Brewster angle exists for p-polarized light, and thus the reflectivity of the p-polarized light increases significantly with incidence angle. Or it may represent the more general case of s-polarized light reflectivity increase with increasing incidence angle.

Note in FIG. 8 that blue-shift in optical thickness (wavelength location of reflection band) of the spectrum with the change in angle, has no effect on the degree of collimation because the lateral shift of this broadband spectrum has no effect on the transmission of visible light (visible light can be defined as approximately 400 to 700 nm, or 420 to 680 nm, or 430 to 650 nm depending on the system requirements). Only the increase in visible light reflectivity contributes to the collimation process.

Now consider the schematic sloped (blue-sloped) spectra for p-polarized light shown in FIG. 9 for a polymeric multilayer optical film that has the z-indices matched for alternating polymer layers. Firstly, recall that a multilayer interference reflector having matched z-indices has substantially no increase or decrease in reflectivity for p-polarized light, as angle of incidence increases, although the band will shift to shorter wavelengths like any other multilayer interference reflector. The bandwidth is sufficiently wide so the long-wave bandedge is beyond the edge of the visible spectrum for all angles of incidence of interest. Although the magnitude of the reflectivity does not change with angle of incidence for p-polarized light, the blue slope of the spectrum will cause the visible-average transmission of the spectrum in FIG. 9 to decrease as the angle of incidence increases. Stated another way, the lateral shift of the blue-sloped spectrum causes the reflectivity of a specific wavelength to increase with angle, even though the spectral curve is not shifted in the vertical direction. For this reason, such a film can act to collimate light from a recycling backlight. If the spectra of FIG. 9 were constant (unsloped), there would be substantially no collimation.

FIG. 10 shows sloped spectra for a polymeric MOF designed and processed to produce refractive index relationships where reflectivity increases for either s-polarized light or p-polarized light, or both, as a function of angle of incidence. It can be seen from FIG. 10 that collimation now results from both the angle shift of the spectrum as well as the increased reflectivity of the film with angle of incidence. In some embodiments, the magnified collimation effect illustrated in FIG. 10 for a blue-sloped transmission spectrum can produce a controlled change in color of the light emitted by the MOF film article 10 of FIG. 1, ranging across color space from blue, to green, to yellow, to red, or no change giving neutral white, depending on the relationship among the optical characteristics of the components of the MOF film article 10.

A MOF front surface partial reflector 14 with a blue-sloped transmission spectrum can provide enhanced collimation of red, green and blue light when used as the front surface partial reflector of the MOF article 10. The blue-sloped reflector can be an asymmetric reflector with higher transmission for light polarized on one axis compared to the other axis. The sloped spectrum can be for light polarized parallel to either axis, or for unpolarized transmitted light. For any lighting system that needs a substantially polarized output, the highest efficiency is attained when the pass-axis light of the film is transmitted and has a blue-sloped spectrum. Whether the transmission refers to the total light transmission, or to the transmission related to only one axis, the slope can be one where the range among bin values is 15% or as high as 30% or 100% or from 15% to 100% or from 15% to 50%. The blue slope transmission spectrum can be at normal incidence, or it can be at oblique transmission angles such as 45 degrees, or 50 or 60 degrees. At oblique angles, the spectrum for p-polarized light, or for s-polarized light, or both, can be blue-sloped. The examples discussed In U.S. Patent Publication 2014/0254124, incorporated herein by reference in its entirety, further illustrate how to make optical stacks and film constructions that can be optimized to improve collimation.

Figure 11A:
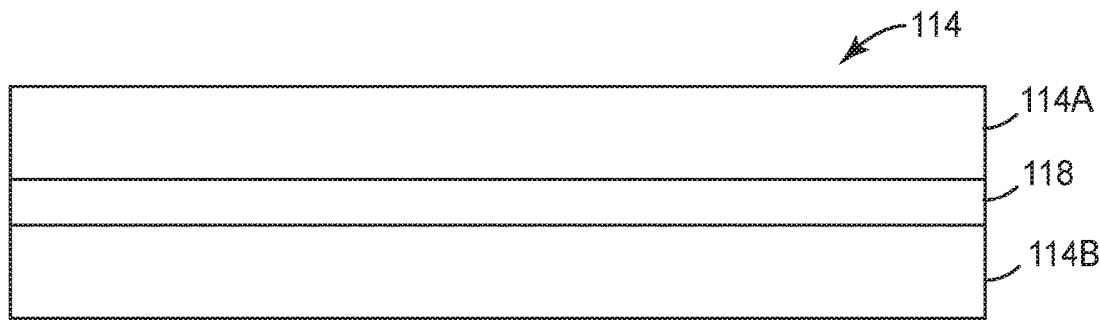
FIGS. 11A, 11B and 11C are schematic cross-sectional views of various embodiments of front surface partial reflectors.

Referring now to FIG. 11A, in some embodiments a MOF front surface partial reflector 114 can include one or more film stacks or layer constructions 114A, 114B to provide the layer 114 with selected reflectivity and transmission characteristics. The front surface partial reflector 114 can include two or more films, which can be spaced apart or in contact with each other. The films 114A, 114B can be attached using any suitable technique such as, for example with an optional adhesive layer 118. Any suitable adhesive can be used in the layer 118, e.g., pressure sensitive adhesives (such as 3M Optically Clear Adhesives), and UV-curable adhesives (such as UVX-4856). In some embodiments, the adhesive layer 118 between films the can be replaced with an index matching fluid.

The films 114A, 114B can include any suitable films described herein, and can have similar optical characteristics or can be different constructions that provide different optical characteristics. In one exemplary embodiment, the MOF front surface partial reflector 114 is formed from a first asymmetric reflective film 114A having a pass axis in one plane, and the film 114B can include a second asymmetric reflective film having a pass axis in a second plane that is non-parallel the pass axis of the first film 114A. This non-parallel relationship can form any suitable angle between the two pass axis planes. In some embodiments, the pass axis planes can be nearly orthogonal. Such a relationship would provide a high degree of reflectivity in the pass axis for the MOF front surface partial reflector 114.

In another example, the MOF front surface partial reflector 114 may include an asymmetric reflective film 114A, and film 114B may include a prismatic brightness enhancing film such as those available from 3M Co., St. Paul, Minn., under the trade designation Brightness Enhancement Film (BEF). In some embodiments, the BEF 114B may be oriented relative to the asymmetric reflective film 114A such that the BEF 114B collimates transmitted light in a plane that is orthogonal to the collimating plane of the asymmetric film 114A.

Although the MOF front surface partial reflector 114 in FIG. 11A is depicted as including two films 114A, 114B, in some embodiments the front surface partial reflector 114 can include three or more films. For example, a three-layer front surface partial reflector can be made using three layers of reflective polarizers (such as DBEF or APF). If the three layers are arranged such that the polarization axis of the second layer is at 45° relative to the polarization axis of the first layer and the polarization axis of the third layer is at 90° relative to the polarization axis of the first layer, the resulting front reflector will reflect approximately 75% of the normal incidence light. Other angles of rotation between the layers could be used to achieve different levels of reflection. A birefringent (polarization rotating) layer or a scattering layer between two reflective polarizers with nearly orthogonal pass axes can also create reflective films that have a controlled degree of reflectivity to be used as the front reflector.

Figure 11B:
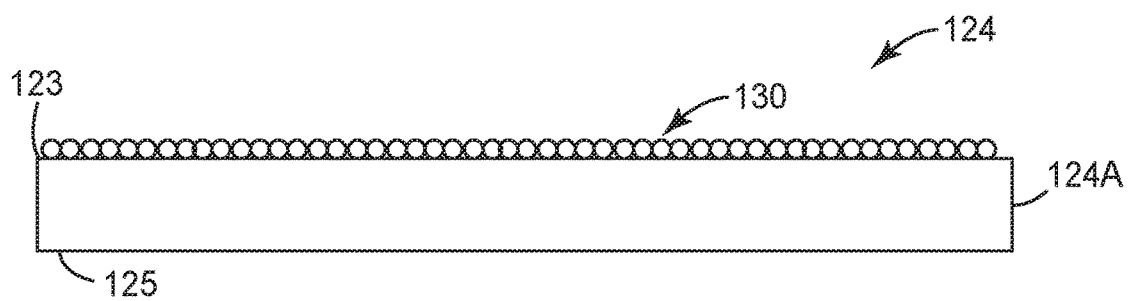

The MOF front surface partial reflectors of the present disclosure can also include optical elements positioned in or on one or more surfaces of the reflector. For example, FIG. 11B is a schematic cross-section view of a portion of another embodiment of a MOF front surface partial reflector 124. The front surface partial reflector 124 includes a film stack 124A having a first major surface 123 and a second major surface 125, which can include any suitable film(s) or layer(s) described above. A plurality of optical elements 130 are positioned on or in the first major surface 123. Although depicted as positioned only on first major surface 123, optical elements can be positioned on the second major surface 125 or on both first and second major surfaces 123, 125. Any suitable optical elements can be positioned on or in the film 124A, e.g., microspheres, prisms, cube-corners, lenses, etc. The optical elements can be refractive elements, diffractive elements, diffusive elements, etc. In this embodiment, the optical elements 130 can collimate light that is transmitted by film 124A. In other embodiments, the optical elements 130 can diffuse light either incident on the film 124A or exiting the film 124A, depending upon the positioning of the optical elements 130.

The optical elements 130 can be positioned on a major surface 123 of the film 124A or at least partially embedded in the major surface 123. Further, the film 124A can be manufactured using any suitable technique, e.g., those techniques described herein for manufacturing bead-coated ESR.

Figure 11C:
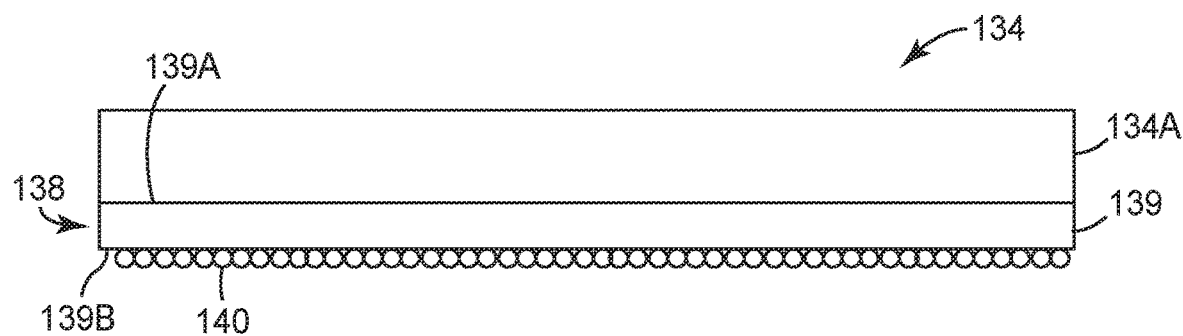

The optical elements can also be positioned on a corner or substrate that is positioned proximate the film. For example, FIG. 11C is a schematic cross-section view of a portion of another embodiment of a front surface partial reflector 134. The reflector 134 includes a film 134A and a gain diffuser 138 positioned proximate the film 134A. The film 134A can include any film(s) and/or layer(s) described herein regarding front surface partial reflectors. The gain diffuser 138 includes a substrate 139 having a first major surface 139A and a second major surface 139B, and a plurality of optical elements 140 positioned on or in the second major surface 139B of the substrate 139. Any suitable optical elements 140 can be used, e.g., optical elements 130 of FIG. 11B. The substrate 139 can include any suitable optically transmissive substrate.

For the embodiment illustrated in FIG. 11C, the first major surface 139A of the gain diffuser 139 is positioned proximate the polarizing film 134A. The diffuser 139 can be positioned proximate the film 134A such that it is spaced apart from the film 134A, in contact with the film 134A, or attached thereto. Any suitable technique can be used to attach the diffuser 139 to the film 134A, e.g., the use of optical adhesives. Any suitable gain diffuser can be used for diffuser 139. In some embodiments, the optical elements 140 can be positioned on the first major surface 139A of the substrate 139 such that the elements 140 are between the substrate 139 and the polarizing film 134A.

Figure 12A:
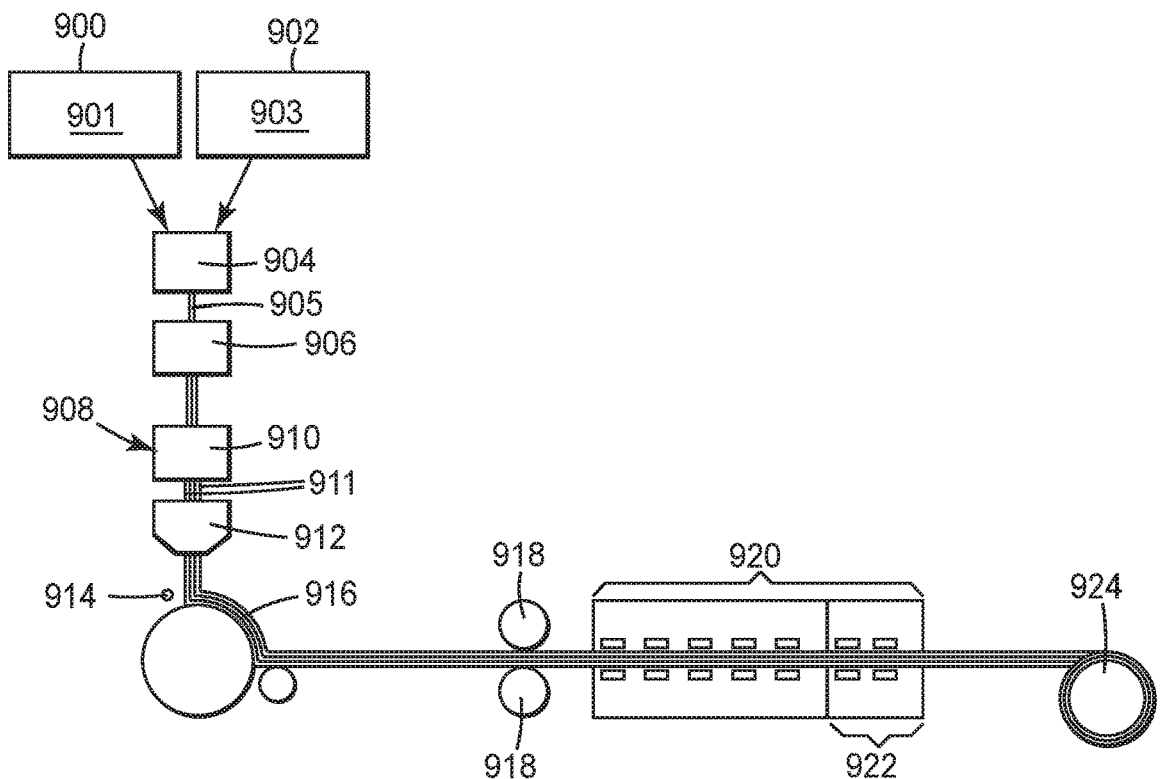
FIG. 12A is a schematic view of a method useful for the coextrusion of asymmetric reflective films.
Figure 12B:
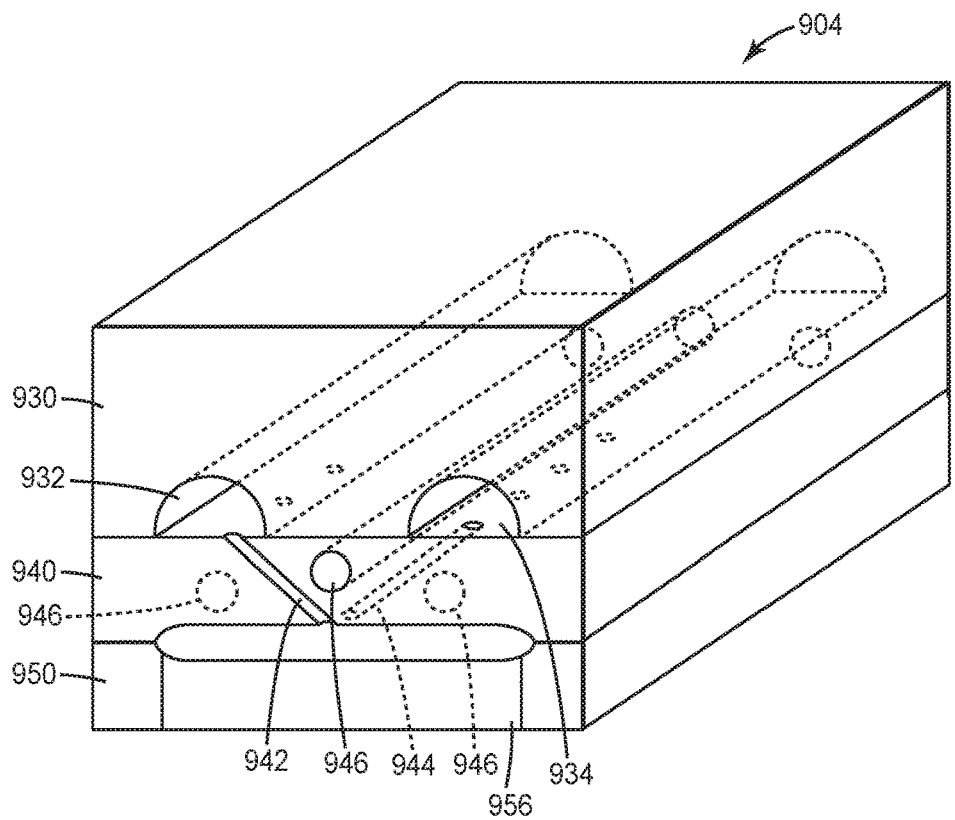
FIG. 12B is a schematic perspective view of one embodiment of a feedblock that can be used in the method illustrated in FIG. 12A.

The asymmetric reflective films of the present disclosure can be manufactured using the techniques described in U.S. Pat. No. 6,783,349 (Neavin et al.), entitled APPARATUS FOR MAKING MULTILAYER OPTICAL FILMS. For example, FIGS. 12A-12B illustrate one embodiment of a method for making asymmetric reflective films of the present disclosure. Materials 900 and 902, selected to have suitably different optical properties, are heated above their melting and/or glass transition temperatures and fed into a multilayer feedblock 904. Typically, melting and initial feeding is accomplished using an extruder for each material. For example, material 900 can be fed into an extruder 901 while material 902 can be fed into an extruder 903. Exiting from the feedblock 904 is a multilayer flow stream 905. A layer multiplier 906 splits the multilayer flow stream, and then redirects and "stacks" one stream atop the second to multiply the number of layers extruded. An asymmetric multiplier, when used with extrusion equipment that introduces layer thickness deviations throughout the stack, may broaden the distribution of layer thicknesses to enable the multilayer film to have layer pairs corresponding to a desired portion of the visible spectrum of light, and provide a desired layer thickness gradient. If desired, skin layers 911 may be introduced into the film by feeding resin 908 (for skin layers) to a skin layer feedblock 910.

The multilayer feedblock feeds a film extrusion die 912. Suitable feedblocks are described in, for example, U.S. Pat. No. 3,773,882 (Schrenk) and U.S. Pat. No. 3,884,606 (Schrenk). As an example, the extrusion temperature may be approximately 295.degree. C., and the feed rate approximately 10-150 kg/hour for each material. In some embodiments, the skin layers 911 can flow on the upper and lower surfaces of the film as it goes through the feedblock and die. These layers serve to dissipate the large stress gradient found near the wall, leading to smoother extrusion of the optical layers. Typical extrusion rates for each skin layer would be 2-50 kg/hr (1-40% of the total throughput). The skin material can be the same material as one of the optical layers or be a different material. An extrudate leaving the die is typically in a melt form.

The extrudate is cooled on a casting wheel 916, which rotates past pinning wire 914. The pinning wire pins the extrudate to the casting wheel. To achieve a clear film over a broad range of angles, one can make the film thicker by running the casting wheel at a slow speed, which moves the reflecting band towards longer wavelengths. The film is oriented by stretching at ratios determined by the desired optical and mechanical properties.

Longitudinal stretching can be done by pull rolls 918. Transverse stretching can be performed in a tenter oven 920. If desired, the film can be bi-axially oriented simultaneously. Stretch ratios of approximately 3-4 to 1 may be preferred, although ratios as small as 1 to 1 and as large as 6 to 1 may also be appropriate for a given film. Stretch temperatures will depend on the type of birefringent polymer used, but 2° to 33° C. (5° to 60° F.) above its glass transition temperature would generally be an appropriate range. The film is typically heat set in the last two zones 922 of the tenter oven to impart the maximum crystallinity in the film and reduce its shrinkage. Employing a heat set temperature as high as possible without causing film breakage in the tenter reduces the shrinkage during a heated embossing step. A reduction in the width of the tenter rails by about 1-4% also serves to reduce film shrinkage. If the film is not heat set, heat shrink properties are maximized, which may be desirable in some security packaging applications. The film can be collected on windup roll 924.

In some applications, it may be desirable to use more than two different polymers in the optical layers of the multilayer film. In such a case, additional resin streams can be fed using similar means to resin streams 900 and 902. A feedblock appropriate for distributing more than two layer types analogous to the feedblock 904 could be used.

FIG. 12B shows a schematic perspective view of one embodiment of a feedblock 904 which includes a gradient plate 930. Residing in the gradient plate 930 are at least two flow channels, a first flow channel 932 and a second flow channel 934. The flow channels are bounded by a combination of the gradient plate 930 and a feeder tube plate 940.

In the gradient plate 930, each flow channel is machined so that its cross-section has a central axis of symmetry, such as, e.g., a circle, square, or equilateral triangle. For ease of machining purposes, the square cross-section flow channel is preferably used. Along each flow channel, the cross-sectional area can remain constant or can change. The change may be an increase or decrease in area, and a decreasing cross-section is typically referred to as a "taper." A change in cross-sectional area of the flow channels can be designed to provide an appropriate pressure gradient, which affects the layer thickness distribution of a multilayer optical film. Thus, the gradient plate can be changed for different types of multilayer film constructions.

When the cross-sectional area of the flow channels is made to remain constant, a plot of layer thickness vs. layer number is non-linear and decreasing. For a given polymer flow, there exists at least one cross-sectional tapering profile which will result in a linear, decreasing dependency of layer thickness upon layer number, which is sometimes preferred. The taper profile can be found by one reasonably skilled in the art using reliable rheological data for the polymer in question and polymer flow simulation software known in the art, and should be calculated on a case by case basis.

Referring again to FIG. 12B, the feedblock 904 further contains a feeder tube plate 940 that has a first set of conduits 942 and a second set of conduits 944, each set in fluid communication with flow channels 932 and 934 respectively. As used herein, "conduits" are also referred to as "side channel tubes." Residing proximate conduits 942 and 944 are axial rod heaters 946, used to provide heat to the resin flowing in the conduits. If desired, temperature can be varied in zones along the length of the axial rod heaters. Each conduit feeds its own respective slot die 956, which has an expansion section and a slot section. The expansion section typically resides in the feeder tube plate 940. If desired, the slot section can reside in a slot plate 950. As used herein, the term "slot die" is synonymous with "layer slot." The first set of conduits 942 is interleaved with the second set of conduits 944 to form alternating layers.

In use, for example, resin A and resin B would be delivered directly to the flow channels 932 and 934. As the melt stream A and melt stream B travel down the flow channels in the gradient plate 930, each melt stream is bled off by the conduits. Because the conduits 942 and 944 are interleaved, they begin the formation of alternating layers, such as, for example, ABABAB. Each conduit has its own slot die to begin the formation of an actual layer. The melt stream exiting the slot die contains a plurality of alternating layers. The melt stream is fed into a compression section (not shown) where the layers are compressed and uniformly spread out transversely. Special thick layers known as protective boundary layers (PBLs) may be fed nearest to the feedblock walls from any of the melt streams used for the optical multilayer stack. The PBLs can also be fed by a separate feed stream after the feedblock. The PBLs function to protect the thinner optical layers from the effects of wall stress and possible resulting flow instabilities.

In some embodiments, the asymmetric reflective films of the present disclosure can be manufactured without the use of a multiplier (e.g., multiplier 906). Although multipliers greatly simplify the generation of large numbers of optical layers, they may impart distortions to each resultant packet of layers that are not identical for each packet. For this reason, any adjustment in the layer thickness profile of the layers generated in the feedblock is not the same for each packet, i.e., all packets cannot be simultaneously optimized to produce a uniform smooth spectrum free of spectral disruptions. Thus, an optimum profile and low transmission color reflector can be difficult to make using multi-packet films manufactured using multipliers. If the number of layers in a single packet generated directly in a feedblock do not provide sufficient reflectivity, then two or more such films can be attached to increase the reflectivity.

When the multiplier is removed from the method of FIG. 12A, the axial rod heaters 946 can be used to control the layer thickness values of coextruded polymer layers as is further described, e.g., in U.S. Pat. No. 6,783,349. Such axial rod heaters can be utilized both for maintaining constant temperature in the feedblock and for creating a temperature gradient of up to about 40° C. In some embodiments, the axial rod heaters are placed in a bore through the feedblock and oriented in a direction normal to the layer plane, preferably very near an imaginary line through the points where each side channel tube feeds a slot die. More preferably, in the case of coextrusion of a first polymer and a second polymer, the bores for the axial rod heaters will be located both near an imaginary line through the points where each side channel tube feeds a slot die, and equidistant from the side channel tubes carrying the first polymer and the side channel tubes carrying the second polymer. Further, the axial rod heaters are preferably of a type that can provide a temperature gradient or a multiplicity of discrete temperatures along its length, either by variation in electrical resistance along its length, or by multi-zone control, or by other means known in the art. Such axial rod heaters can control layer thickness and gradient layer thickness distribution, which is especially important in controlling the positions and profiles of reflection bands as described, e.g., in U.S. Pat. No. 6,157,490 (Wheatley et al.), entitled OPTICAL FILM WITH SHARPENED BANDEDGE; and U.S. Pat. No. 6,531,230, entitled COLOR SHIFTING FILM.

The feedblock 904 is configured such that all layers in the film stack are directly controlled by an axial rod heater 946. Layer thickness profile can be monitored during the process by using any suitable thickness measuring technique, e.g., atomic force microscopy (AFM), transmission electron microscopy, or scanning electron microscopy. The layer thickness profile can also be modeled optically using any suitable technique, and then the axial rod heaters can be adjusted based on the difference between the measured layer profile and the desired layer profile.

Although not as accurate in general as an AFM, the layer profile can also be quickly estimated by integrating the optical spectrum (integrating the −Log(1−R) vs. wavelength spectrum). This follows from the general principle that the spectral shape of a reflector can be obtained from the derivative of the layer thickness profile, provided the layer thickness profile is monotonically increasing or decreasing with respect to layer number.

The basic process for layer thickness profile control involves adjustment of axial rod zone power settings based on the difference of the target layer thickness profile and the measured layer profile. The axial rod power increase needed to adjust the layer thickness values in each feedblock zone can first be calibrated in terms of watts of heat input per nanometer of resulting thickness change of the layers generated in that heater zone. Fine control of the spectrum is possible using 24 axial rod zones for 275 layers. Once calibrated, the necessary power adjustments can be calculated once given a target profile and a measured profile. The procedure is repeated until the two profiles converge.

Figure 13:
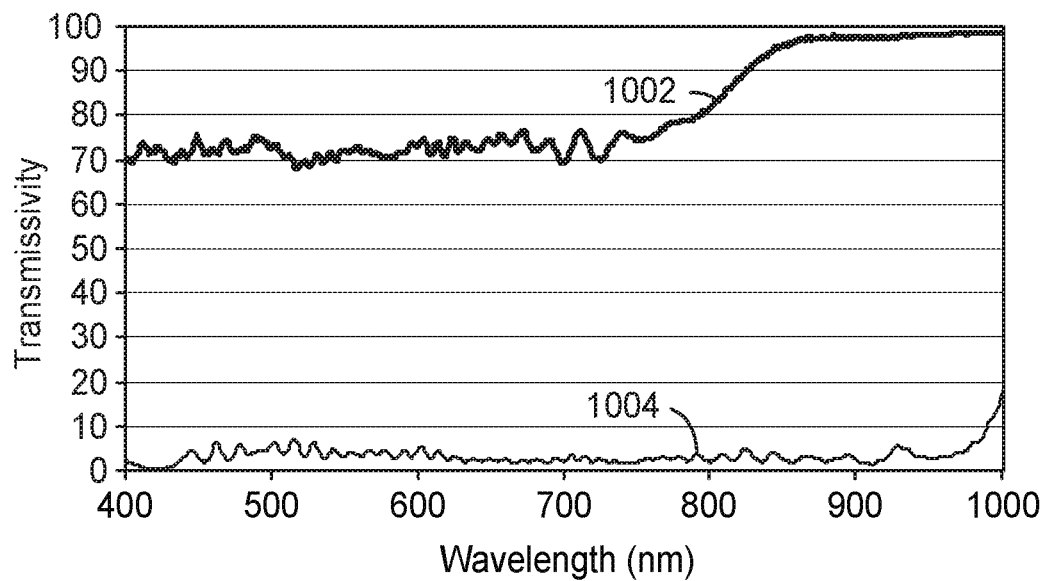
FIG. 13 is a graph of transmissivity versus wavelength of an asymmetric reflective film using the method illustrated in FIG. 12A.

For example, a film of 275 layers was made per the above technique, using a coPEN with indices of nx1=1.82, ny1=1.61, nz=1.50, and a mixture of PCTG with polycarbonate with index n2=1.57 for all directions. The measured transmission spectrum for p-polarized light at 60° angle of incidence on the pass axis is shown in FIG. 13 as curve 1002. Also shown is the transmission of the block axis as curve 1004. Note that both the block and the pass axis spectra have relatively constant transmission over a very broad band.

Referring again to FIG. 1, in some embodiments, diffusion be provided within the MOF article 10. Such diffusion can provide more angular mixing of light within the article 10, which can help spread the light and provide greater uniformity in the light directed out of the construction through an output surface. The diffusion can be provided by one or both front surface partial reflector 14 and the back reflector 12, or by one or more layers positioned between the front surface partial reflector 14 and the back reflector 12.

In some embodiments, the diffusion can include semi-specular diffusion. As used herein, the term "semi-specular reflector" refers to a reflector that reflects substantially more forward scattering than reverse scattering. Similarly, the term "semi-specular diffuser" refers to a diffuser that does not reverse the normal component of the incident ray for a substantial majority of the incident light, i.e., the light is substantially transmitted in the forward (z) direction and scattered to some degree in the x and y directions. In other words, semi-specular reflectors and diffusers direct the light in a substantially forward direction and thus are very different from Lambertian components which redirect light rays equally in all directions. Semi-specular reflectors and diffusers can exhibit relatively wide scattering angles; alternatively, such reflectors and diffusers can exhibit only small amounts of light deflection outside the specular direction. See, e.g., U.S. Pat. Nos. 8,608,363 and 9,091,408 (Weber, et al.), entitled RECYCLING BACKLIGHTS WITH SEMI-SPECULAR COMPONENTS.

Any suitable semi-specular material or materials can be used for the front and back reflectors of the present disclosure. For example, the semi-specular back reflectors 12 can include a partially transmitting specular reflector on a high reflectance diffuser reflector. Suitable specular reflectors include ESR (available from 3M Company) and other specular reflectors described herein. Suitable high reflectance diffuse reflectors include EDR II film (available from 3M); porous polytetrafluoroethylene (PTFE) films, such as those available from W. L. Gore & Associates, Inc.; Spectralon reflectance material available from Labsphere, Inc.; MCPET high reflectivity foamed sheeting from Furukawa Electric Co., Ltd.; and White Refstar film available from Mitsui Chemicals, Inc.

In another embodiment, a semi-specular back reflector 12 can include a partial Lambertian diffuser on a high reflectance specular reflector. Alternatively, a forward scattering diffuser on a high reflectance specular reflector can provide a semi-specular back reflector.

In some embodiments, the MOF front surface partial reflector 14 can be made semi-specular with constructions like the back reflector 12. For example, a partial reflecting Lambertian diffuser can be combined with a partial specular reflector. Alternatively, a forward scattering diffuser can be combined with a partial specular reflector. Further, MOF the front surface partial reflector 14 can include a forward scattering partial reflector. In other embodiments, any of the above-described front reflectors can be combined to provide a semi-specular front reflector.

Examples of commercially available high reflectance films include, but are not limited to, diffuse films like micro-voided oriented polyester (PET) film from Toray Films, and specular reflectors like ESR from 3M Co. The micro-voided film is about 95% reflective (transmission is about 4%) and is about 0.2 mm thick. ESR is about 99% reflective and is only about 0.07 mm thick. The micro-voided PET reflectivity is created by the index difference of air and oriented polyester, which is about 1.65. ESR is a multilayer of oriented PEN and PMMA, with an index differential at normal incidence of about 0.26. So even though ESR has a much smaller index differential, it can be made at least 99% reflective with a much thinner construction.

If a polarizing film with high block axis reflectance is desired, then the index differential between materials is limited by the birefringence of the materials since the indices need to be matched along one axis. For PEN, the birefringence is about 0.25, so diffuse reflecting polarizers can be made with blended polymers having index differentials of about 0.25. These constructions would therefore have to be much thicker than the voided PET reflectors to be 95% reflective. The reflectivity may be limited by absorption losses in such thick films since highly birefringent materials often have relatively high absorption coefficients compared to isotropic low index materials like acrylic materials. The multilayer constructions have the additional benefit of being specular, which can enhance light transport across the hollow cavity. Cholesteric reflectors are also in the class of Bragg reflectors and can be made very reflective and are inherently polarizing. A quarter wave retarder plate is needed to convert the circular polarized light to linear. To reduce losses to a minimum, the retarder can be placed on the outside face of the cavity so that the light only passes through it once.

A silver metal back reflector 12 can be 95% reflective if it is coated for corrosion resistance. Higher reflectivities can be achieved with silver and other metals, most notably aluminum, if they are coated with dielectric thin films. A wire grid polarizer can have a relatively high reflectivity for the block axis if constructed properly. See for example, U.S. Pat. No. 6,122,103. There is some partial reflectivity for the pass axis, and this can be increased with an additional multilayer reflector film stack.

The MOF front surface partial reflectors 14 can be formed such that they are either continuous or discontinuous over the back reflectors 12. The front surface partial reflectors 14 can be spatially invariant across the back reflector 12; alternatively, the front surface partial reflective layers can include a gradient of diffusivity across the back reflector 12. Also, a highly reflective back reflector 12 that is patterned with one or more structures that provide semi-specular reflection can also be utilized. Suitable shapes can be formed, for example, by using a corrugated high reflectance specular back reflector.

The invention will now be described with reference to the following non-limiting examples.

EXAMPLES

For each of the following Examples, the reflection spectra for each of the elements, or combinations of elements, within the MOF article 10 (FIG. 1), was computed using a Berriman 4×4 matrix multilayer optical response calculation engine. The input parameters for such a calculation included: a layer thickness profile of optical repeat units (ORU), and the wavelength-dependent refractive index values ($n_x$, $n_y$ and $n_z$) for the birefringent, first-material layers PEN, and for the isotropic ($n_{iso}$: $n_x=n_y=n_z$) second-material layers PHEN13 and PMMA.

Example 1—Blue to Silver: MOF Article Film Construction

A film article including MOF elements 12 and 14 was conceived that has a saturated blue reflective color at normal angle moving to a silver reflective color at higher view angle, and is substantially insensitive to MOF optical caliper variation.

A cross section of the MOF-based film article is shown in FIG. 1. The front surface MOF partial reflector 14 was a biaxially stretched multilayer film stack with 325 layers of PEN alternating with layers of PHEN13. The MOF back reflector 12 was also a biaxially stretched multilayer film stack with 184 layers of PEN interspersed with PMMA. The wavelength selective absorber layer 16 was a 10 μm PETg film extruded with a blue dye, Lee True Blue pigment wavelength-selective absorber, at an assumed weight % of 1.50. The resulting MOF article had a thickness of 66 μm, and included protective boundary layers on the exterior facing surfaces thereof (not shown in FIG. 14A discussed below) with a thickness of about 2 μm.

Figure 14A:
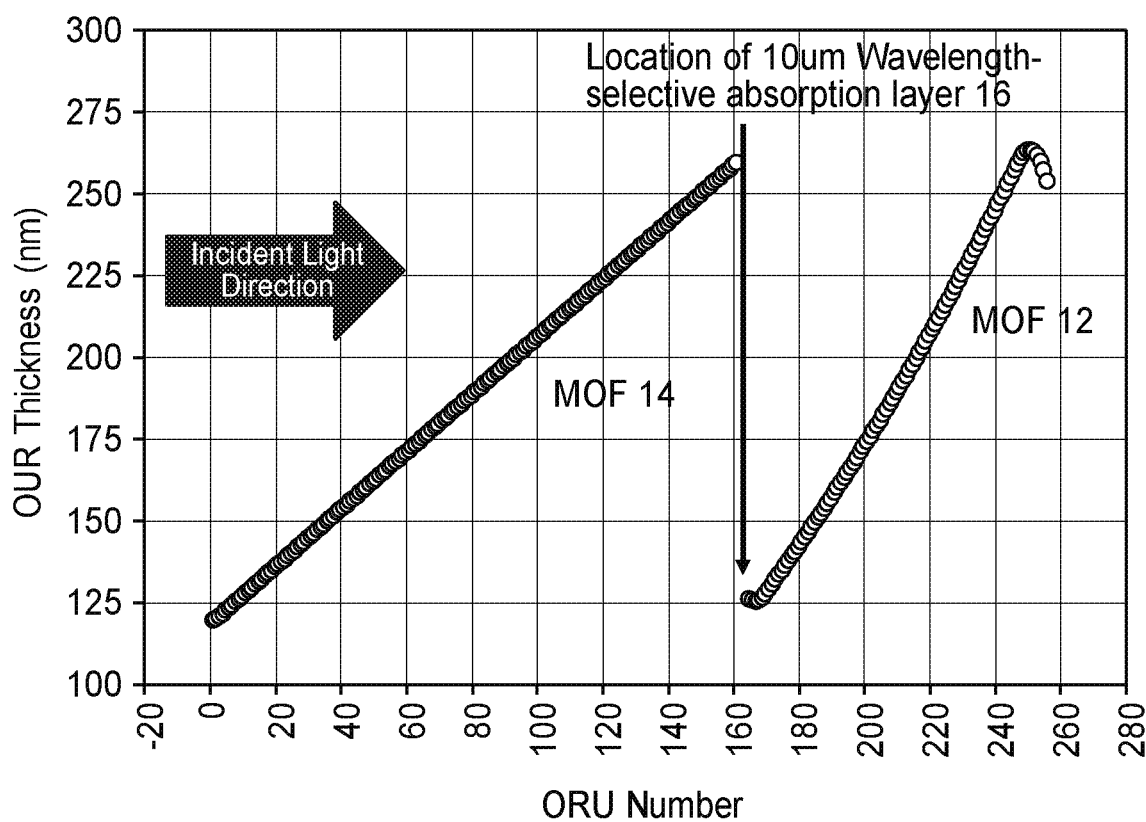
FIG. 14A is a plot of the layer thickness profiles of the optical repeat units of the MOF article of Example 1.

The layer profiles for each of the two MOF films 12 and 14, are shown in FIG. 14A. The MOF front surface partial reflector film (14 in FIG. 1) optical repeat unit (ORU) profile is disposed nearest the front surface of MOF article 10, and the broad banded back reflector 12 is disposed underneath the wavelength-selective absorber film 16 and on the bottom side of the article 10. Each symbol in FIG. 14A represents an Optical Repeat Unit (ORU) consisting of a pair of ¼ wavelength phase thickness PEN layer and PHEN13 layer, partial reflector 14, and for broadbanded reflector 12, each symbol represents an Optical Repeat Unit (ORU) consisting of a pair of ¼ wavelength phase thickness PEN layer and PMMA layer In this computational Example 1, and in the following examples, the optical elements 12, 14 and 16 are each assumed to have low scattering, or low haze, rendering the MOF article 10, consisting of only elements 12, 14 and 16, specular in character.

Figure 14B:
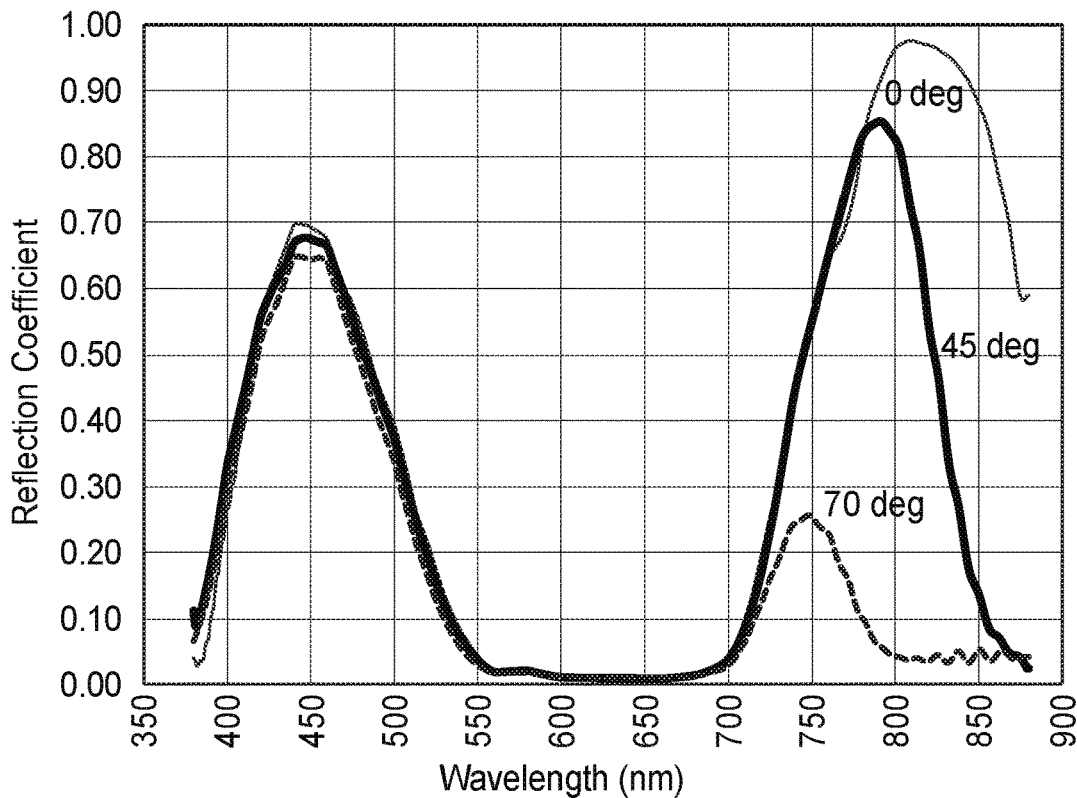
FIGS. 14B-14C are plots of the computed reflection spectrum for light incident angles of 0, 45 and 70 (near-grazing) degrees, and resulting reflection color a* and b*, respectively, for a D65 light source spectrum for the MOF article of Example 1.
Figure 14C:
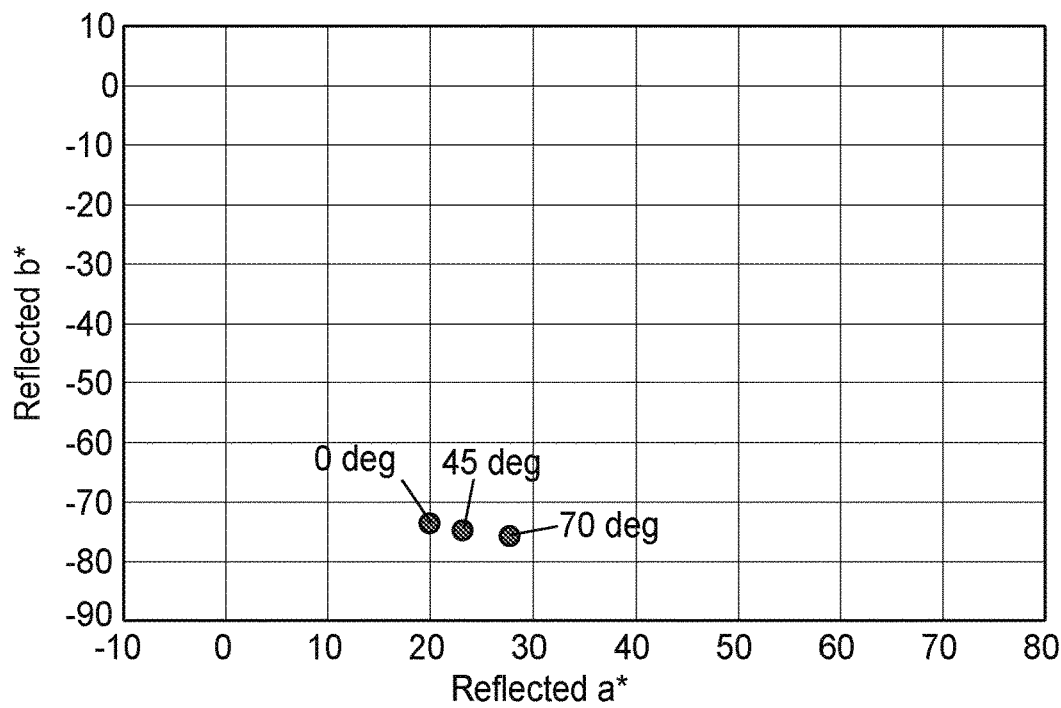

As an illustration of the relatively constant reflection color with changing observation angle for the combination of underlying elements wavelength-selective absorber layer 16, atop of broadband reflector film 12, FIGS. 14B-14C show the computed reflection spectrum of for light incident angles of 0, 45 and 70 (near-grazing) degrees, and resulting reflection color a* and b*, respectively, for a D65 light source spectrum. In these calculations, the effect of an air-to-material Fresnel interface, is removed. This is the appropriate method for analyzing the color response for the underlying absorber 16 atop the back reflector 12, as in a full construction of MOF article 10 (including front surface partial reflector element 14), light will be propagating into the absorber layer 16 and back reflector 12, from the front surface partial reflector 14, and so will not have an air to material interface.

Figure 14D:
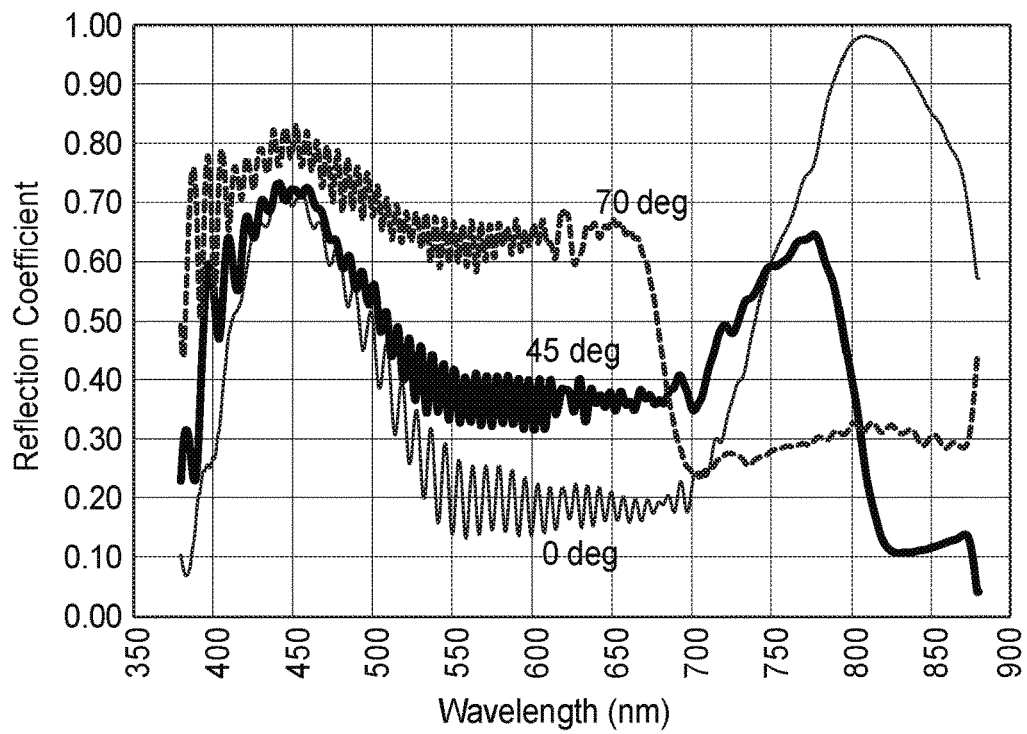
FIG. 14D is a plot of the computed specular reflection spectra for the full combination of the front surface partial reflector, the absorber layer and the back reflector elements of the MOF article of Example 1 for view angles of 0, 45 and 70 (near-grazing) degrees.

FIG. 14D shows the computed specular reflection spectra for the full combination of the front surface partial reflector 14, the absorber layer 16 and the back reflector 12 for view angles of 0, 45 and 70 (near-grazing) degrees. FIG. 14D shows that the overall visible reflection increases dramatically with increasing incidence angle, rendering a dynamic change in reflected color from a deep blue at normal angles to a highly reflective silver appearance as observation angles increase to near grazing.

Figure 14E:
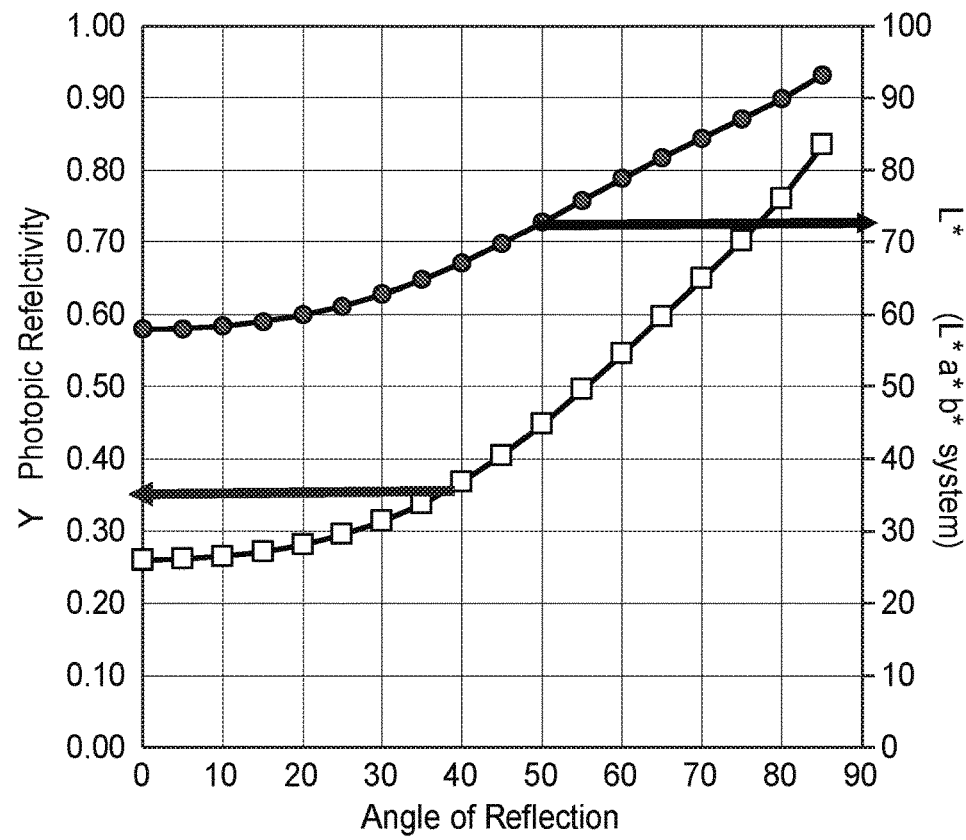
FIG. 14E is a plot of the increase in the photopic reflectivity Y, and of the "Lightness" metric for the Lab color system, L*, for increasing light incidence angle for the MOF article of Example 1.

FIG. 14E is a plot of the increase in the photopic reflectivity Y, and of the "Lightness" metric for the Lab color system, L*, for increasing light incidence angle for the article 10 of Example 1.

Figure 14F:
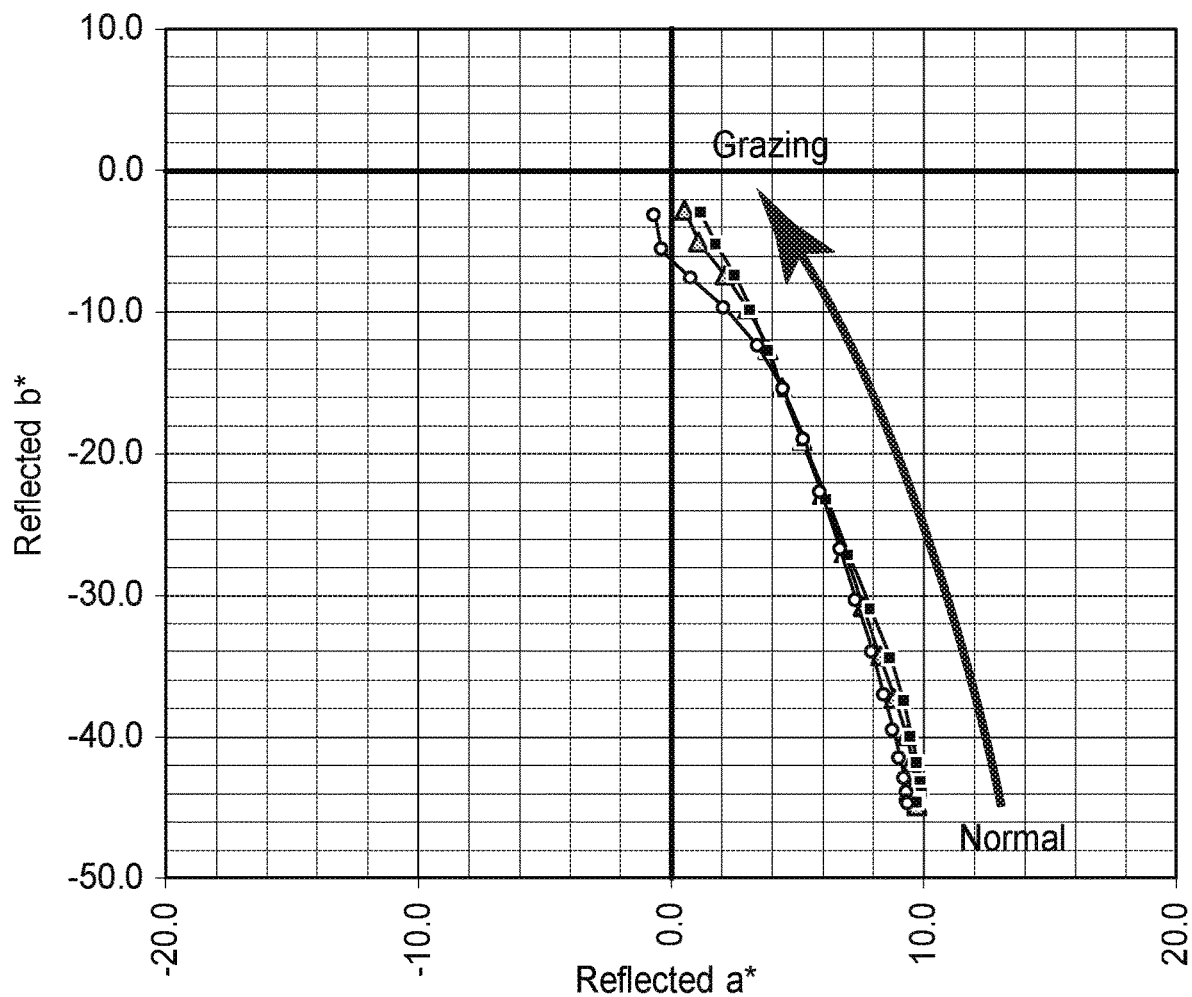
FIG. 14F shows the computed overall reflected color of the MOF article of Example 1, where the triangular, square and circular symbols show the a* b* color values ranging from normal incidence (0 degrees) to grazing angle 85 degrees, in increments of 5 degrees.

FIG. 14F shows the computed overall reflected color of the MOF article 10 of Example 1, where the triangular symbols show the a* b* color values ranging from normal incidence (0 degrees) to grazing angle 85 degrees, in increments of 5 degrees. FIG. 14F shows that the color dynamically moves from a deep blue at normal incidence, to a near-neutral, high reflection color (silver) as incidence angle increases.

FIG. 14F also shows a* b* color trajectories, computed for the MOF article 10 of Example 1, wherein the overall thickness of the article is increased 3% (closed square symbols) and is decreased by 3% (open circle symbols). The caliper variation of +/−3% represents the high range of spatial and temporal caliper variation for a Multilayer Optical Film manufacturing process. As can be seen from FIG. 14F, the color variation among the three color trajectories, spanning the caliper range of 6%, is quite small, to the point of being insignificant. Note that for the L*a*b* color space, it is accepted that just noticeable color differences (JND) occur for an observer of adjacent a* and b* 'patch' values, are more than 2.0, apart.

Example 2—Blue to Gold: MOF Article Film Construction

A MOF film article 10 (FIG. 1) including MOF elements back reflector 12 and front surface partial reflector 14 was conceived that had a saturated blue reflective color at normal angle moving to a gold reflective color at higher view angle, and was substantially insensitive to MOF optical caliper variation.

The front surface partial reflector 14 was a biaxially stretched multilayer film stack with 325 layers of PEN alternating with layers of PHEN13. The back reflector 12 was also a biaxially stretched multilayer film stack with 184 layers of PEN interspersed with PMMA. The wavelength selective absorbing layer 16 was a 10 μm PETg film extruded with a blue dye, Lee True Blue pigment wavelength-selective absorber, at an assumed weight % of 1.50. The resulting multilayer optical film article 10 had a thickness of 71 μm, and included protective boundary layers on the exterior facing surfaces thereof (not shown in FIG. 15A) with a thickness of about 2 μm.

Figure 15A:
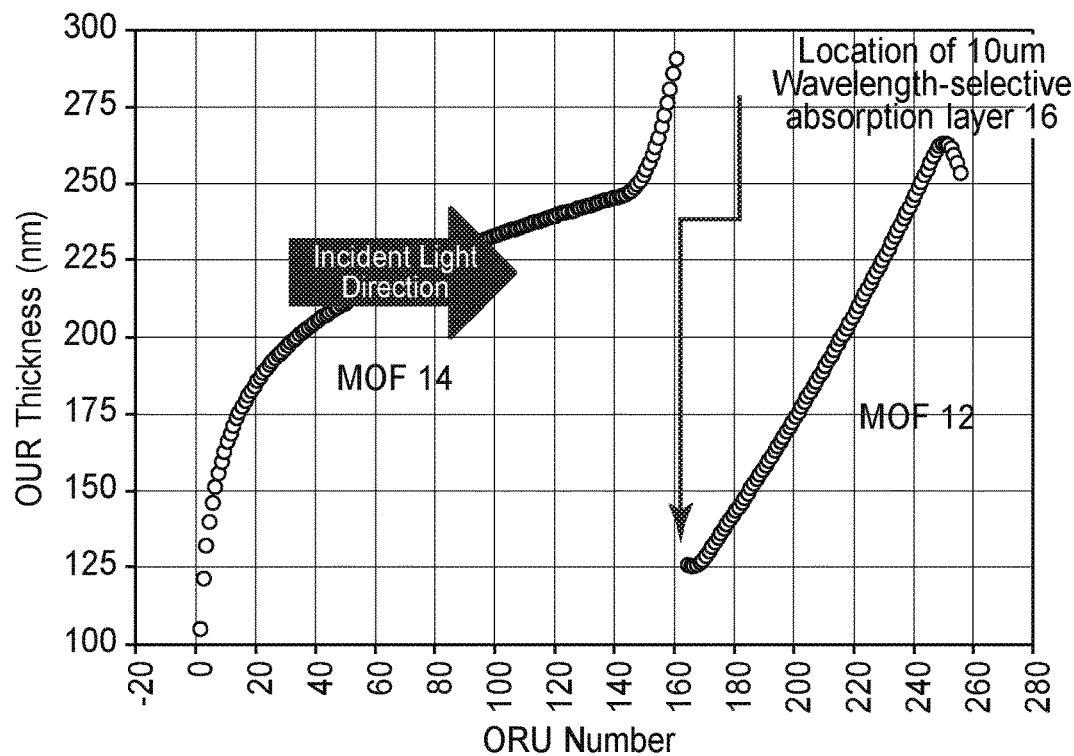
FIG. 15A is a plot of the layer thickness profiles of the optical repeat units of the MOF article of Example 2.

The layer profiles for each of the two MOF films for the back reflector 12 and the front surface partial reflector 14, are shown in FIG. 15A. Example 2 differs from Example 1, in the ORU profile design for the front surface partial reflector element 14. The ORU profile design for Example 2 has the characteristic of creating a "gold" reflective appearance and the incidence angle increases. The front surface partial reflector MOF film element is disposed nearest the front surface of innovative article 10, and the broad banded back reflector 12 is disposed underneath the wavelength-selective absorber film 16 and on the bottom side of the MOF article 10. Each symbol in FIG. 15A represents an Optical Repeat Unit (ORU) consisting of a pair of ¼ wavelength phase thickness PEN layer and PHEN13 layer for the front surface partial reflector 14, and for the broad banded back reflector 12. Each symbol represents an ORU consisting of a pair of ¼ wavelength phase thickness PEN layer and PMMA layer In this computational Example 2, the optical elements 12, 14 and 16 are each assumed to have low scattering, or low haze, rendering the MOF article 10, consisting of only elements 12, 14 and 16, specular in character.

Figure 15B:
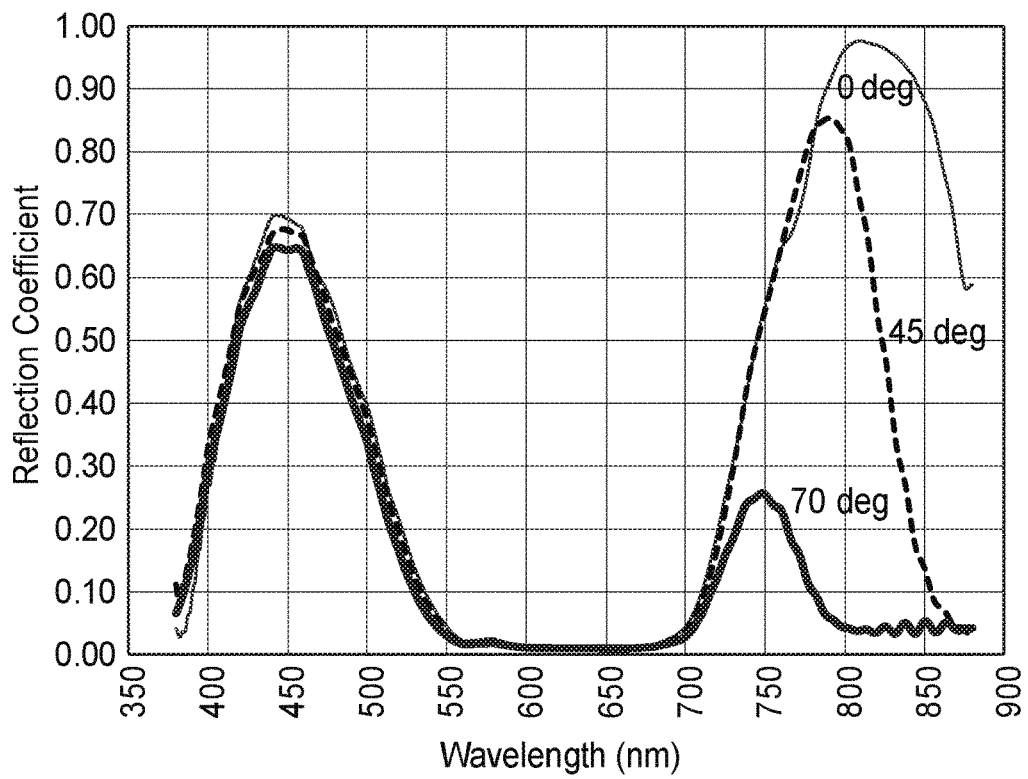
FIGS. 15B-15C are plots of the computed reflection spectrum for light incident angles of 0, 45 and 70 (near-grazing) degrees, and resulting reflection color a* and b*, respectively, for a D65 light source spectrum for the MOF article of Example 2.
Figure 15C:
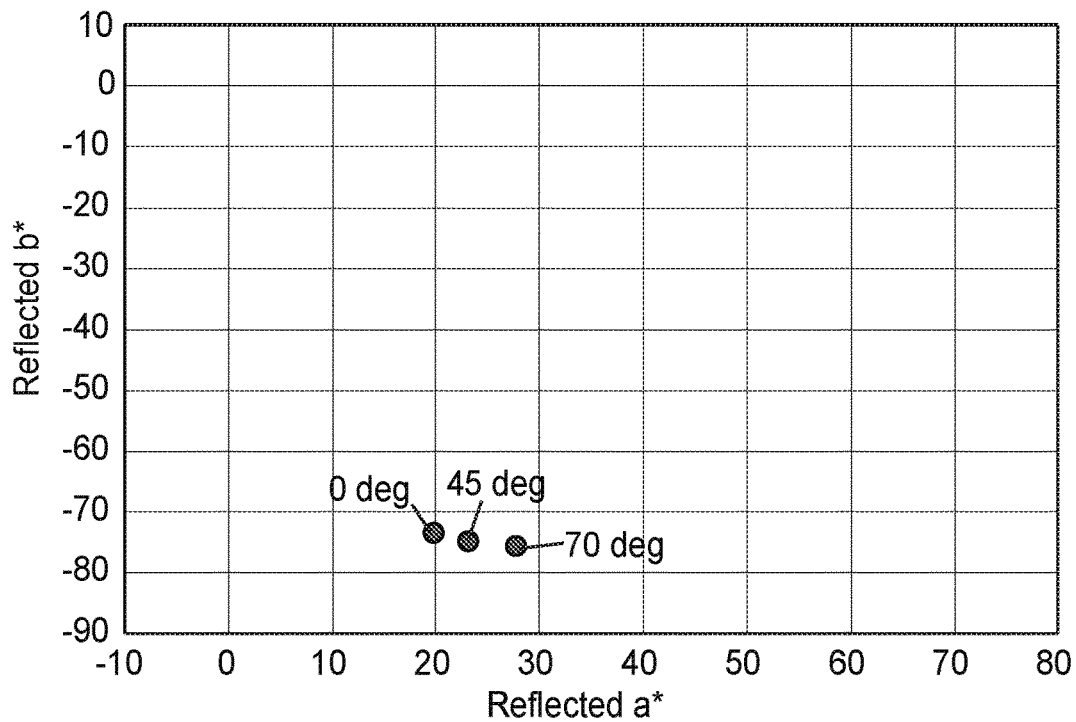

As an illustration of the relatively constant reflection color with changing observation angle for the combination of underlying elements wavelength-selective absorber layer 16, atop of broadband reflector film 12, FIGS. 15B-15C show the computed reflection spectrum of for light incident angles of 0, 45 and 70 (near-grazing) degrees, and resulting reflection color a* and b*, respectively, for a D65 light source spectrum. In these calculations, the effect of an air-to-material Fresnel interface, is removed. This is an appropriate method for analyzing the color response for the underlying absorber 16 atop the back reflector 12, as in a full construction of MOF article 10 (including front surface partial reflector element 14), light will be propagating into the absorber layer 16 and back reflector 12, from the front surface partial reflector 14, and so will not have an air to material interface.

Figure 15D:
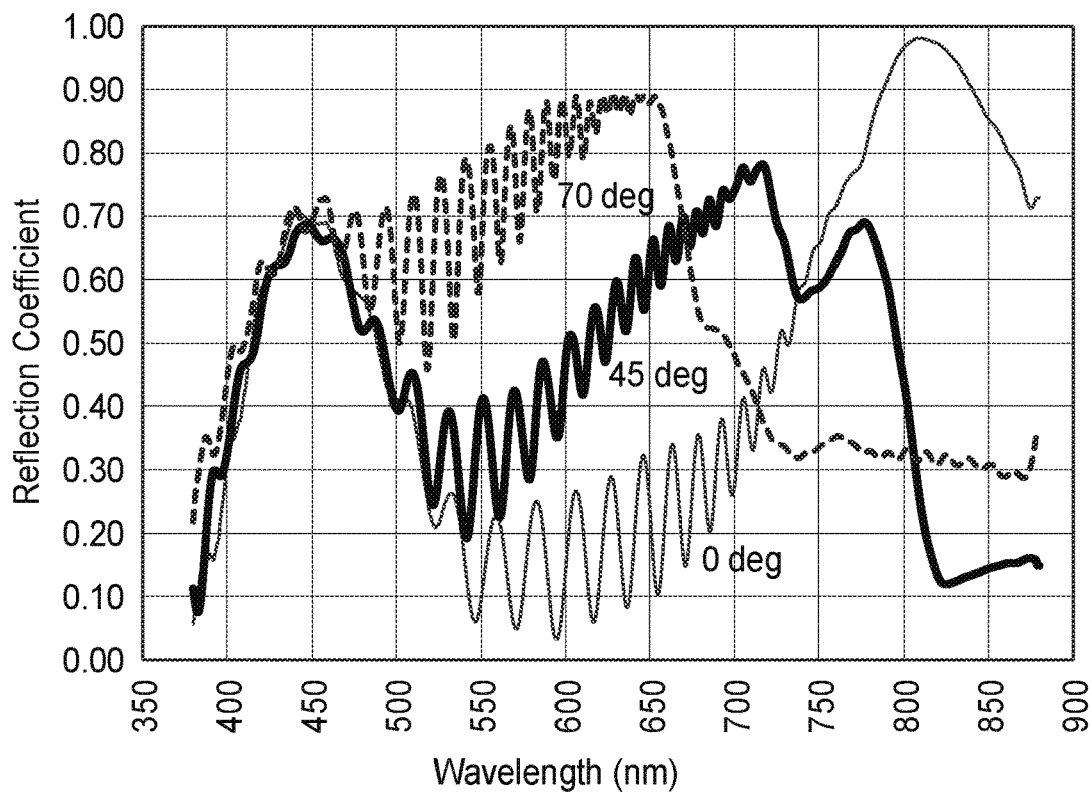
FIG. 15D is a plot of the computed specular reflection spectra for the full combination of the front surface partial reflector, the absorber layer and the back reflector elements of the MOF article of Example 2 for view angles of 0, 45 and 70 (near-grazing) degrees.

FIG. 15D shows the computed specular reflection spectra for the full combination of elements 14, 16 and 12, for view angles of 0, 45 and 70 (near-grazing) degrees. FIG. 15D shows that the overall visible reflection increases dramatically, with increasing incidence angle, rendering a dynamic change in reflected color, from a deep blue at normal angles, to a high reflection gold appearance, as an observation angles increase to near grazing.

Figure 15E:
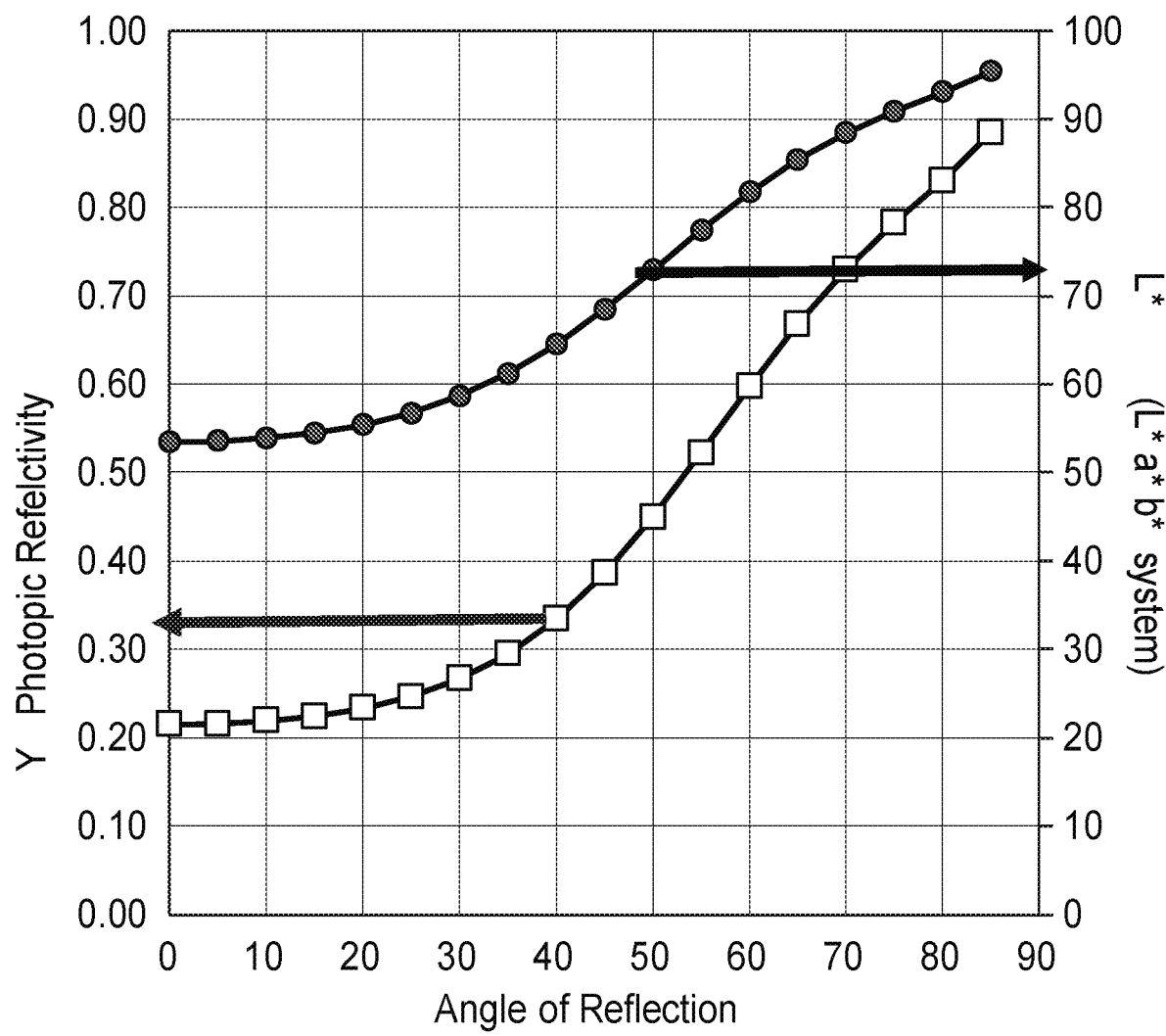
FIG. 15E is a plot of the increase in the photopic reflectivity Y, and of the "Lightness" metric for the Lab color system, L*, for increasing light incidence angle for the MOF article of Example 2.

A plot of the increase in the photopic reflectivity Y, and of the "Lightness" metric for the Lab color system, L*, for increasing light incidence angle, for the MOF article of Example 2 is shown in FIG. 15E.

Figure 15F:
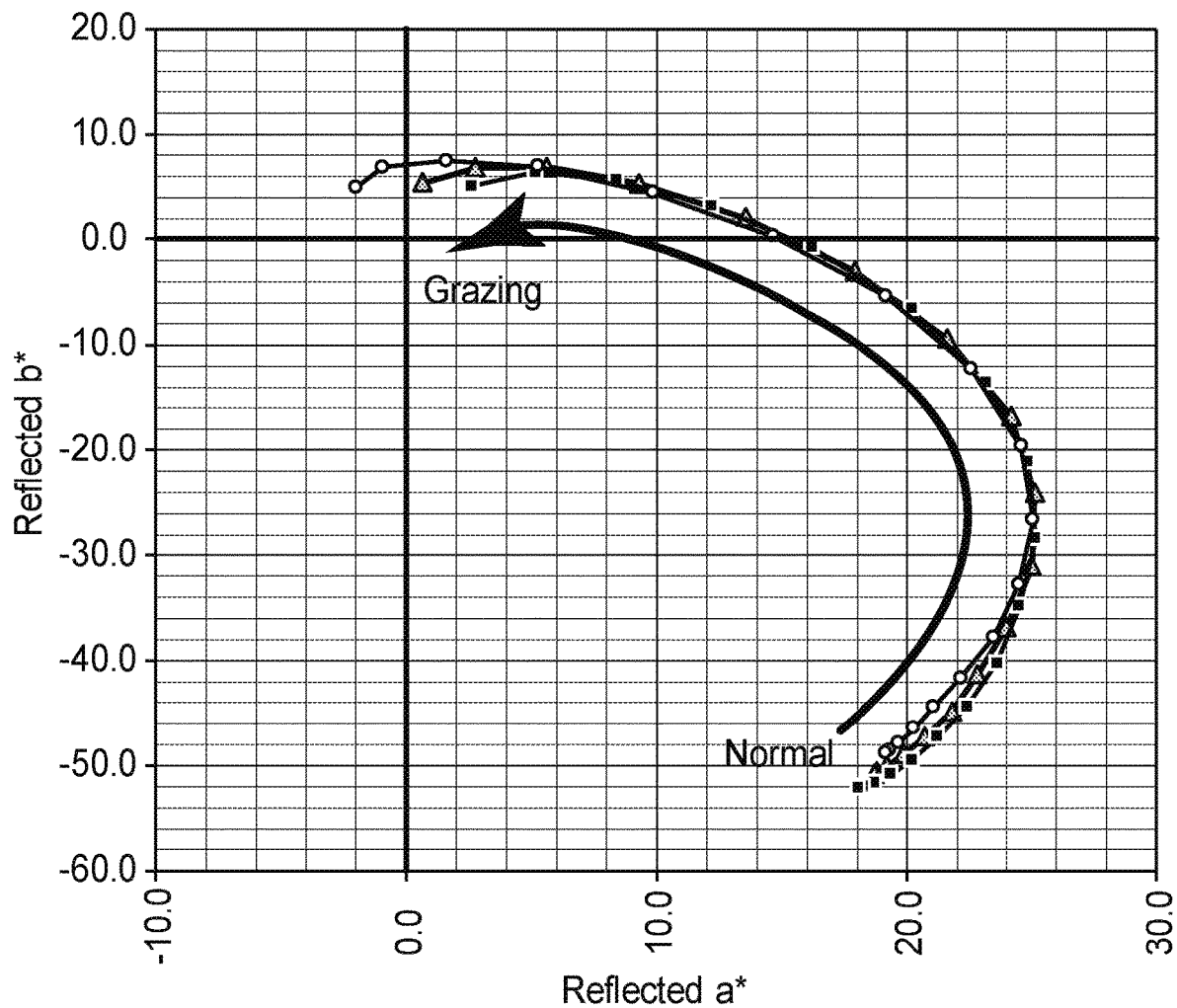
FIG. 15F shows the computed overall reflected color of the MOF article of Example 2, where the triangular, square and circular symbols show the a* b* color values ranging from normal incidence (0 degrees) to grazing angle 85 degrees, in increments of 5 degrees.

FIG. 15F shows the computed overall reflected color of the MOF article of Example 2, where the triangular symbols show the a* b* color values ranging from normal incidence (0 degrees) to grazing angle 85 degrees, in increments of 5 degrees. FIG. 15F shows that the color dynamically moves from a deep blue at normal incidence, to a golden, high reflection color (gold) as incidence angle increases. FIG. 15F also shows a* b* color trajectories, computed for the MOF article 10 of Example 2, wherein the overall thickness of the article is increased 3% (closed square symbols) and is decreased by 3% (open circle symbols). The caliper variation of +/−3% represents the high range of spatial and temporal caliper variation for a Multilayer Optical Film manufacturing process. FIG. 15F shows that the color variation among the three color trajectories, spanning the caliper range of 6%, is quite small, to the point of being insignificant.

Example 3—Rose to Gold: MOF Article Film Construction

A MOF film article 10 (FIG. 1) including a MOF back reflector element 12 and a MOF front surface partial reflector element 14 was conceived that had a saturated Rose reflective color at normal angle moving to a gold reflective color at higher view angle, and was substantially insensitive to MOF optical caliper variation.

The MOF front surface partial reflector 14 was a biaxially stretched multilayer film stack with 325 layers of PEN alternating with layers of PHEN13. The MOF back reflector 12 was also a biaxially stretched multilayer film stack with 184 layers of PEN interspersed with PMMA. The wavelength selective absorbing layer 16 was a 10 μm PETg film extruded with a Red dye, Red 60 pigment wavelength-selective absorber, at a weight % of 4.5 and a Yellow dye, PY 147 pigment wavelength-selective absorber, at a weight % of 0.90. The resulting MOF article had a thickness of 71 μm, and included protective boundary layers on the exterior facing surfaces thereof (not shown in FIG. 16A discussed below) with a thickness of about 2 μm.

Figure 16A:
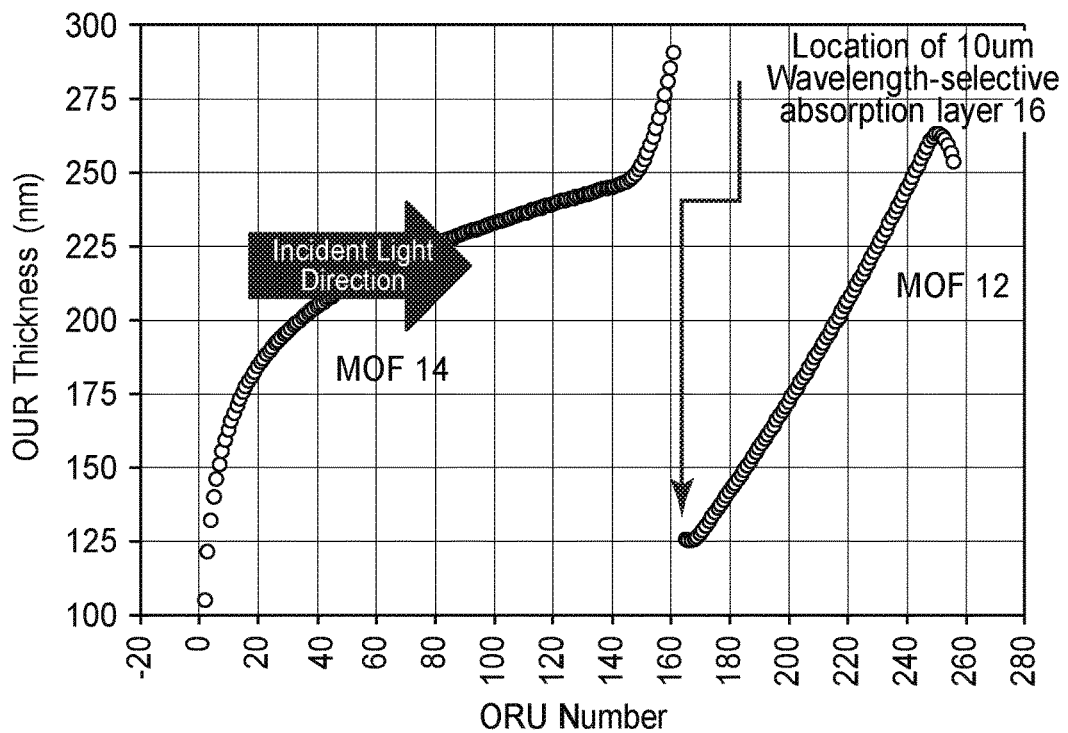
FIG. 16A is a plot of the layer thickness profiles of the optical repeat units of the MOF article of Example 3.

The layer profiles for each of the two MOF films 12 and 14, used for the back reflector element and the front surface partial reflector element, respectively, are shown in FIG. 16A. Example 3 is similar to Example 2, except that the wavelength-selective absorber pigments in element 16 are selected to provide a saturated rose color. The optical repeat unit (ORU) profile design for Example 3 has the characteristic of generating a "gold" reflective appearance as the incidence angle increases. The MOF front surfaced partial reflector film (14) ORU profile is disposed nearest the front surface of the MOF article 10, and the broad banded back reflector 12 is disposed underneath the wavelength-selective absorber film 16, on the bottom side of the MOF article 10. Each symbol in FIG. 16A represents an Optical Repeat Unit (ORU) consisting of a pair of ¼ wavelength phase thickness PEN layer and PHEN13 layers for the front surface partial reflector 14, and for the broad banded back reflector 12, each symbol represents an Optical Repeat Unit (ORU) consisting of a pair of ¼ wavelength phase thickness PEN layer and PMMA layers.

In this computational Example 3, the optical elements 12, 14 and 16 are each assumed to have low scattering, or low haze, rendering the article 10, consisting of only elements 12, 14 and 16, specular in character.

Figure 16B:
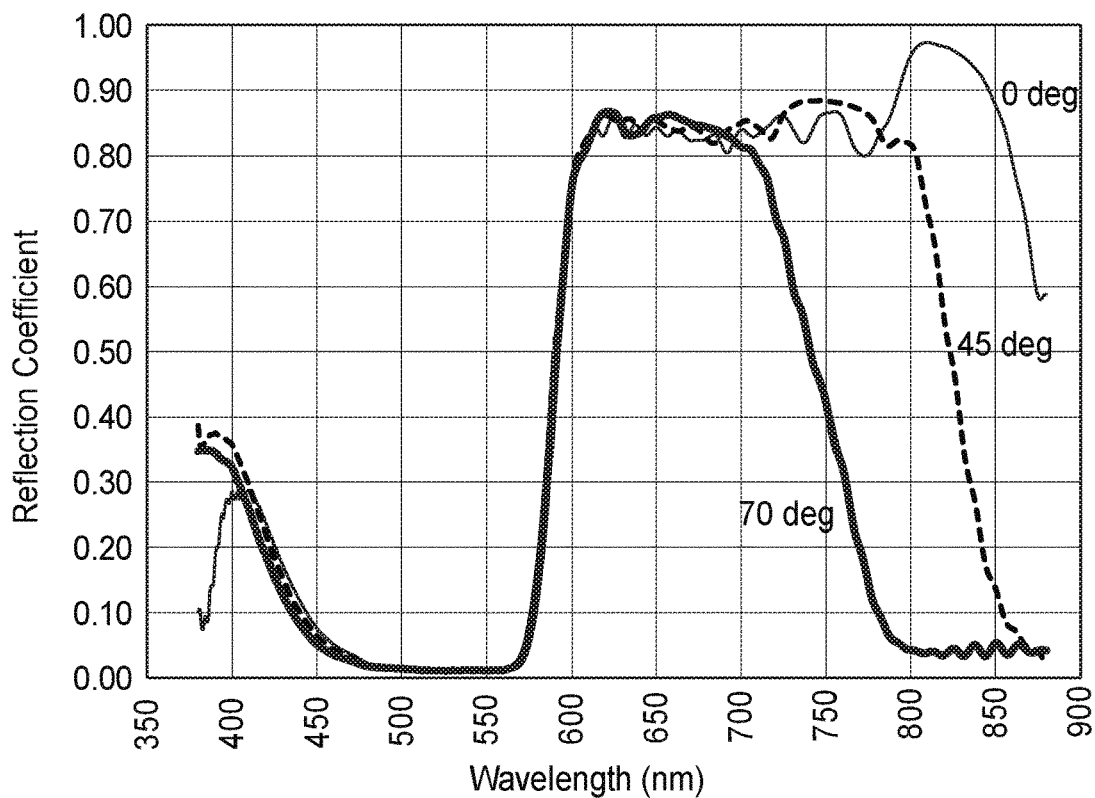
FIGS. 16B-16C are plots of the computed reflection spectrum for light incident angles of 0, 45 and 70 (near-grazing) degrees, and resulting reflection color a* and b*, respectively, for a D65 light source spectrum for the MOF article of Example 3.
Figure 16C:
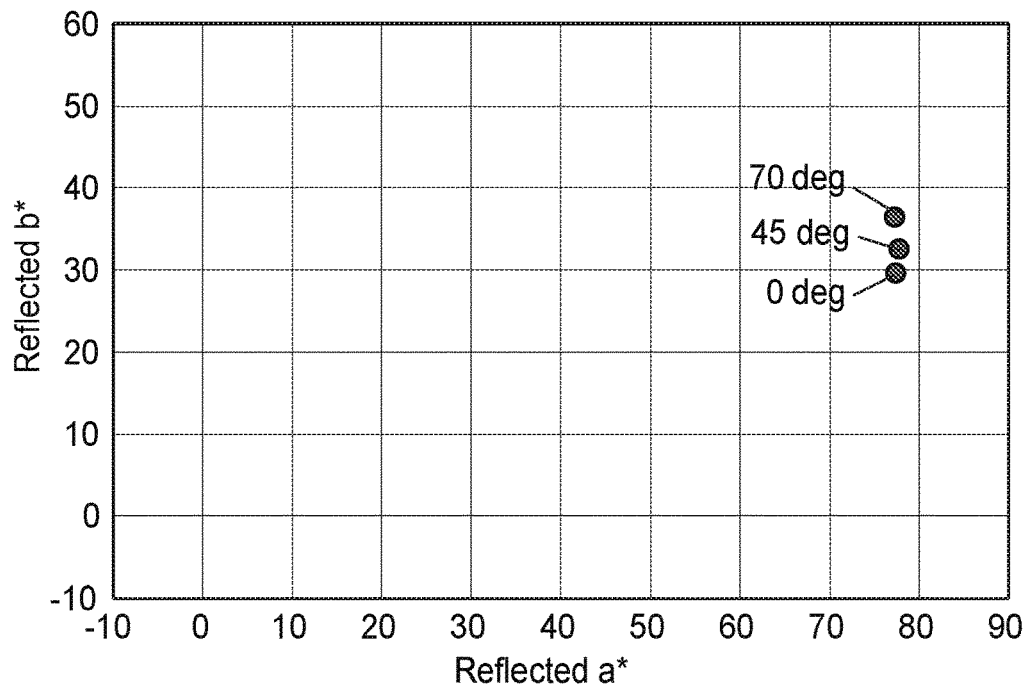

As an illustration of the relatively constant reflection color with changing observation angle for the combination of underlying elements including the wavelength-selective absorber layer 16 atop MOF broadband back reflector 12, FIGS. 16B-16C show the computed reflection spectrum of for light incident angles of 0, 45 and 70 (near-grazing) degrees, and resulting reflection color a* and b*, respectively, for a D65 light source spectrum. In these calculations, the effect of an air-to-material Fresnel interface is removed. This is an appropriate method for analyzing the color response for the underlying absorber 16 atop the back reflector 12, as in a full construction of MOF article 10 (including front surface partial reflector element 14), light will be propagating into the absorber layer 16 and back reflector 12, from the front surface partial reflector 14, and so will not have an air to material interface.

Figure 16D:
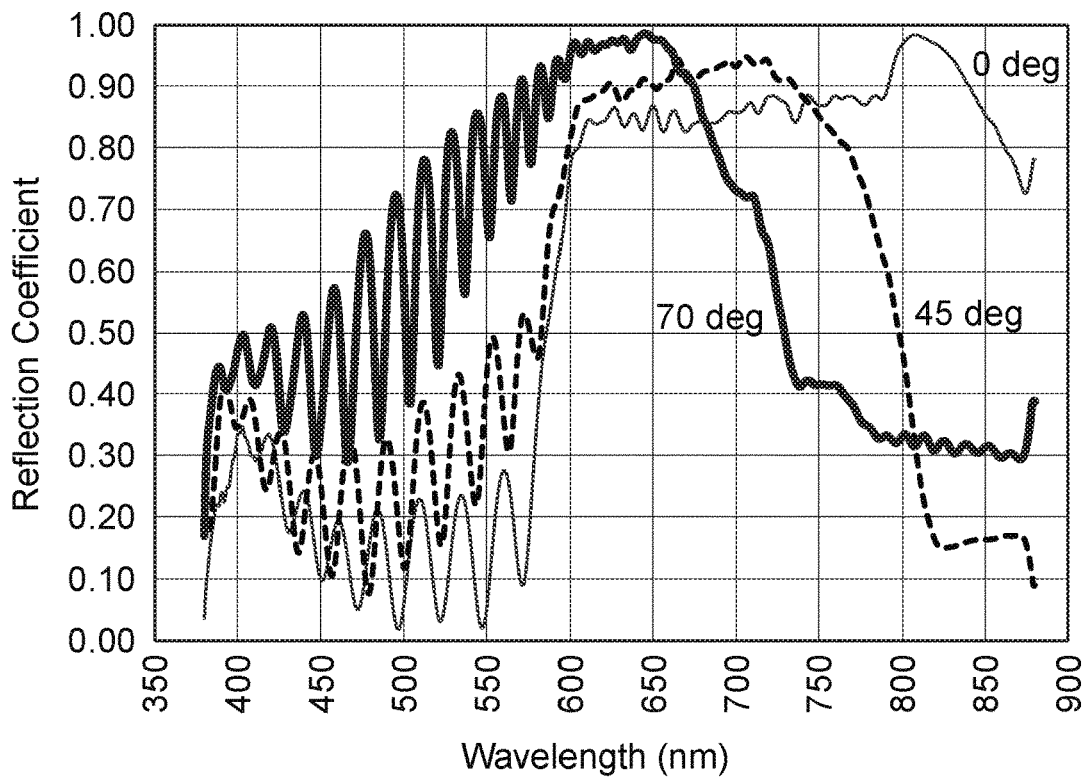
FIG. 16D is a plot of the computed specular reflection spectra for the full combination of the front surface partial reflector, the absorber layer and the back reflector elements of the MOF article of Example 3 for view angles of 0, 45 and 70 (near-grazing) degrees.

FIG. 16D shows the computed specular reflection spectra for the full combination of the elements MOF front surface partial reflector 14, absorber layer 16, and MOF back reflector 12, for view angles of 0, 45 and 70 (near-grazing) degrees. FIG. 16D shows that the overall visible reflection increases dramatically, with increasing incidence angle, rendering a dynamic change in reflected color, from a deep rose at normal angles, to a high reflection gold appearance, as an observation angles increase to near grazing.

Figure 16E:
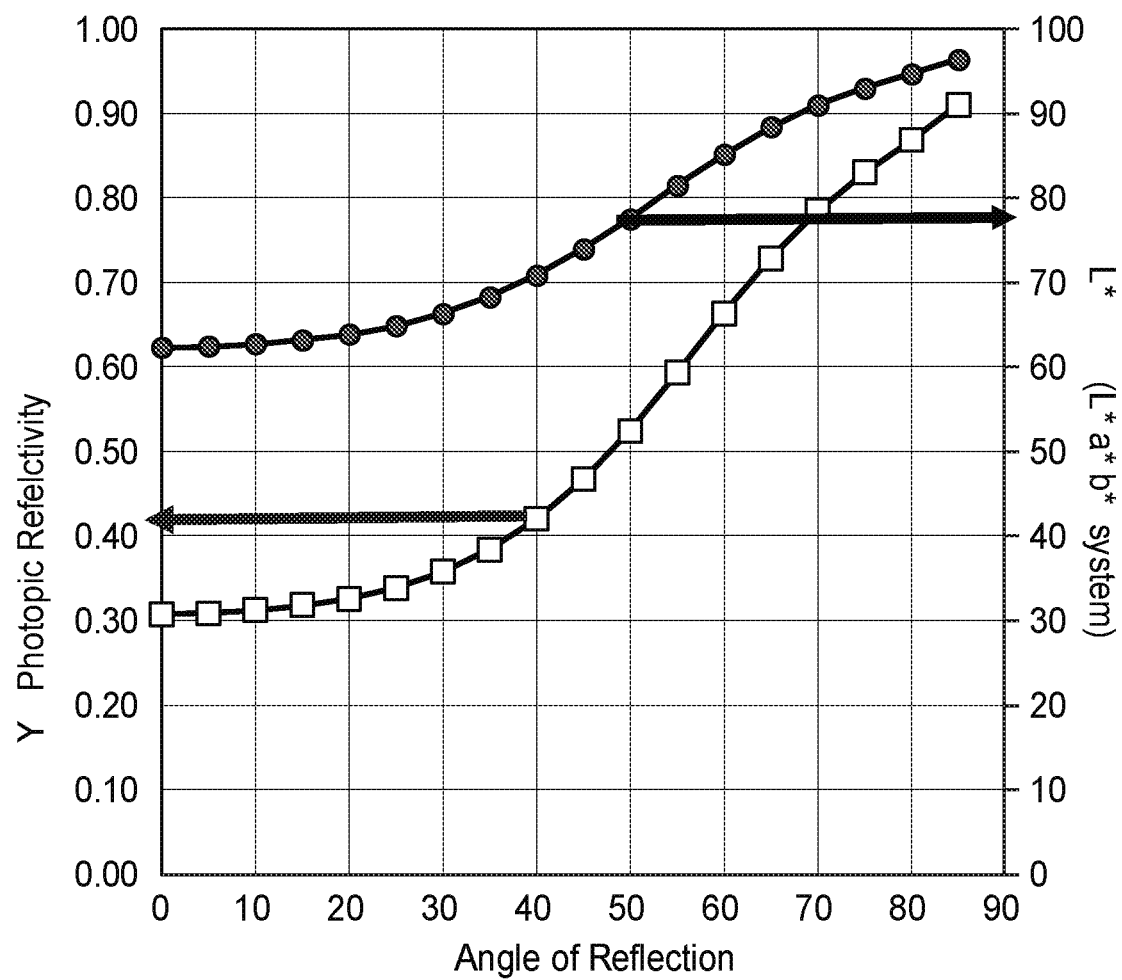
FIG. 16E is a plot of the increase in the photopic reflectivity Y, and of the "Lightness" metric for the Lab color system, L*, for increasing light incidence angle for the MOF article of Example 3.

A plot of the increase in the photopic reflectivity Y, and of the "Lightness" metric for the Lab color system, L*, for increasing light incidence angle, for the MOF article of Example 3 is shown in FIG. 16E.

Figure 16F:
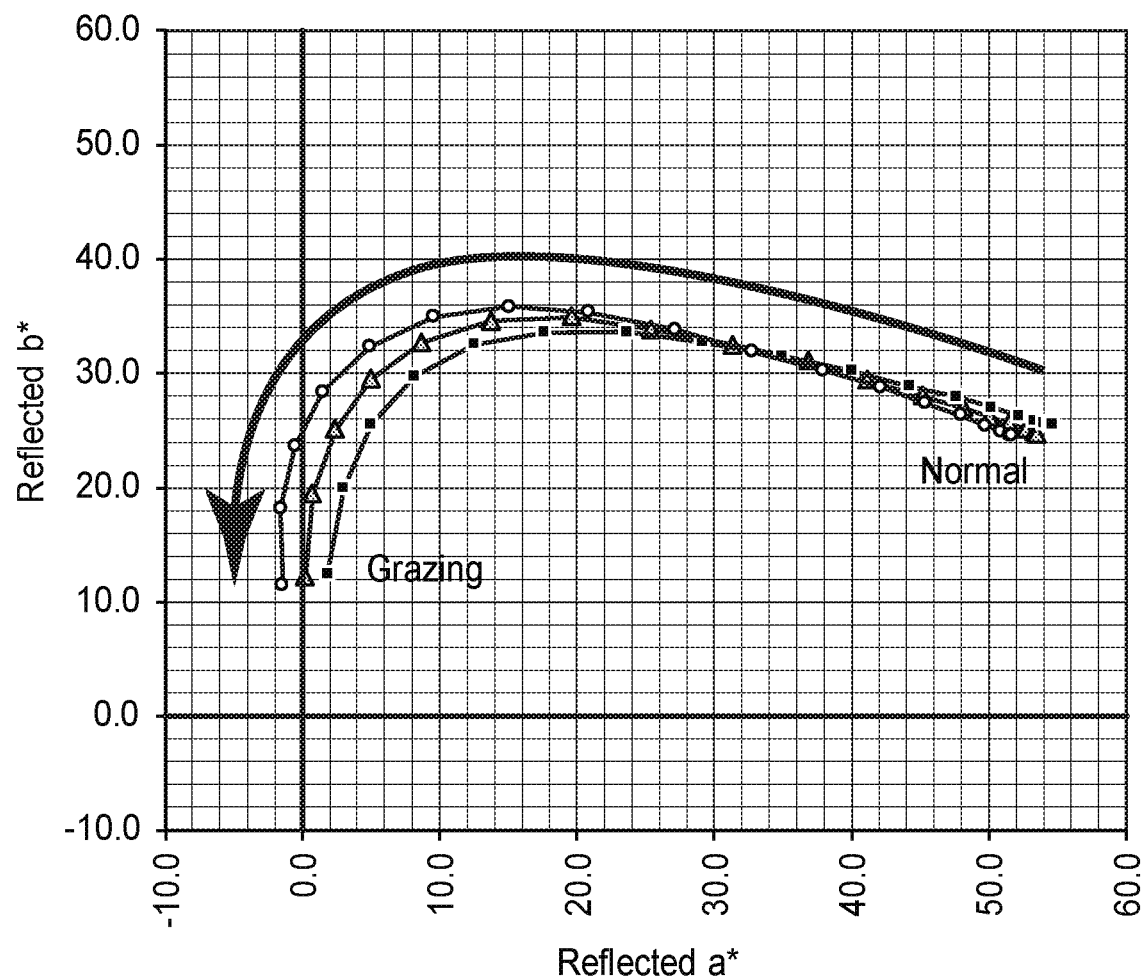
FIG. 16F shows the computed overall reflected color of the MOF article of Example 3, where the triangular, square and circular symbols show the a* b* color values ranging from normal incidence (0 degrees) to grazing angle 85 degrees, in increments of 5 degrees.

FIG. 16F shows the computed overall reflected color of the MOF article of Example 3, where the triangular symbols show the a* b* color values ranging from normal incidence (0 degrees) to grazing angle 85 degrees, in increments of 5 degrees. FIG. 16F shows that the color dynamically moves from a deep rose color at normal incidence, to a golden, high reflection color (gold) as incidence angle increases.

FIG. 16F also shows a* b* color trajectories, computed for the MOF article of Example 3, wherein the overall thickness of the article is increased 3% (closed square symbols) and is decreased by 3% (open circle symbols). The caliper variation of +/−3% represents the high range of spatial and temporal caliper variation for a Multilayer Optical Film manufacturing process. FIG. 16F shows that the color variation among the three color trajectories, spanning the caliper range of 6%, is quite small, to the point of being insignificant.

Example 4—Rose to Silver: MOF Article Film Construction

A MOF film article 10 (FIG. 1) including MOF back reflector elements 12 and front surface partial reflector elements 14 was conceived that had a saturated rose reflective color at normal angle moving to a silver reflective color at higher view angle, and was substantially insensitive to MOF optical caliper variation.

The MOF front surface partial reflector 14 was a biaxially stretched multilayer film stack with 325 layers of PEN alternating with layers of PHEN13. The MOF back reflector 12 was also a biaxially stretched multilayer film stack with 184 layers of PEN interspersed with PMMA. The wavelength selective absorbing layer 16 was a 10 μm PETg film extruded with a Red dye, Red 60 pigment wavelength-selective absorber, at a weight % of 4.5 and a Yellow dye, PY 147 pigment wavelength-selective absorber, at a weight % of 0.90. The resulting MOF article had a thickness of 66 μm, and included protective boundary layers on the exterior facing surfaces thereof (not shown in FIG. 17A discussed below) with a thickness of about 2 μm.

Figure 17A:
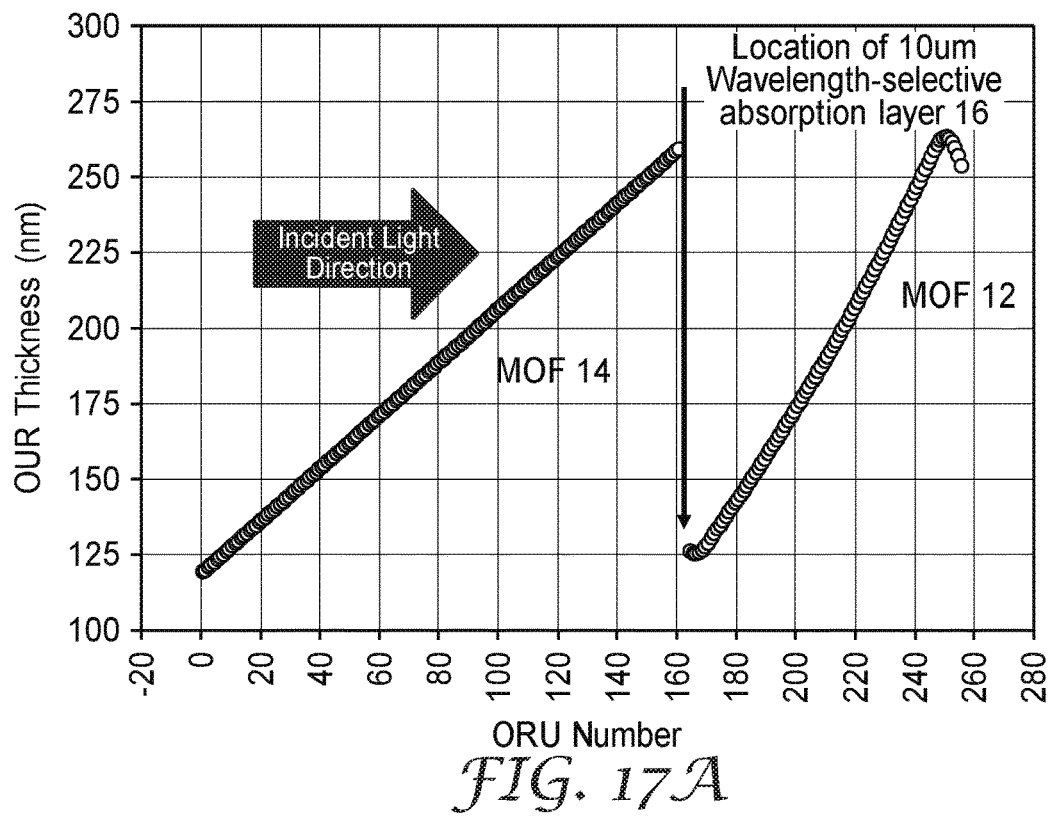
FIG. 17A is a plot of the layer thickness profiles of the optical repeat units of the MOF article of Example 4.

The layer profiles for each of the two MOF films for the back reflector 12 and the front surface partial reflector 14 are shown in FIG. 17A. Example 4 differs from Example 3 in that the ORU profile for Example 4 is intended to change to a gold reflective appearance with increasing incidence angle. The optical repeat unit (ORU) profile for the front surface partial reflector film is disposed nearest the front surface of the MOF article, and the broad banded back reflector 12, is disposed underneath the wavelength-selective absorber film 16, on the bottom side of the MOF article. Each symbol represents an ORU consisting of a pair of ¼ wavelength phase thickness PEN layer and PHEN13 layer for the front surface partial reflector 14, and for broad banded back reflector 12, each symbol represents an ORU consisting of a pair of ¼ wavelength phase thickness PEN layer and PMMA layers.

In this computational Example 4, the optical elements MOF back reflector 12, front surface partial reflector 14, and absorber layer 16 are each assumed to have low scattering, or low haze, rendering the MOF article, consisting of only elements 12, 14 and 16, specular in character.

Figure 17B:
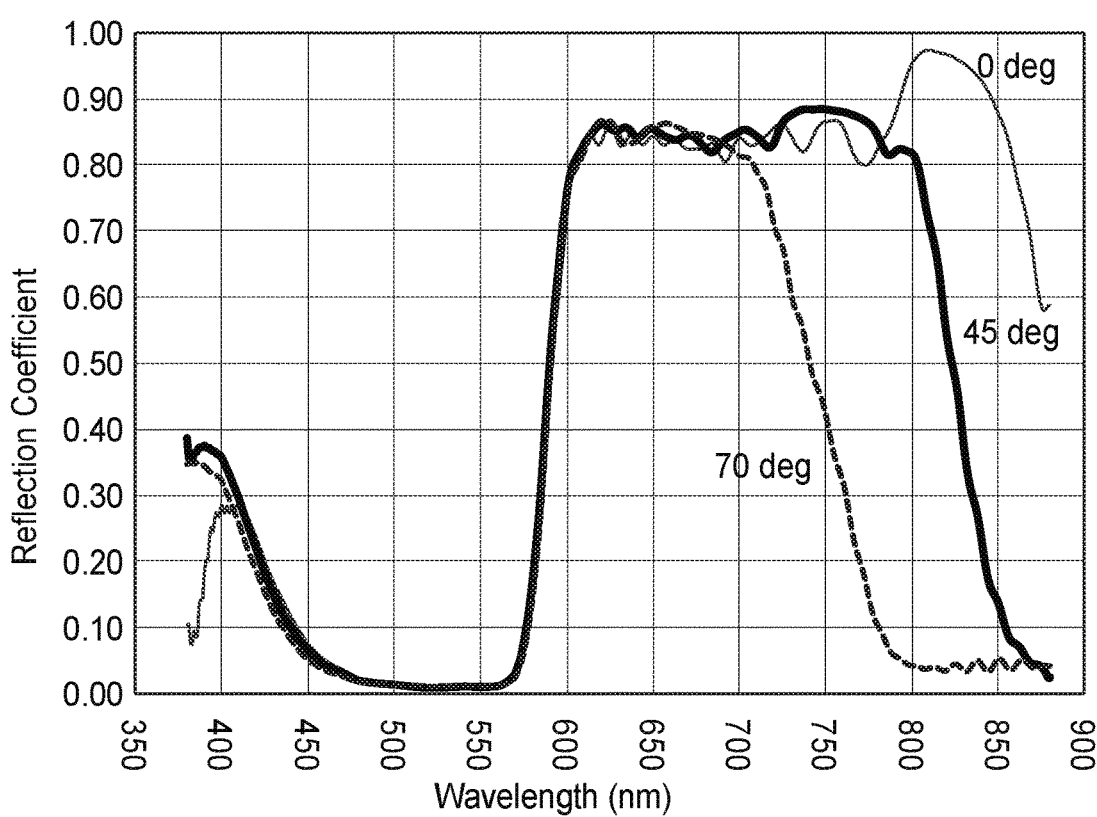
FIGS. 17B-17C are plots of the computed reflection spectrum for light incident angles of 0, 45 and 70 (near-grazing) degrees, and resulting reflection color a* and b*, respectively, for a D65 light source spectrum for the MOF article of Example 4.
Figure 17C:
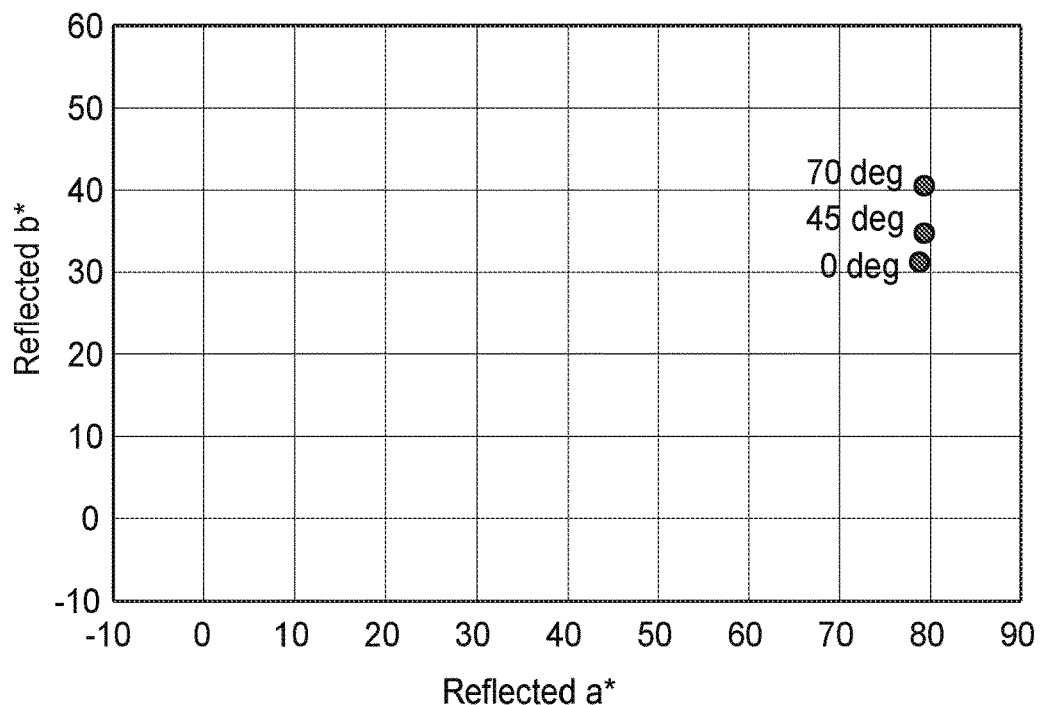

As an illustration of the relatively constant reflection color with changing observation angle for the combination of underlying elements wavelength-selective absorber layer 16, atop the broad band back reflector MOF 12, FIGS. 17B-17C show the computed reflection spectrum of for light incident angles of 0, 45 and 70 (near-grazing) degrees, and resulting reflection color a* and b*, respectively, for a D65 light source spectrum. These calculations remove the effect of an air-to-material Fresnel interface, which is the appropriate method for analyzing the color response for the underlying elements absorber layer 16 atop the MOF back reflector 12, as in a full construction of the MOF article (including MOF front surface partial reflector element 14), light will propagate into the absorber layer 16 and back reflector 12 from the front surface partial reflector 14, and so will not have an air to material interface.

Figure 17D:
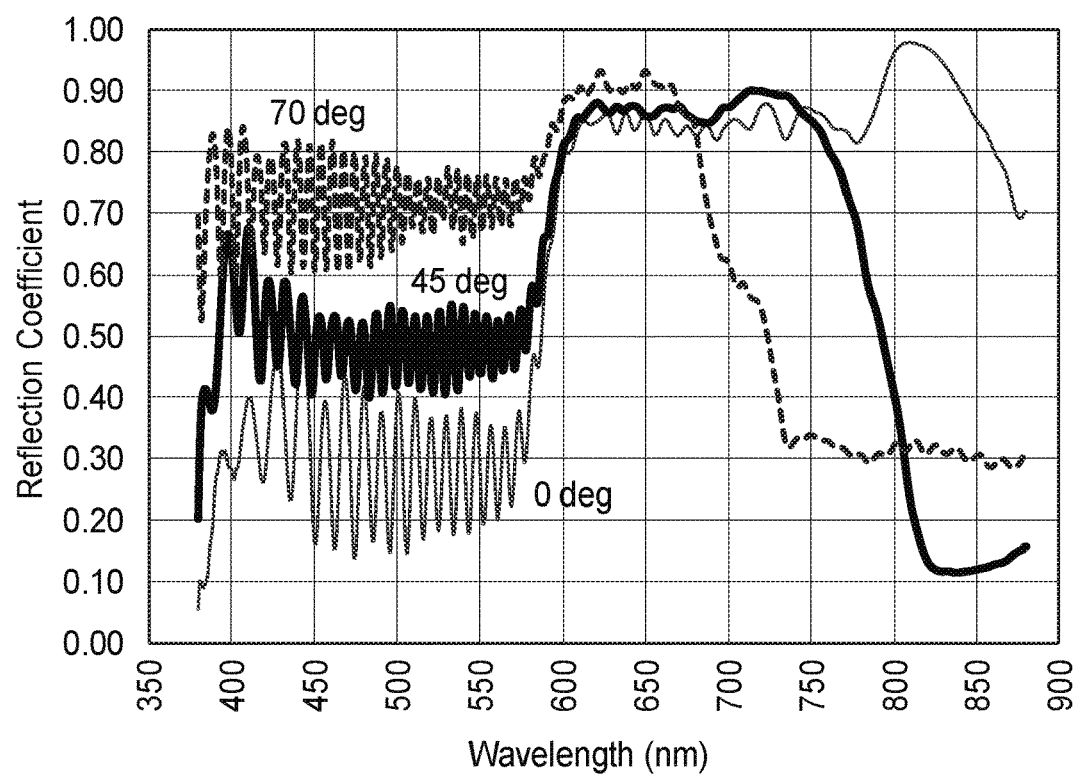
FIG. 17D is a plot of the computed specular reflection spectra for the full combination of the front surface partial reflector, the absorber layer and the back reflector elements of the MOF article of Example 4 for view angles of 0, 45 and 70 (near-grazing) degrees.

FIG. 17D shows the computed specular reflection spectra for the full combination of elements MOF front surface partial reflector 14, absorber layer 16, and MOF back reflector 12, for view angles of 0, 45 and 70 (near-grazing) degrees. FIG. 17D shows that the overall visible reflection increases dramatically, with increasing incidence angle, rendering a dynamic change in reflected color, from a deep rose at normal angles, to a high reflection silver appearance, as an observation angles increase to near grazing.

Figure 17E:
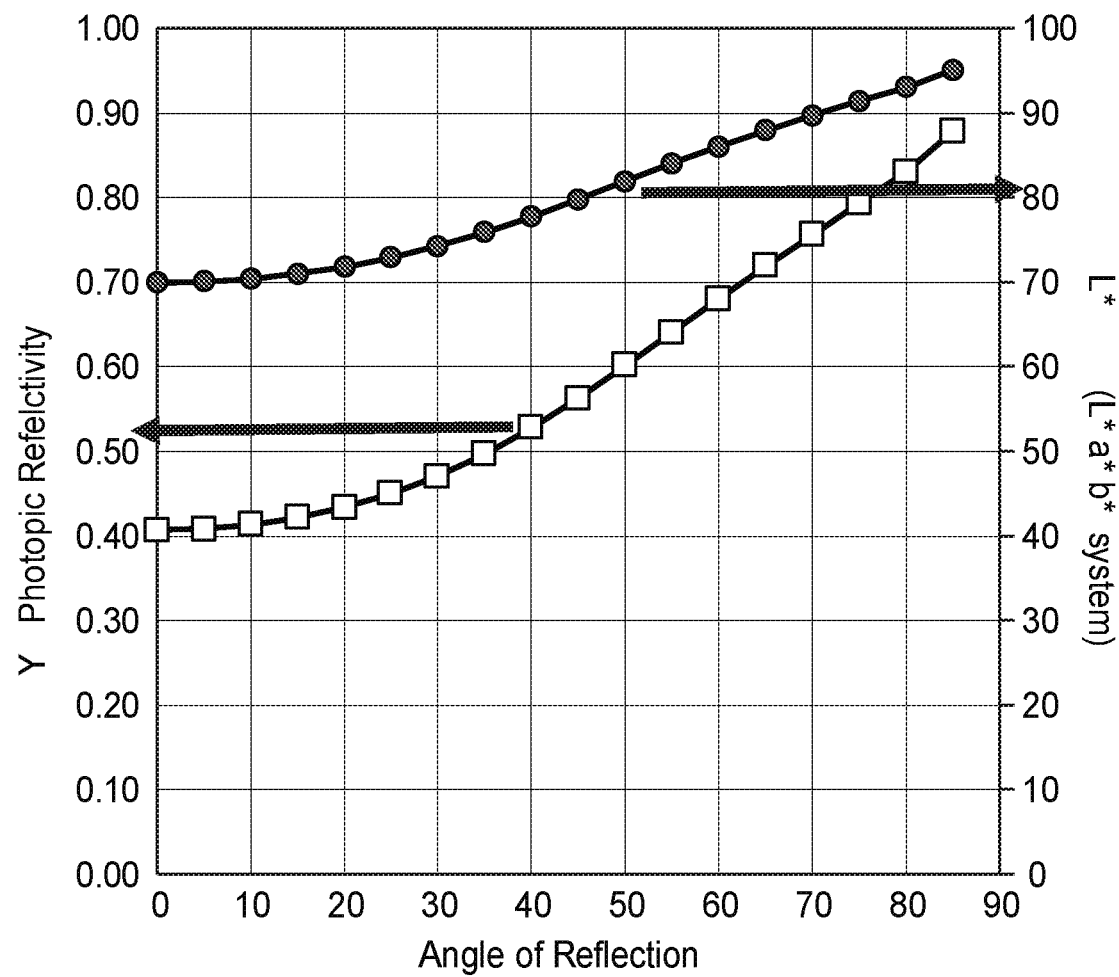
FIG. 17E is a plot of the increase in the photopic reflectivity Y, and of the "Lightness" metric for the Lab color system, L*, for increasing light incidence angle for the MOF article of Example 4.

FIG. 17E shows a plot of the increase in the photopic reflectivity Y, and of the "Lightness" metric for the Lab color system, L*, for increasing light incidence angle, for the MOF article of Example 4.

Figure 17F:
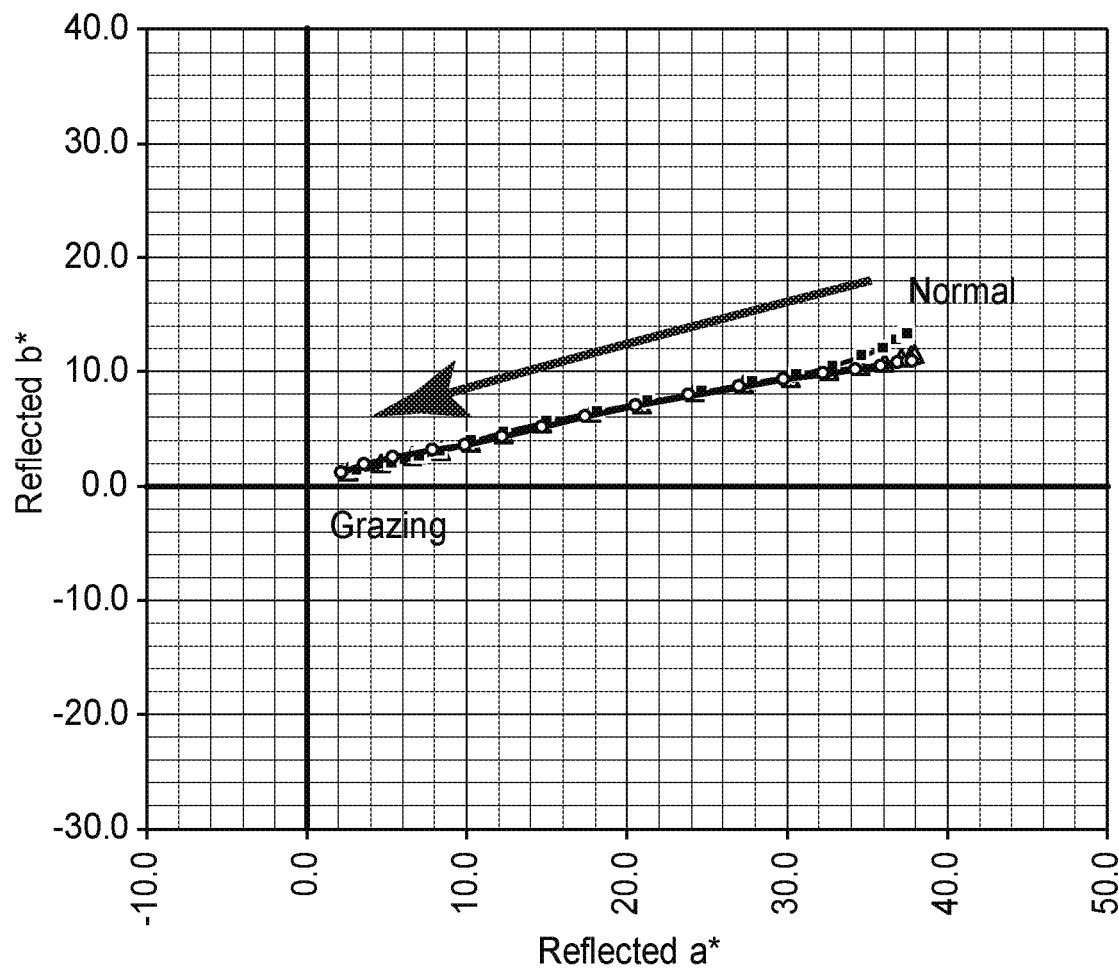
FIG. 17F shows the computed overall reflected color of the MOF article of Example 4, where the triangular, square and circular symbols show the a* b* color values ranging from normal incidence (0 degrees) to grazing angle 85 degrees, in increments of 5 degrees.

FIG. 17F shows the computed overall reflected color of the MOF article of Example 4, where the triangular symbols show the a* b* color values ranging from normal incidence (0 degrees) to grazing angle 85 degrees, in increments of 5 degrees. FIG. 17F shows that the color dynamically moves from a deep rose color at normal incidence, to a neutral, high reflection silver color as incidence angle increases.

FIG. 17F also shows a* b* color trajectories, computed for the MOF article of Example 4, wherein the overall thickness of the article is increased 3% (closed square symbols) and is decreased by 3% (open circle symbols). The caliper variation of +/−3% represents the high range of spatial and temporal caliper variation for a Multilayer Optical Film manufacturing process. FIG. 17F shows that the color variation among the three color trajectories, spanning the caliper range of 6%, is quite small, to the point of being insignificant.

Example 5—Gold to Silver: MOF Article Film Construction

A MOF film article 10 (FIG. 1) including a MOF back reflector element 12 and a MOF front partial reflector element 14 was conceived that had a saturated gold reflective color at normal angle moving to a silver reflective color at higher view angle, and was substantially insensitive to MOF optical caliper variation.

The front surface partial reflector 14 was a biaxially stretched multilayer film stack with 325 layers of PEN alternating with layers of PHEN13. The back reflector 12 was also a biaxially stretched multilayer film stack with 184 layers of PEN interspersed with PMMA. The wavelength selective absorber layer 16 was a 10 μm PETg film extruded with a Red dye, Red 60 pigment wavelength-selective absorber, at a weight % of 0.15, and a Yellow dye, PY 147 pigment wavelength-selective absorber, at a weight % of 1.35. The resulting MOF article had a thickness of 60 μm, and included protective boundary layers on the exterior facing surfaces thereof (not shown in FIG. 18A discussed below) with a thickness of about 2 μm.

Figure 18A:
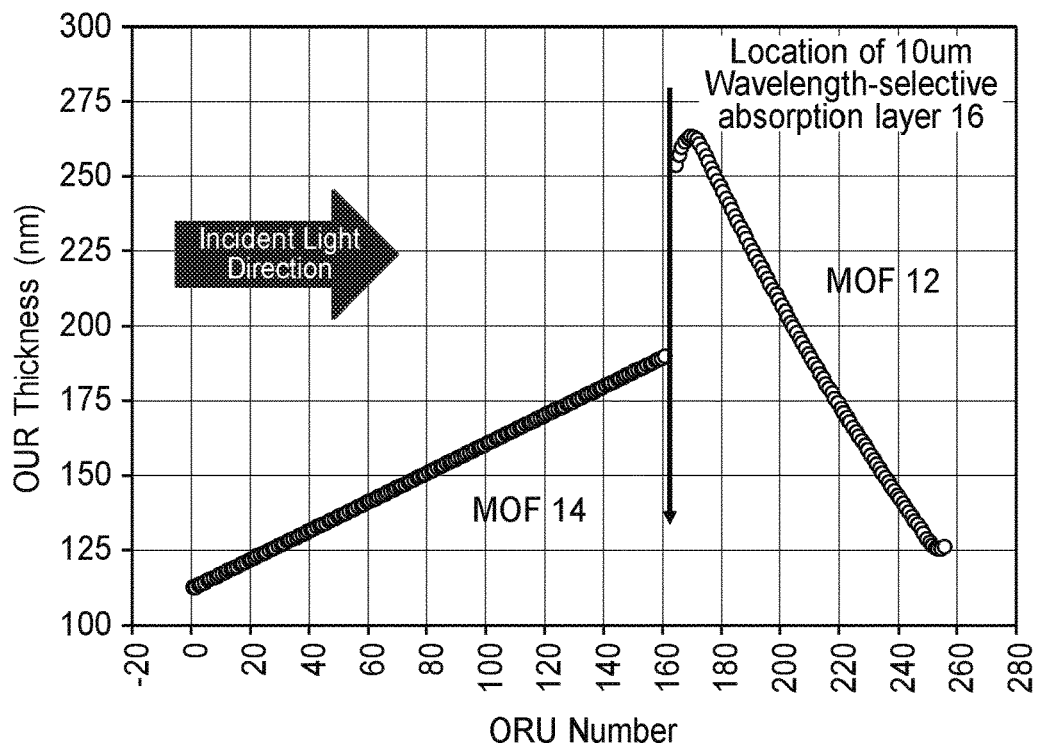
FIG. 18A is a plot of the layer thickness profiles of the optical repeat units of the MOF article of Example 5.

The layer profiles for each of the two MOF films for the back reflector 12 and the front surface partial reflector 14 are shown in FIG. 18A. For Example 5, the front surface partial reflector MOF film 14 optical repeat unit (ORU) profile is disposed nearest the front surface of the MOF article 10, and the broad banded back reflector 12 ORU is disposed underneath the wavelength-selective absorber film 16, on the bottom side of the MOF article 10.

The ORU profile for the MOF front surface partial reflector 14 is designed to increase only the blue and cyan reflected color with increasing incidence angle, and can be restricted to this visible color spectrum because the combination of underlying elements absorber layer 16 atop the back reflector 12 is strongly reflective in the green to red portion of the visible spectrum, for all incident angles. In FIG. 18A, each symbol represents an ORU consisting of a pair of ¼ wavelength phase thickness PEN layers and PHEN13 layers, partial for the MOF front surface partial reflector 14, and for the MOF broad banded back reflector 12, each symbol represents an ORU consisting of a pair of ¼ wavelength phase thickness PEN layer and PMMA layer.

In this computational Example 5, the optical elements MOF back reflector 12, MOF front surface partial reflector 14, and absorber layer 16 are each assumed to have low scattering, or low haze, rendering the MOF article 10, consisting of only elements 12, 14 and 16, specular in character.

Figure 18B:
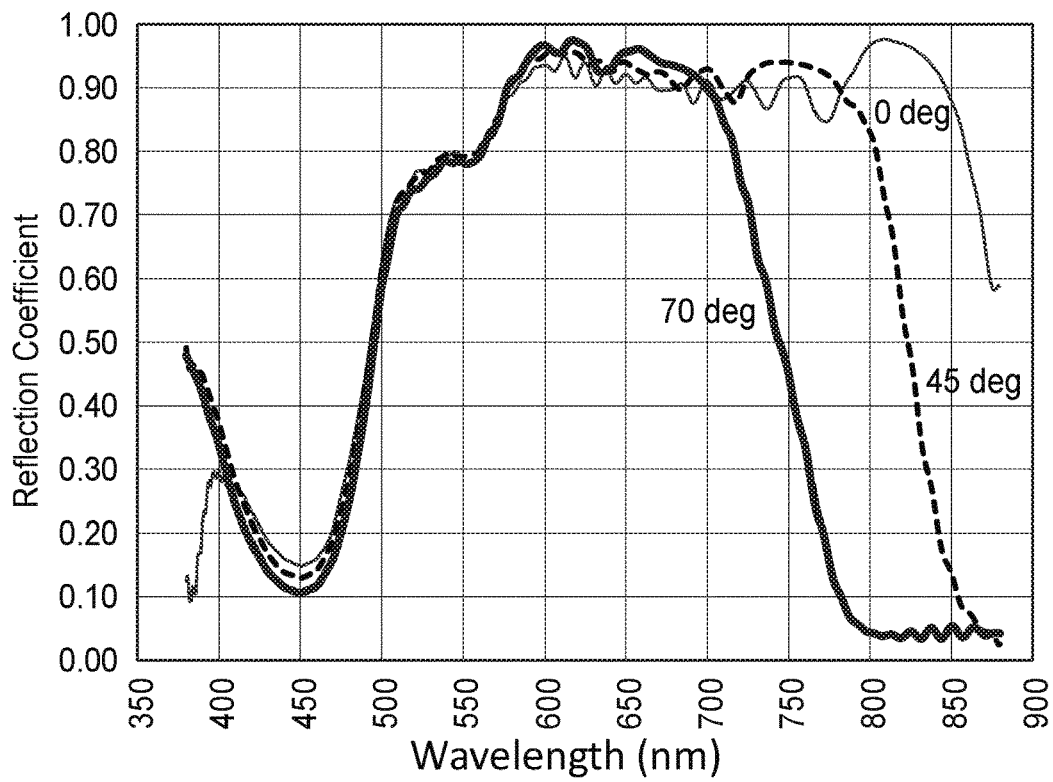
FIGS. 18B-18C are plots of the computed reflection spectrum for light incident angles of 0, 45 and 70 (near-grazing) degrees, and resulting reflection color a* and b*, respectively, for a D65 light source spectrum for the MOF article of Example 5.
Figure 18C:
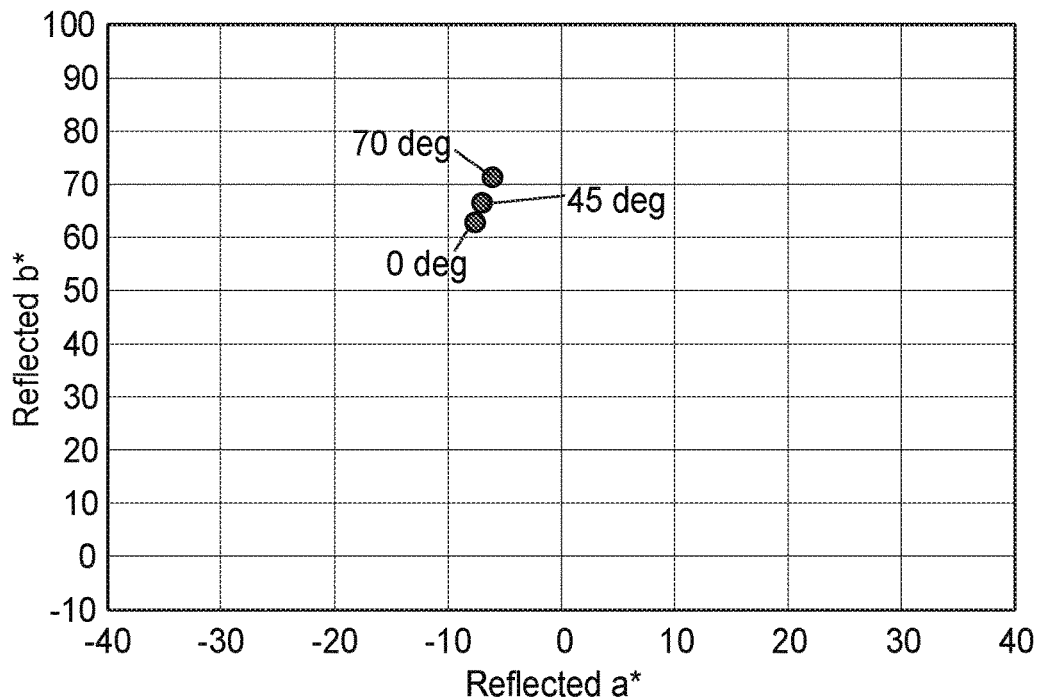

As an illustration of the relatively constant reflection color with changing observation angle for the combination of underlying elements wavelength-selective absorber layer 16, atop MOF broad band back reflector 12, FIGS. 18B-18C show the computed reflection spectrum of for light incident angles of 0, 45 and 70 (near-grazing) degrees, and resulting reflection color a* and b*, respectively, for a D65 light source spectrum. These calculations remove the effect of an air-to-material Fresnel interface to determine the color response of the MOF article 10, since light propagates into the absorber layer 16 and into the MOF back reflector 12 from the MOF front surface partial reflector 14, and so have no air to material interface.

Figure 18D:
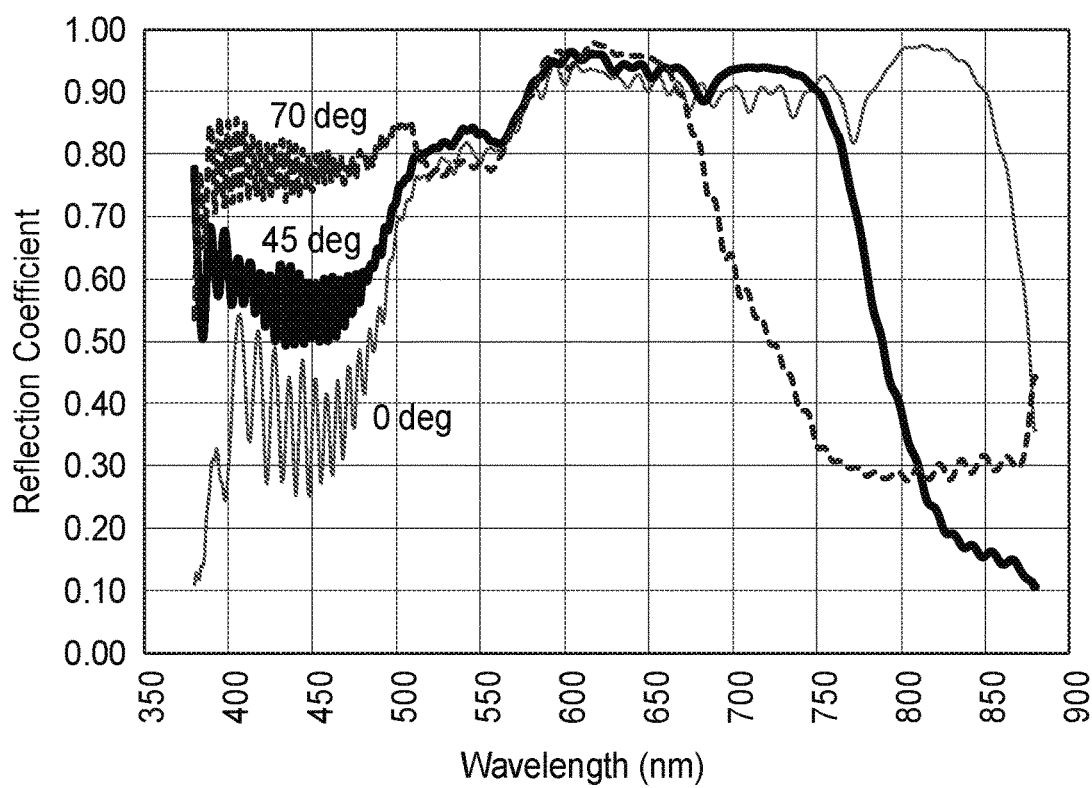
FIG. 18D is a plot of the computed specular reflection spectra for the full combination of the front surface partial reflector, the absorber layer and the back reflector elements of the MOF article of Example 5 for view angles of 0, 45 and 70 (near-grazing) degrees.

FIG. 18D shows the computed specular reflection spectra for the full combination of elements MOF front surface partial reflector 14, absorber layer 16 and MOF back reflector 12, for view angles of 0, 45 and 70 (near-grazing) degrees. FIG. 18D shows that the overall visible reflection is relatively high for all incidence angles, yet still rendering a dynamic change in reflected color, from high reflection gold at normal angles, to a high reflection silver appearance as observation angles increase to near grazing.

Figure 18E:
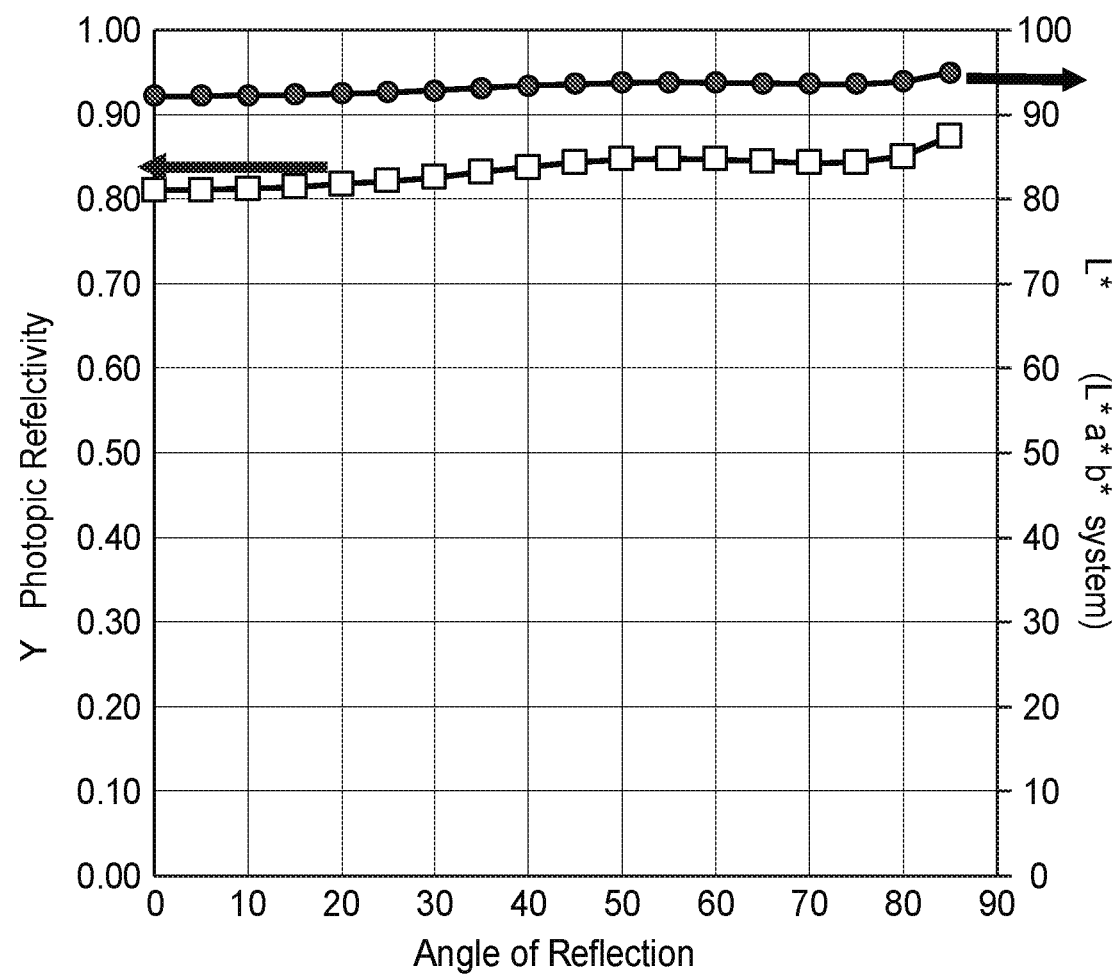
FIG. 18E is a plot of the increase in the photopic reflectivity Y, and of the "Lightness" metric for the Lab color system, L*, for increasing light incidence angle for the MOF article of Example 5.

FIG. 18E is a plot of the increase in the photopic reflectivity Y, and of the "Lightness" metric for the Lab color system, L*, for increasing light incidence angle, for the MOF article of Example 5.

Figure 18F:
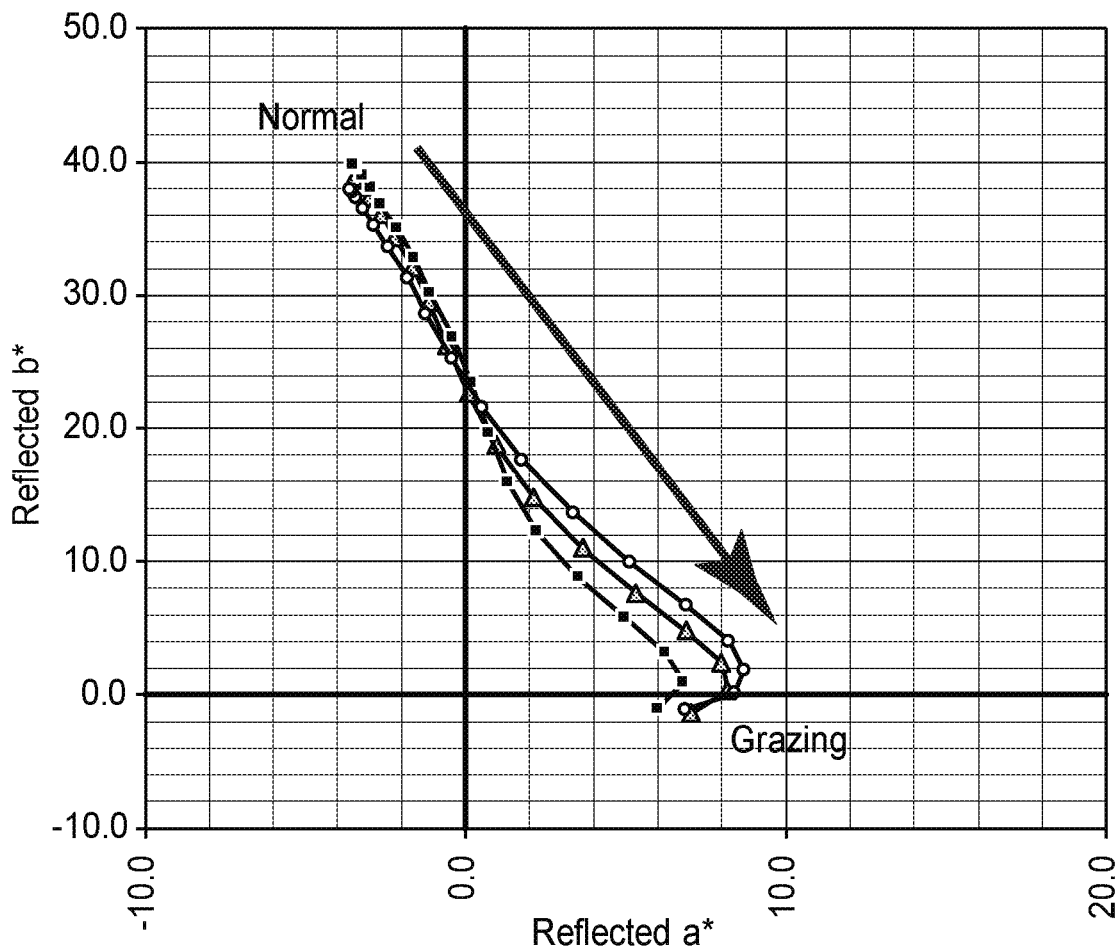
FIG. 18F shows the computed overall reflected color of the MOF article of Example 5, where the triangular, square and circular symbols show the a* b* color values ranging from normal incidence (0 degrees) to grazing angle 85 degrees, in increments of 5 degrees.

FIG. 18F shows the computed overall reflected color of the MOF article of Example 5, where the triangular symbols show the a* b* color values ranging from normal incidence (0 degrees) to grazing angle 85 degrees, in increments of 5 degrees. FIG. 18F shows that the color dynamically moves from a deep rose color at normal incidence, to a neutral, high reflection silver color as incidence angle increases.

FIG. 18F also shows a* b* color trajectories, computed for the MOF article of Example 5, wherein the overall thickness of the article is increased 3% (closed square symbols) and is decreased by 3% (open circle symbols). The caliper variation of +/−3% represents the high range of spatial and temporal caliper variation for a Multilayer Optical Film manufacturing process. FIG. 18F shows that the color variation among the three color trajectories, spanning the caliper range of 6%, is quite small, to the point of being insignificant.

Example 6—Film Article

Figure 19:
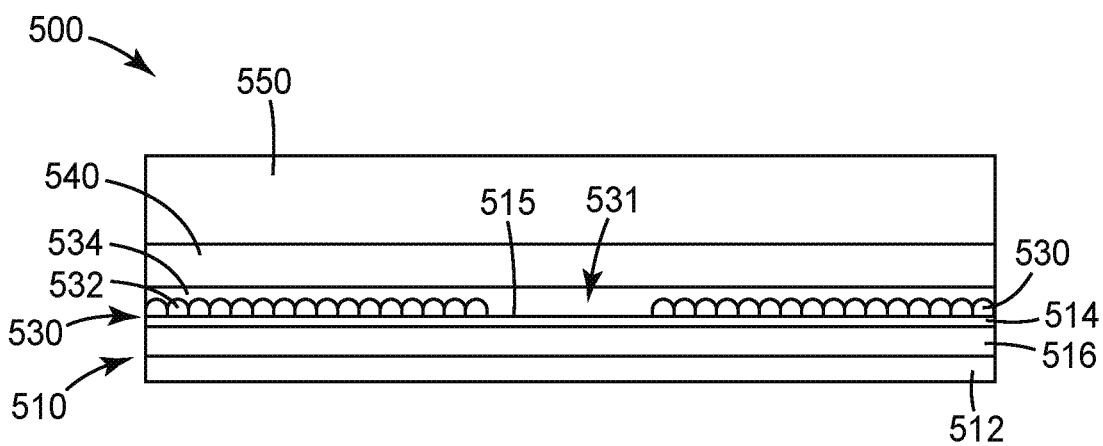
FIG. 19 is a schematic depiction of a cross-section of a film article.

FIG. 19 illustrates a film article 500 including a MOF article 510 on a surface thereof. In this embodiment, the MOF article 510, which is shown in more detail in FIG. 1 and has a saturated color like the MOF articles in Examples 4-5 above, includes a back reflector 512 and a front surface partial reflector 514, which are separated by an absorber layer 516.

A diffusing structure 530 formed from a polymeric material with a low refractive index and including a microstructured pattern 532 was formed on a side 515 of the MOF article 510 adjacent to the front surface partial reflector 514.

The microreplicated structure 532 can be created using, for example, a diamond turning system with a fast tool servo (FTS) described, for example, in PCT Published Application No. WO 00/48037 and U.S. Pat. Nos. 7,350,442 and 7,328, 638, with a cylindrical micro-replication tool. The process for creating the micro-replication tool is described further in, for example, PCT Published Application No. WO2010/041261.

The structures created in the cylindrical tool were then replicated on the surface 515 using the method described in U.S. Pat. No. 5,175,030 (Lu) and U.S. Pat. No. 5,183,597 (Lu). The structures were made of an ultraviolet (UV) curable resin as described in U.S. Pat. No. 8,282,863, which has an average refractive index of approximately 1.67.

The surface 515 also includes areas 531 of substantially non-diffuse character that can be designed into, for example, labels, logos and the like.

The diffusing microstructured pattern 530 and the substantially non-diffuse regions 531 were coated with a polymeric material 534 having a higher refractive index than the polymeric material forming the diffuse structure 530.

The film article 500 further includes a layer of a refractive index mismatching optically clear adhesive (OCA) 540, which creates areas of diffusion and areas of non-diffusion. The OCA 540 is laminated to a sheet of glass 550.

The film article 500 may be incorporated into, for example, a consumer electronic device to enable wireless charging, and glass outer surface 550 would provide rigidity. The film article 500 is merely one example showing how the MOF article 510 can provide a decorative application in wireless charging or sensor hiding-IR transmitting/receiving if the designed spectra of the underlying MOF article 510 is appropriated designed.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given to enable one of ordinary skill in the art to practice the claimed disclosure, is not to be construed as limiting the scope of the disclosure, which is defined by the claims and all equivalents thereto.

The invention claimed is:

1. An article, comprising:
   a reflector with a reflectance band that is substantially constant as a function of an incidence angle;
   a polymeric multilayer film stack disposed on the reflector and comprising a front surface partial reflector with a reflectivity that increases with an increasing incidence angle away from the normal; and
   a wavelength-selective absorber with a transmission band that at least partially coincides with the reflectance band of the reflector.

2. The article of claim 1, wherein the article has a reflectivity of less than about 30% for normally incident unpolarized light, and a reflectivity of about 45% to about 60% for obliquely incident light with an incidence angle of 60 degrees, for unpolarized light, for any plane of incidence.

3. The article of claim 1, wherein the front surface partial reflector has a transmission of greater than about 70% for normally incident unpolarized light, and a transmission of about 55% to about 40% for obliquely incident light with an incidence angle of 60 degrees, for unpolarized light, for any plane of incidence.

4. The article of claim 1, wherein the front surface partial reflector has a sloped transmission spectrum.

5. The article of claim 4, wherein the front surface partial reflector has a sloped transmission spectrum for light incident in a selected plane of incidence for a selected polarization state, or for unpolarized light in any plane of incidence.

6. The article of claim 1, wherein the article has a sloped reflection spectrum.

7. The article of claim 1, wherein the front surface partial reflector is a near-symmetric reflector.

8. The article of claim 1, wherein the wavelength-selective absorber is chosen from at least one of a dye and a pigment.

9. The article of claim 8, wherein the reflector comprises a first polymeric multilayer film stack, and wherein the wavelength-selective absorber resides in the first polymeric multilayer film stack.

10. The article of claim 1, wherein the wavelength-selective absorber resides in a polymeric layer between the reflector and the front surface partial reflector.

11. An article, comprising:
    a light absorbing backing;
    a first polymeric multilayer film stack on the light absorbing backing, the first polymeric multilayer film stack comprising a back reflector with a reflectance band that is substantially constant as a function of an incidence angle;
    a polymeric layer on the first multilayer polymeric film stack, the polymeric layer comprising a wavelength-selective absorber with a transmission band that at least partially coincides with the reflectance band of the back reflector;
    a second polymeric multilayer film stack on the polymeric layer, wherein the second polymeric multilayer film stack comprises a collimating front surface partial reflector with a reflectivity of less than about 30% for normally incident unpolarized light, and a reflectivity of greater than about 45% for 60 degree incident unpolarized light, at any plane of incidence, and wherein the front surface partial reflector has a red-sloped reflection spectrum; and
    a diffusive layer on the second polymeric multilayer film stack.

12. The article of claim 11, wherein the second polymeric multilayer film stack comprises a collimating front surface partial reflector with a reflectivity of less than 25% for normally incident unpolarized light, and a reflectivity of greater than 45% for 60 degree incident unpolarized light, and any plane of incidence.

13. The article of claim 11, wherein the wavelength-selective absorber is chosen from one of a pigment and a dye.

14. The article of claim 11, wherein the diffusive layer is chosen from polymeric materials and glass having a haze of greater than about 50%.

15. The article of claim 11, wherein the diffusive layer is derived from a wavelength-selective absorbing pigment, disposed within the polymeric wavelength-selective absorbing layer.

16. The article of claim 11, further comprising an adhesive layer between the second polymeric multilayer film stack and the diffusive layer.

17. The article of claim 11, wherein the first polymeric multilayer film stack comprises alternating layers of a birefringent polymer and an isotropic polymer.

18. The article of claim 17, wherein the first polymeric multilayer film stack has a linearly increasing layer thickness profile.

19. The article of claim 11, wherein the second polymeric multilayer film stack comprises alternating layers of birefringent polymers.

20. A multilayer polymer film article with a transmission greater than 70% at normal angle for unpolarized light, and with transmission of about 55% to about 40% for unpolarized light at 60 degree incidence angle, for any plane of incidence.

* * * * *

UNITED STATES PATENT AND TRADEMARK OFFICE
CERTIFICATE OF CORRECTION

PATENT NO. : 11,662,509 B2
APPLICATION NO. : 16/482312
DATED : May 30, 2023
INVENTOR(S) : Timothy J. Nevitt Page 1 of 1

It is certified that error appears in the above-identified patent and that said Letters Patent is hereby corrected as shown below:

In the Claims

<u>Column 38</u>
Line 61, In Claim 12, after "and", insert --at--.

Signed and Sealed this
Twenty-eighth Day of November, 2023

Katherine Kelly Vidal
*Director of the United States Patent and Trademark Office*